(12) United States Patent
Steketee et al.

(10) Patent No.: US 10,872,540 B2
(45) Date of Patent: *Dec. 22, 2020

(54) CONFIGURABLE MONITOR AND PARTS MANAGEMENT SYSTEM

(71) Applicant: Caterpillar Inc., Peoria, IL (US)

(72) Inventors: Brian B. Steketee, Grand Rapids, MI (US); David W. Baarman, Fennville, MI (US); Mark Strayer, Rockford, MI (US); Thad Senti, Zeeland, MI (US)

(73) Assignee: Caterpillar Inc., Peoria, IL (US)

( * ) Notice: Subject to any disclaimer, the term of this patent is extended or adjusted under 35 U.S.C. 154(b) by 327 days.

This patent is subject to a terminal disclaimer.

(21) Appl. No.: 15/648,684

(22) Filed: Jul. 13, 2017

(65) Prior Publication Data
US 2018/0005461 A1 Jan. 4, 2018

Related U.S. Application Data

(63) Continuation of application No. 15/543,275, filed as application No. PCT/US2016/013667 on Jan. 15, 2016, now abandoned.
(Continued)

(51) Int. Cl.
G06Q 10/00 (2012.01)
G09B 19/16 (2006.01)
(Continued)

(52) U.S. Cl.
CPC ............ G09B 19/167 (2013.01); E02F 3/96 (2013.01); E02F 9/2025 (2013.01);
(Continued)

(58) Field of Classification Search
None
See application file for complete search history.

(56) References Cited

U.S. PATENT DOCUMENTS 5,737,215 A * 4/1998 Schricker ............... G07C 5/008
700/29
5,970,436 A * 10/1999 Berg ....................... G07C 5/04
701/29.4
(Continued)

FOREIGN PATENT DOCUMENTS

AU 2014201924 10/2014
WO 2015031701 3/2015

OTHER PUBLICATIONS

R. Francisco, L. Huang, G. Dolmans and H. Groot, "Coexistence of Zigbee Wireless Sensor Networks and Bluetooth inside a Vehicle," In Proc. 2009 IEEE 20th International Symposium on Personal, Indoor and Mobile Radio Communications (Year: 2009).*
(Continued)

Primary Examiner — Thomas G Black
Assistant Examiner — Ana D Thomas
(74) Attorney, Agent, or Firm — Hibshman Claim Construction PLLC

(57) ABSTRACT

A monitoring and maintenance system that utilizes imperial and theoretical data to compare parts, vehicles, users, regions, wear intensity indexes over time and tracking information to provide a sophisticated data collection system for heavy-duty equipment or rental equipment. This tracking is designed to better the specifications, designs, training, preventative maintenance, and replacement wear understanding of fleet management.

12 Claims, 80 Drawing Sheets

Related U.S. Application Data

(60) Provisional application No. 62/244,525, filed on Oct. 21, 2015, provisional application No. 62/212,266, filed on Aug. 31, 2015, provisional application No. 62/212,270, filed on Aug. 31, 2015, provisional application No. 62/103,706, filed on Jan. 15, 2015.

(51) Int. Cl.

| | |
|---|---|
| *E02F 3/96* | (2006.01) |
| *E02F 9/20* | (2006.01) |
| *H04W 4/80* | (2018.01) |
| *G07C 5/00* | (2006.01) |
| *E02F 9/26* | (2006.01) |
| *G07C 5/08* | (2006.01) |
| *G07C 5/02* | (2006.01) |
| *G09B 5/02* | (2006.01) |
| *H02J 7/02* | (2016.01) |
| *H04W 84/18* | (2009.01) |

(52) U.S. Cl.
CPC ............ *E02F 9/2054* (2013.01); *E02F 9/26* (2013.01); *E02F 9/267* (2013.01); *G06Q 10/20* (2013.01); *G07C 5/008* (2013.01); *G07C 5/02* (2013.01); *G07C 5/085* (2013.01); *G07C 5/0808* (2013.01); *G09B 5/02* (2013.01); *H02J 7/025* (2013.01); *H04W 4/80* (2018.02); *H04W 84/18* (2013.01)

(56) References Cited

U.S. PATENT DOCUMENTS

| | | | | |
|---|---|---|---|---|
| 8,155,844 | B2* | 4/2012 | Peters | A01B 63/1117 701/36 |
| 8,660,738 | B2 | 2/2014 | Faivre et al. | |
| 8,704,507 | B2* | 4/2014 | Oksman | B25D 9/00 173/90 |
| 8,924,094 | B2* | 12/2014 | Faivre | E02F 9/2029 172/465 |
| 9,230,144 | B2* | 1/2016 | Kawasaki | G06K 7/10009 |
| 9,686,902 | B2* | 6/2017 | Thomson | A01B 63/112 |
| 9,796,479 | B2* | 10/2017 | Tucker | B64D 45/00 |
| 2002/0027499 | A1* | 3/2002 | Chainer | G07C 5/008 340/426.24 |
| 2003/0023325 | A1* | 1/2003 | Adachi | E02F 9/26 700/9 |
| 2005/0246040 | A1* | 11/2005 | Horkavi | G05B 19/0426 700/83 |
| 2006/0129280 | A1* | 6/2006 | Thomas | E02F 9/2029 700/275 |
| 2008/0254415 | A1 | 10/2008 | Barry | |
| 2008/0282583 | A1 | 11/2008 | Koellner et al. | |
| 2009/0082930 | A1* | 3/2009 | Peters | E02F 3/432 701/50 |
| 2009/0182460 | A1* | 7/2009 | O'Neal | B60R 25/00 701/2 |
| 2009/0198409 | A1* | 8/2009 | Rector | G07C 5/085 701/33.4 |
| 2010/0174576 | A1* | 7/2010 | Naylor | G06Q 10/04 701/31.4 |
| 2011/0040440 | A1* | 2/2011 | de Oliveira | G06Q 10/0631 701/29.5 |
| 2012/0035838 | A1* | 2/2012 | Zeidler | F02D 41/22 701/115 |
| 2012/0158278 | A1 | 6/2012 | Pienecke et al. | |
| 2012/0158279 | A1 | 6/2012 | Faivre et al. | |
| 2012/0233238 | A1 | 9/2012 | Braginsky et al. | |
| 2012/0250815 | A1* | 10/2012 | Oksman | B25D 9/00 377/16 |
| 2013/0338855 | A1* | 12/2013 | Mason | G07C 5/0816 701/2 |
| 2014/0107895 | A1* | 4/2014 | Faivre | E02F 9/264 701/50 |
| 2014/0150304 | A1* | 6/2014 | Sherlock | E02F 3/96 37/405 |
| 2014/0172247 | A1* | 6/2014 | Thomson | A01B 63/112 701/50 |
| 2014/0207309 | A1* | 7/2014 | Armitage | G07C 5/085 701/1 |
| 2014/0244101 | A1 | 8/2014 | Chitty et al. | |
| 2014/0247138 | A1* | 9/2014 | Kusuno | H04Q 9/00 340/870.01 |
| 2014/0315164 | A1 | 10/2014 | Jones et al. | |
| 2015/0004572 | A1* | 1/2015 | Bomer | G09B 9/042 434/219 |
| 2015/0081177 | A1* | 3/2015 | Kawasaki | G06K 7/10158 701/50 |
| 2015/0240459 | A1* | 8/2015 | Kawasaki | E02F 9/267 701/50 |
| 2016/0153165 | A1* | 6/2016 | Singh | E02F 9/2029 701/50 |
| 2016/0236794 | A1* | 8/2016 | Tucker | B64D 43/02 |
| 2017/0069144 | A1* | 3/2017 | Lawrie-Fussey | G06Q 10/20 |
| 2017/0092021 | A1* | 3/2017 | Nielsen | G07C 5/0808 |
| 2017/0114528 | A1* | 4/2017 | Kosarev | E02F 3/845 |
| 2017/0321392 | A1* | 11/2017 | Oshikawa | E02F 9/0866 |

OTHER PUBLICATIONS

International Search Report and Written Opinion of the International Searching Authority for International Application No. PCT/US16/13667 dated Jun. 16, 2016.

* cited by examiner

CABIN AIR SENSOR
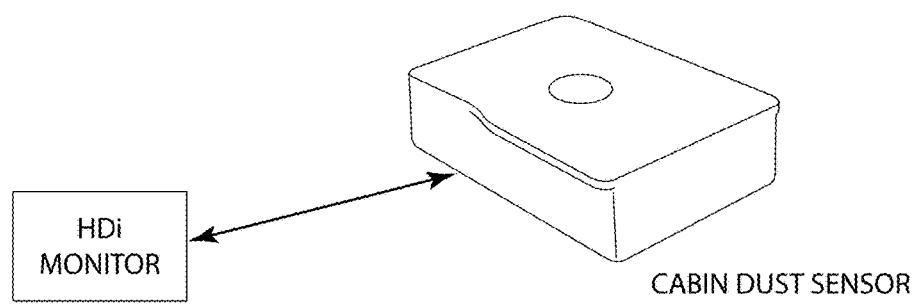
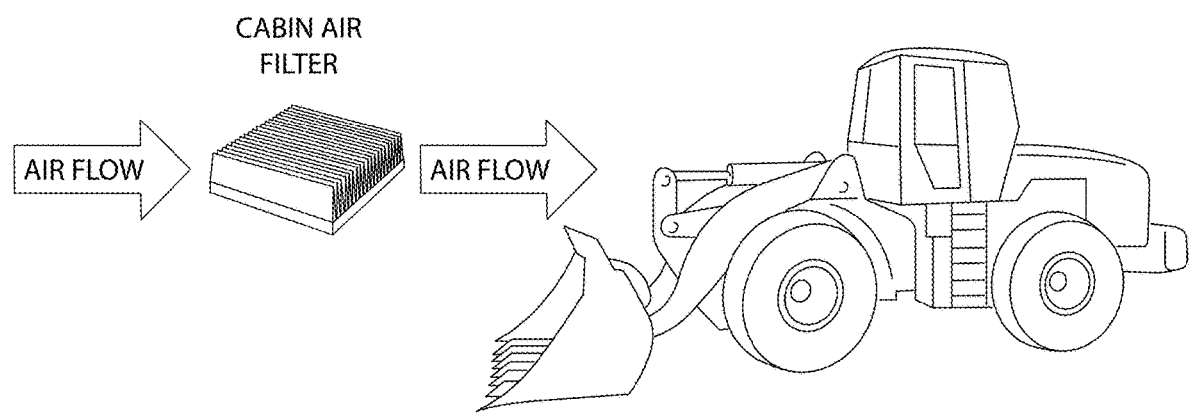
Fig. 5

RFID MONITORING FROM THE HDi MONITOR

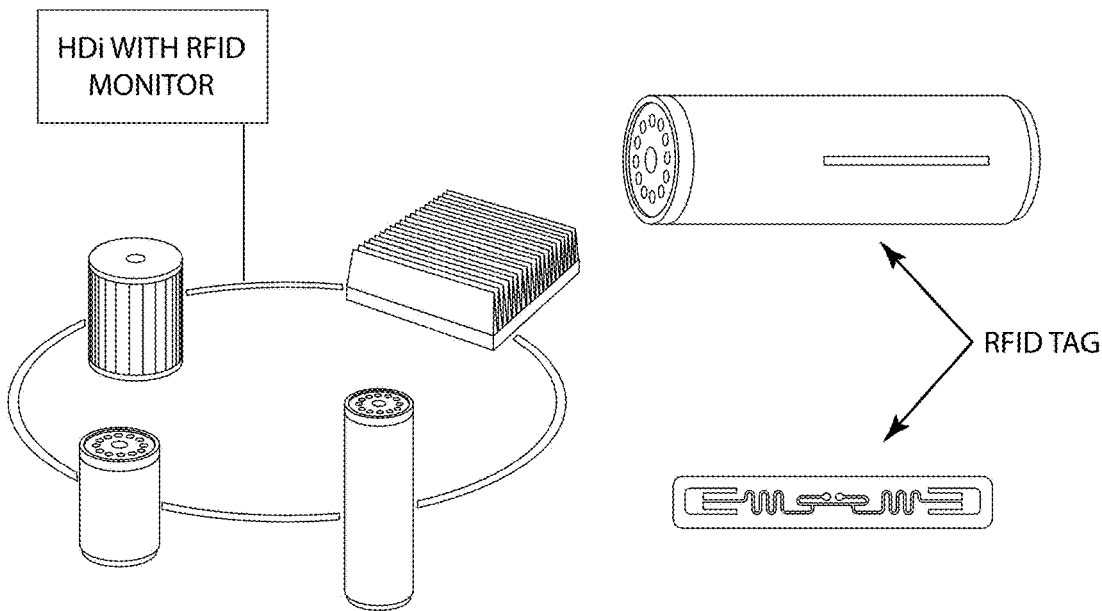

RFID Protocol and registers

| PRIMARY REGISTERS | DATA | SECONDARY | DATA |
|---|---|---|---|
| Password | 8 Bytes | Password | 8 Bytes |
| S/N | 16 Bytes | S/N | 16 Bytes |
| Mfg Date | 12 Bytes | Mfg Date | 12 Bytes |
| Mfg Ref Pressure | 4 Bytes | Mfg Ref Pressure | 4 Bytes |
| Mfg Trigger Pressure | 5 Bytes | Mfg Trigger Pressure | 5 Bytes |
| Hours | 6 Bytes | Hours | 6 Bytes |
| Date/Time Installed | 12 Bytes | Date/Time Installed | 12 Bytes |
| Last Pressure | 4 Bytes | Last Pressure | 4 Bytes |
| Low Pressure | 4 Bytes | Low Pressure | 4 Bytes |
| High Pressure | 4 Bytes | High Pressure | 4 Bytes |
| Trigger Pressure | 4 Bytes | Trigger Pressure | 4 Bytes |
| Ref Pressure | 4 Bytes | Ref Pressure | 4 Bytes |
| Last 5 Filters - 5 | 16 Bytes | Replacement Date | 16 Bytes |
| Last 5 Filters - 4 | 16 Bytes | Replacement Date | 16 Bytes |
| Last 5 Filters - 3 | 16 Bytes | Replacement Date | 16 Bytes |
| Last 5 Filters - 2 | 16 Bytes | Replacement Date | 16 Bytes |
| Last 5 Filters - 1 | 16 Bytes | Replacement Date | 16 Bytes |

Fig. 7

FILTER MONITORING FROM THE HDi MONITOR

WIRELESS POWER POWERING SCHEMES
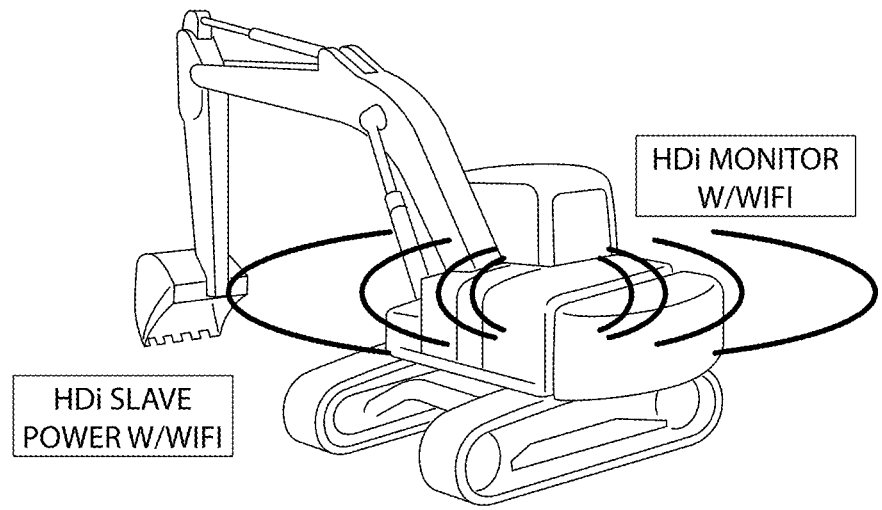
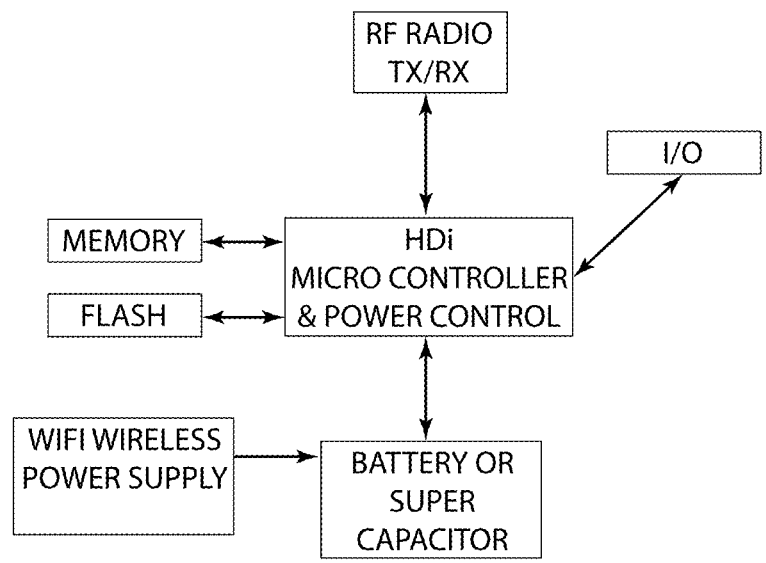
Fig. 15

Driver Scoring Formula

| EVENT | EXPERT REF. (T,E,T) | DRIVER SCORE (T,E,T) | % OF EXPERT | DIFF FROM AVG. | DEGREE OF DIFFICULTY | USER MEASURED DATA ||| SPEED POPULATION DISTRIBUTIONS ||| ENERGY POPULATION DISTRIBUTIONS ||| TRANSITIONS POPULATION DISTRIBUTIONS |||
|---|---|---|---|---|---|---|---|---|---|---|---|---|---|---|---|---|---|
| | | | | | | SPEED | ENERGY | TRANSITIONS | TAILS | AVERAGE | TIPS | TAILS | AVERAGE | TIPS | TAILS | AVERAGE | TIPS |
| Pattern 1 | 96 | 66 | 68.75% | 86.36% | 3 | 6 | 7 | 9 | 2 | 6 | 9 | 2 | 4 | 11 | 4 | 9 | 12 |
| Pattern 2 | 117 | 75 | 64.10% | 92.00% | 3 | 7 | 8 | 10 | 3 | 5 | 10 | 4 | 8 | 15 | 6 | 10 | 14 |
| Pattern 3 | 164 | 100 | 60.98% | 96.00% | 4 | 7 | 8 | 10 | 5 | 7 | 12 | 4 | 8 | 14 | 6 | 9 | 15 |
| Pattern 4 | 235 | 160 | 68.09% | 93.75% | 5 | 8 | 12 | 12 | 4 | 8 | 12 | 6 | 11 | 19 | 7 | 11 | 16 |
| Pattern 5 | 282 | 192 | 68.09% | 93.75% | 6 | 8 | 12 | 12 | 5 | 8 | 12 | 7 | 12 | 18 | 6 | 10 | 17 |
| Pattern 6 | 350 | 287 | 82.00% | 78.05% | 7 | 10 | 20 | 11 | 6 | 10 | 16 | 8 | 13 | 20 | 5 | 9 | 14 |
| Transitions Fwd | 84 | 56 | 66.67% | 92.86% | 2 | 14 | 6 | 8 | 4 | 14 | 18 | 2 | 5 | 12 | 3 | 7 | 12 |
| Transitions Rev | 84 | 56 | 66.67% | 92.86% | 2 | 14 | 6 | 8 | 4 | 14 | 19 | 2 | 5 | 11 | 2 | 7 | 12 |
| Right Turns | 43 | 28 | 65.12% | 89.29% | 1 | 12 | 9 | 8 | 5 | 12 | 14 | 3 | 6 | 17 | 2 | 7 | 12 |
| Left Turns | 45 | 26 | 57.78% | 100.00% | 1 | 10 | 7 | 9 | 3 | 10 | 17 | 4 | 7 | 13 | 4 | 9 | 15 |
| Shocks/Hr | 156 | 80 | 51.28% | 95.00% | 4 | 10 | 5 | 5 | 3 | 10 | 16 | 1 | 4 | 10 | 1 | 5 | 13 |
| Climb Up | 68 | 42 | 61.76% | 80.95% | 2 | 7 | 8 | 6 | 2 | 7 | 12 | 3 | 4 | 12 | 2 | 6 | 10 |
| Climb Down | 70 | 42 | 60.00% | 95.24% | 2 | 6 | 9 | 6 | 2 | 6 | 11 | 3 | 9 | 14 | 3 | 6 | 10 |
| Speed Transition | 90 | 51 | 56.67% | 82.35% | 3 | 6 | 6 | 5 | 2 | 6 | 13 | 2 | 3 | 11 | 1 | 5 | 8 |

Fig. 16

TOP PERFORMANCE ON VEHICLES BY OPERATORS

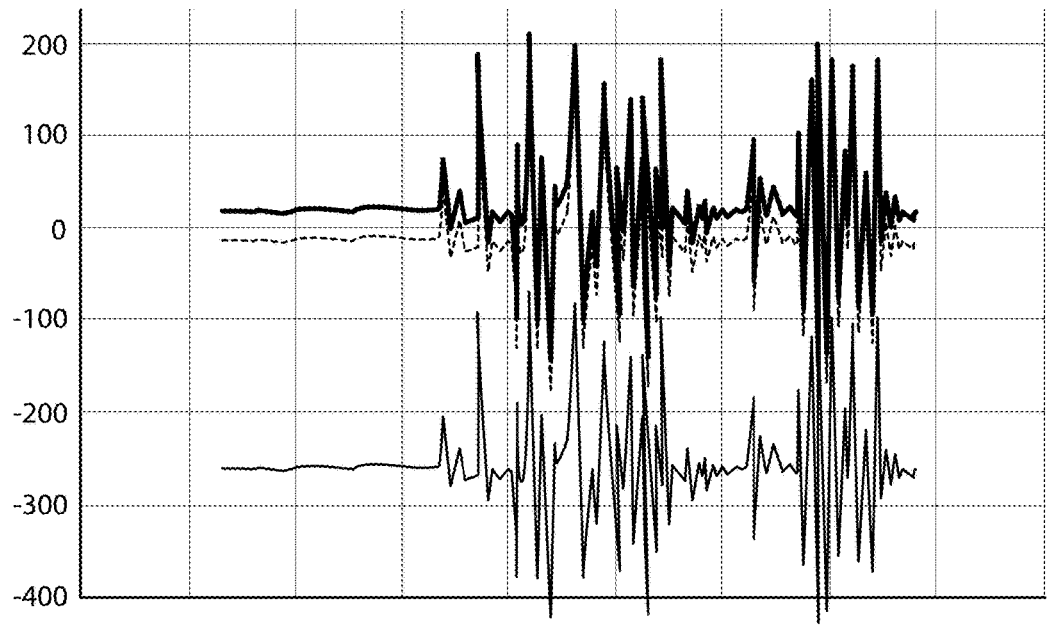

Fig. 17

RANKING SERVICE NETWORK PARTICIPANTS

Vehicle Experience Scoring

| 8/10/15 | TODAY | TYPICAL | RATIOS |
|---|---|---|---|
| Vehicle | EX336F 2HJ98334512 | EX336F | |
| Service Date | 5/5/14 | 11088 | 4.7% |
| Hours | 523 | 1200 | 43.6% |
| Inspections | 6 | 11 | 54.5% |
| UC Life | 90% | 120% | 75.0% |
| Service Interactions | 24 | 32 | 75.0% |
| Interactions | 210 | 170 | 123.5% |
| Operators | 14 | 2 | 700.0% |
| Parts Ratio | 32 | 67 | 47.8% |
| Customer Issues | 6 | 8 | 75.0% |
| Technicians | 1 | 1 | 100.0% |
| Technician ID | MK341200984 | | |
| Inspectors | 1 | 1 | 100.0% |
| Inspectors ID's | MK341200076 | | |

Parts Score        47.8%
Service Score      77.8%
Hours Score        43.6%

Technician Score   80.3%
Inspector Score    84.4%

Fig. 18

State Classification

```
Correctly Classified Instances        964              49.4613 %
Incorrectly Classified Instances      985              50.5387 %
Kappa statistic                       0.3994
Mean absolute error                   0.0869
Root mean squared error               0.2696
Relative absolute error              61.1956 %
Root relative squared error         101.3578 %
Total Number of Instances          1949
Ignored Class Unknown Instances       2

=== Detailed Accuracy By Class ===
```

|  | TP Rate | FP Rate | Precision | Recall | F-Measure | ROC Area | Class |
|---|---|---|---|---|---|---|---|
|  | 0.551 | 0.017 | 0.458 | 0.551 | 0.5 | 0.795 | Rest, no start |
|  | 0.811 | 0.122 | 0.746 | 0.811 | 0.777 | 0.875 | Idle |
|  | 0.221 | 0.054 | 0.214 | 0.221 | 0.218 | 0.581 | Extending Bucket |
|  | 0.324 | 0.092 | 0.316 | 0.324 | 0.32 | 0.604 | Turning Left |
|  | 0.809 | 0.018 | 0.834 | 0.809 | 0.821 | 0.868 | Moving Forward |
|  | 0.413 | 0.039 | 0.454 | 0.413 | 0.432 | 0.713 | Scooping Dirt |
|  | 0.233 | 0.093 | 0.237 | 0.233 | 0.235 | 0.586 | Dumping Load |
|  | 0.246 | 0.051 | 0.258 | 0.246 | 0.252 | 0.603 | Turning Right |
|  | 0.069 | 0.007 | 0.133 | 0.069 | 0.091 | 0.544 | Backing up |
|  | 0.042 | 0.011 | 0.045 | 0.042 | 0.043 | 0.529 | Extending Bucket |
|  | 0.281 | 0.054 | 0.319 | 0.281 | 0.299 | 0.64 | Actual Scooping |
|  | 0.054 | 0.024 | 0.063 | 0.054 | 0.058 | 0.533 | Smoothing |
| Weighted Avg. | 0.495 | 0.075 | 0.482 | 0.495 | 0.488 | 0.724 |  |

Fig. 25

=== Confusion Matrix ===

| a | b | c | d | e | f | g | h | i | j | k | l | <-- classified as |
|---|---|---|---|---|---|---|---|---|---|---|---|---|
| 27 | 20 | 0 | 2 | 0 | 0 | 0 | 0 | 0 | 0 | 0 | 0 | a = Rest, no start |
| 25 | 484 | 13 | 33 | 7 | 5 | 14 | 3 | 1 | 0 | 7 | 5 | b = Idle |
| 2 | 23 | 27 | 17 | 5 | 14 | 16 | 12 | 1 | 0 | 2 | 3 | c = Extending Bucket |
| 5 | 51 | 16 | 73 | 13 | 9 | 25 | 12 | 4 | 1 | 11 | 5 | d = Turning Left |
| 0 | 11 | 5 | 11 | 161 | 3 | 3 | 2 | 1 | 0 | 0 | 2 | e = Moving Forward |
| 0 | 9 | 11 | 12 | 1 | 59 | 21 | 12 | 1 | 3 | 11 | 3 | f = Scooping Dirt |
| 0 | 14 | 20 | 34 | 2 | 14 | 50 | 25 | 4 | 11 | 33 | 8 | g = Dumping Load |
| 0 | 9 | 8 | 23 | 2 | 11 | 20 | 32 | 0 | 1 | 18 | 6 | h = Turning Right |
| 0 | 4 | 8 | 4 | 0 | 4 | 2 | 3 | 2 | 0 | 2 | 0 | i = Backing up |
| 0 | 2 | 7 | 2 | 0 | 2 | 7 | 0 | 2 | 0 | 2 | 1 | j = Extending Bucket |
| 0 | 16 | 7 | 14 | 1 | 7 | 39 | 15 | 0 | 4 | 45 | 12 | k = Actual Scooping |
| 0 | 6 | 4 | 6 | 1 | 2 | 14 | 8 | 1 | 1 | 10 | 3 | l = Smoothing |

Fig. 26

INSTALLATION AND REGISTRATION

FIND EQUIPMENT

SERVICE HOURS

SHOCK EVENT REPORTED

OPERATION

OPERATION
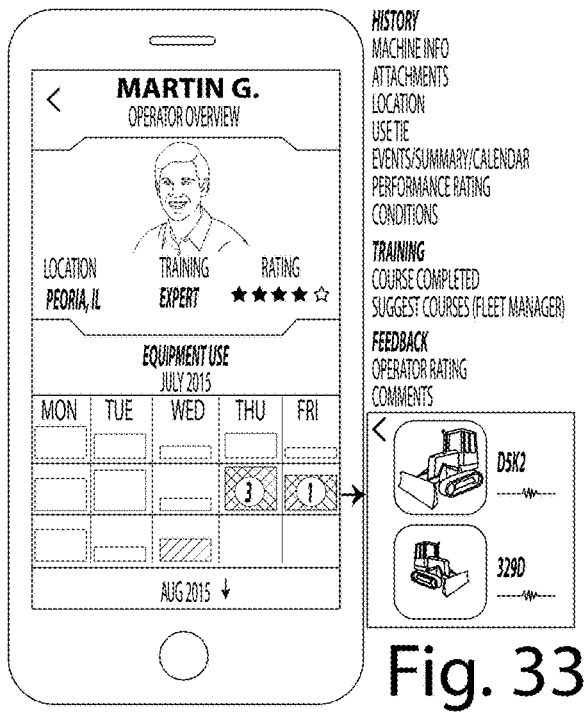
Fig. 33
NON-WARRANTY PART
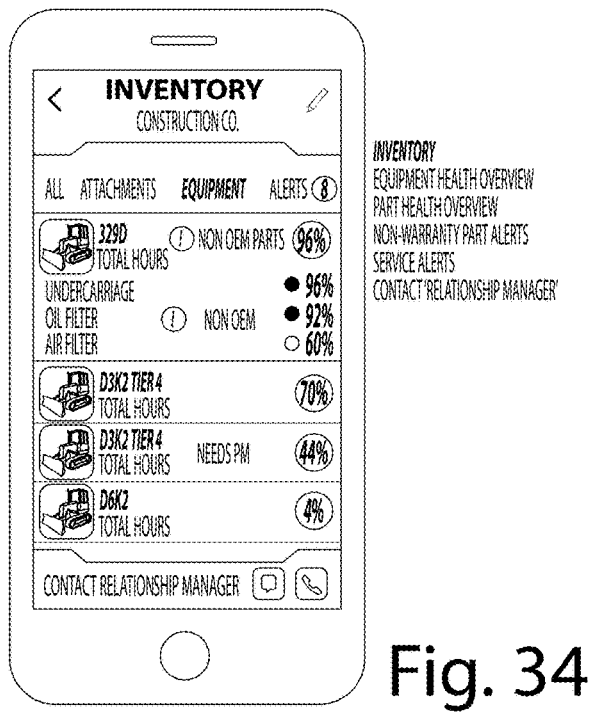
Fig. 34
HDi USES A HUB AND NODE SYSTEM
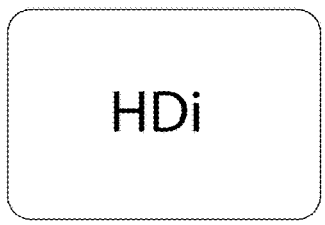
HUB
AGGREGATES INFO FROM NODES
SENDS INFO TO SOFTWARE SOLUTION
RFID READER
NODE
LOW COST
APPROPRIATE FOR PM PARTS AND
ACCESSORIES
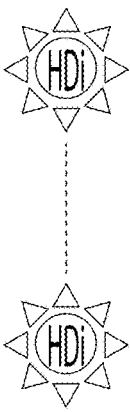
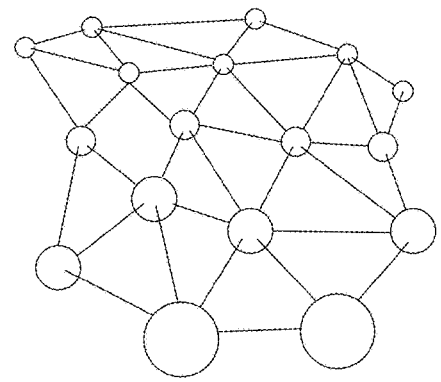
Fig. 35

HDi Solutions Matrix

| Functions | TELEMATICS NODE | 802.15.4 MESH NODE | VEHICLES & WORK TOOLS BTLE NODE | RFID READER NODE | LOCATION NODE |
|---|---|---|---|---|---|
| | Full function retrofit Hdi unit. Functions as a hub and transfer unit while interfacing to a vehicle and gathering data. | Same as full function but without cellular communications | Lower cost module that enables mobile connectivity but with limited capabilities | RFID reader node is designed to monitor consumable parts and communicate to the network | Vehicle and work tool node for asset management and network management |
| Pattern Recognition | X | X | X | X | |
| Shock & Events | X | X | X | X | X |
| 802.15.4 | X | X | X | X | X |
| GPS | X | X | | | X |
| BTLE | X | X | X | X | |
| RFID 2.4GHz | Optional | | | X | |
| CDMA | X | | | | |
| CAN/SPI | Optional | Optional | Optional | Optional | |

Fig. 36

HDi Event Tracking 336F Excavator

Hydraulic hose cycles and hours tracking by recognizing functions

| FUNCTION | CYCLES LOW TEMP | CYCLES MED TEMP | CYCLES HIGH TEMP | SERIAL NUMBER | DATE REPLACED | HOURS OF USE BY FUNCTION | REPLACE HOURS OF USE | REPLACE CYCLES |
|---|---|---|---|---|---|---|---|---|
| Main Arm Up | 223 | 78 | 0 | HD56W267899 | 12/2/15 | 22 | 42 | 456 |
| Main Arm Down | 190 | 65 | 0 | FD563200987 | 10/8/14 | 18 | 44 | 467 |
| Boom Arm Up | 187 | 56 | 0 | FD5691886221 | 5/26/15 | 17 | 32 | 233 |
| Boom Arm Down | 167 | 76 | 0 | HD6755389916 | 5/26/15 | 15 | 32 | 245 |
| Bucket Extend Out | 320 | 120 | 0 | FD67881012213 | 12/2/15 | 32 | 46 | 560 |
| Bucket Extend In | 450 | 145 | 0 | HD45999812132 | 10/8/14 | 35 | 45 | 589 |

$$Roll = -A\tan 2\left(\sqrt{uGx^2 + uGz^2}, uGy\right) \qquad Pitch = -A\tan 2\left(\sqrt{uGy^2 + uGz^2}, uGx\right)$$

ACCELEROMETER BASED ASSOCIATIONS BETWEEN DEVICES

RF COMMUNICATIONS ESTABLISH GENERAL PROXIMITY AND COMMUNICATIONS LINK
ACCELEROMETER COMPARISONS DETERMINE CONNECTION TO A PHYSICAL ENTITY

ACCELEROMETER DATA - CELL PHONE, WEARABLE, TABLET, COMPUTER OR MONITOR

ACCELEROMETER DATA SAMPLE FOR COMPARISON

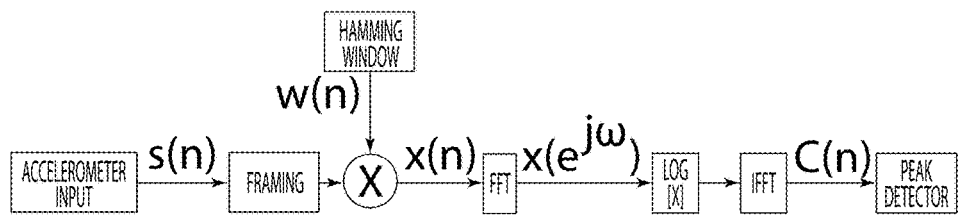
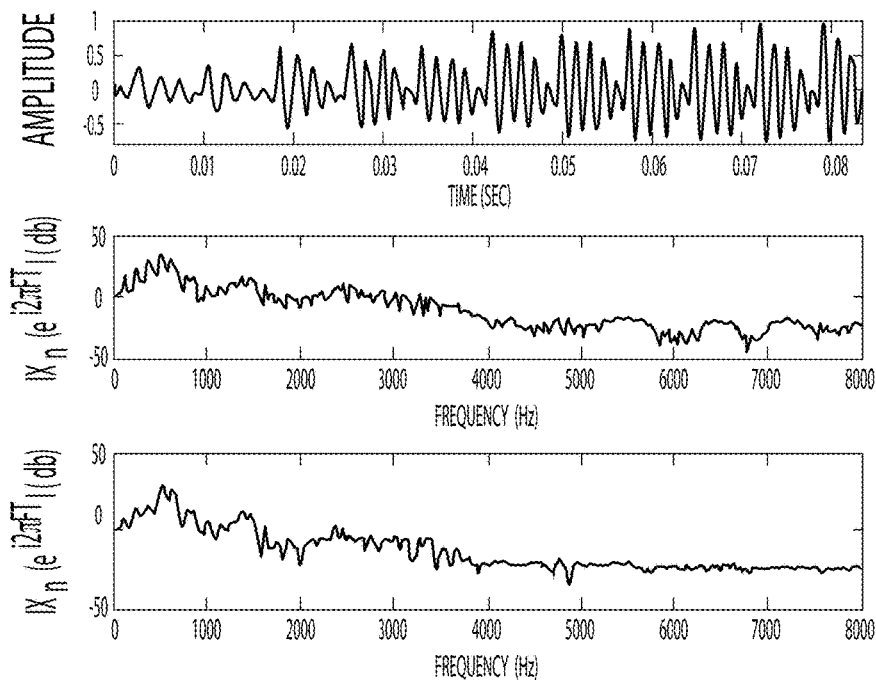
Fig. 50
SCORING ACCELEROMETER DATA FOR COMPARISON
| SIGNAL | A | | | A | | | C | | | D | | | E | | | F | | | ACCEPTANCE |
|---|---|---|---|---|---|---|---|---|---|---|---|---|---|---|---|---|---|---|---|
| | LOW | PS | HIGH | LOW | PS | HIGH | LOW | PS | HIGH | LOW | PS | HIGH | LOW | PS | HIGH | LOW | PS | HIGH | |
| AMPLITUDE | 18 | 23 | 28 | 170 | 212 | 254 | 100 | 125 | 150 | 36 | 45 | 54 | 187 | 234 | 281 | 34 | 43 | 52 | 0.2 |
| TIME | 13 | 15 | 17 | 31 | 37 | 43 | 42 | 49 | 56 | 60 | 71 | 82 | 79 | 93 | 107 | 117 | 138 | 159 | 0.15 |
Fig. 51A

NORMALIZING DATA ACROSS MONITORS

| MONITOR | X AXIS | | | | Y AXIS | | | | Z AXIS | | | |
|---|---|---|---|---|---|---|---|---|---|---|---|---|
| | MIN | MAX | SPAN | NORMALIZATION | MIN | MAX | SPAN | NORMALIZATION | MIN | MAX | SPAN | NORMALIZATION |
| A | MIN(X) | MAX(X) | MAX(X)−MAX(X) | X_NORM = (X−MIN_X)/MAX/MIN | MIN(Y) | MAX(Y) | MAX(MIN(Y)−MAX(Y)) | Y_NORM = (Y−MIN_Y)/MAX/MIN | MIN(Z) | MAX(Z) | MAX(MIN(Z)−MAX(Z)) | Z_NORM = (Z−MIN_Z)/MAX/MIN |
| B | MIN(X) | MAX(X) | MAX(X)−MAX(X) | X_NORM = (X−MIN_X)/MAX/MIN | MIN(Y) | MAX(Y) | MAX(MIN(Y)−MAX(Y)) | Y_NORM = (Y−MIN_Y)/MAX/MIN | MIN(Z) | MAX(Z) | MAX(MIN(Z)−MAX(Z)) | Z_NORM = (Z−MIN_Z)/MAX/MIN |
| C | MIN(X) | MAX(X) | MAX(X)−MAX(X) | X_NORM = (X−MIN_X)/MAX/MIN | MIN(Y) | MAX(Y) | MAX(MIN(Y)−MAX(Y)) | Y_NORM = (Y−MIN_Y)/MAX/MIN | MIN(Z) | MAX(Z) | MAX(MIN(Z)−MAX(Z)) | Z_NORM = (Z−MIN_Z)/MAX/MIN |
| D | MIN(X) | MAX(X) | MAX(X)−MAX(X) | X_NORM = (X−MIN_X)/MAX/MIN | MIN(Y) | MAX(Y) | MAX(MIN(Y)−MAX(Y)) | Y_NORM = (Y−MIN_Y)/MAX/MIN | MIN(Z) | MAX(Z) | MAX(MIN(Z)−MAX(Z)) | Z_NORM = (Z−MIN_Z)/MAX/MIN |
| E | MIN(X) | MAX(X) | MAX(X)−MAX(X) | X_NORM = (X−MIN_X)/MAX/MIN | MIN(Y) | MAX(Y) | MAX(MIN(Y)−MAX(Y)) | Y_NORM = (Y−MIN_Y)/MAX/MIN | MIN(Z) | MAX(Z) | MAX(MIN(Z)−MAX(Z)) | Z_NORM = (Z−MIN_Z)/MAX/MIN |

Fig. 51B

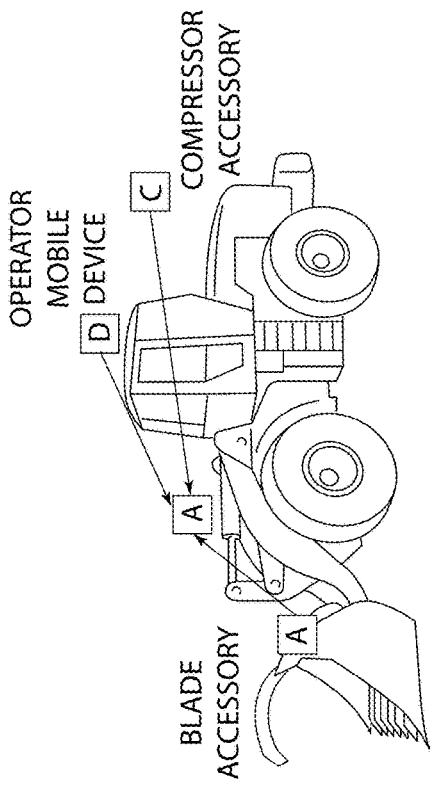

MONITORING ASSOCIATIONS FROM THE HDi MONITOR

Fig. 52

DIFFERENTIAL BETWEEN MONITORS

| MONITOR | AXIS | X AXIS | | | | |
|---|---|---|---|---|---|---|
| | | MAX | MIN | SPAN | AVERAGE | DIFFERENTIAL |
| A | X AXIS | 22 | −32 | 54 | 52.8 | 1.2 |
| | Y AXIS | 10 | −8 | 18 | 20.8 | −2.8 |
| | Z AXIS | 32 | −18 | 50 | 58.4 | −8.4 |
| B | X AXIS | 26 | −32 | 58 | 55 | 3 |
| | Y AXIS | 14 | −11 | 25 | 25 | 0 |
| | Z AXIS | 43 | −28 | 71 | 62 | 9 |
| C | X AXIS | 26 | −35 | 61 | 57 | 4 |
| | Y AXIS | 7 | −11 | 18 | 25 | −7 |
| | Z AXIS | 29 | −21 | 50 | 62 | −12 |
| D | X AXIS | 16 | −17 | 33 | 37 | −4 |
| | Y AXIS | 4 | −14 | 18 | 21 | −3 |
| | Z AXIS | 26 | −24 | 50 | 55 | −5 |
| E | X AXIS | 24 | −34 | 58 | 59 | −1 |
| | Y AXIS | 12 | −13 | 25 | 28 | −3 |
| | Z AXIS | 41 | −30 | 71 | 70 | 1 |

| ROLE IDENTIFIERS ||
|---|---|
| FUNCTION ||
| 3rd party supplier | 3S |
| Auction house | AH |
| Broker | BR |
| Fluid Tech | FT |
| Information Services | IS |
| Inspector | IN |
| Marketing | MK |
| New equipment | NE |
| Operator | OP |
| Parts & Service | PM |
| Quality | QT |
| Monitor | MN |
| Hub | HU |
| R&D | RD |
| Rental equipment | RE |
| Sales | SL |
| Service | SE |
| Service Provider | SP |
| Testing | TS |
| Tool Provider | TP |
| Used equipment | UE |

Fig. 57

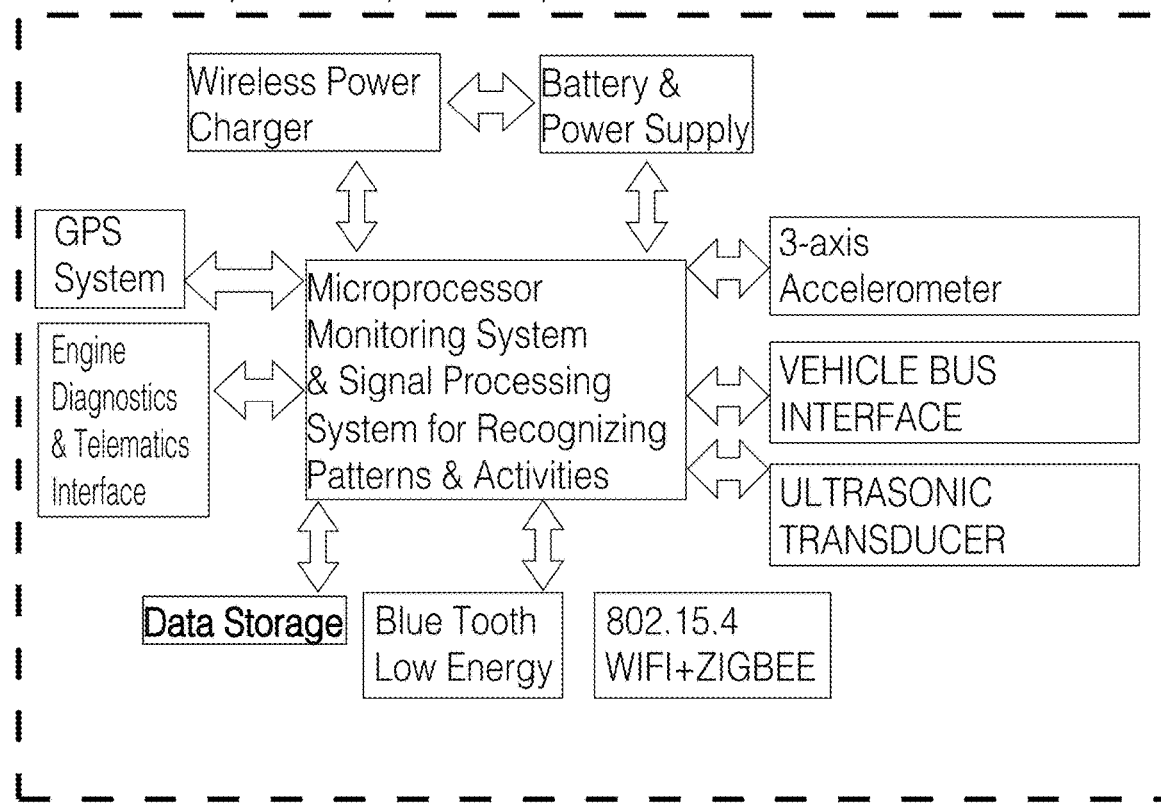
Fig. 59 TABLET INTERFACE CAN BE MOUNTED ON VEHICLE  Key and Tracker with BTLE interface 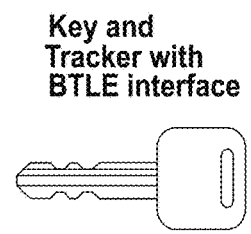 DRIVER 

JOB SITE BILLING SYSTEM

Social Monitor System

Geotag Worksite    2114 - 12th Street

| DESCRIPTION | IDENTIFICATION | DATE | TIME | MACHINE HOURS | MACHINE COST | LABOR HOURS | LABOR COST | WORK RATE | TOTAL |
|---|---|---|---|---|---|---|---|---|---|
| Work Truck | F15023W12778641 | 12/1/14 | 7:45 AM | 8.5 | $42.50 | | $0.00 | $5.00 | $42.50 |
| 336 Excavator | 3362W127866 | 12/1/14 | 8:00 AM | 2 | $240.00 | | $0.00 | $120.00 | $240.00 |
| Excavator Driver | 213D345 | 12/1/14 | 8:00 AM | | $0.00 | 2 | $100.00 | $50.00 | $0.00 |
| 336 Excavator | 3362W127865 | 12/1/14 | 10:21 AM | 1.5 | $180.00 | | $0.00 | $120.00 | $180.00 |
| Excavator Driver | 213D345 | 12/1/14 | 10:21 AM | | $0.00 | 1.5 | $30.00 | $20.00 | $0.00 |
| 336 Excavator | 3362W127866 | 12/1/14 | 12:30 PM | 2 | $240.00 | | $0.00 | $120.00 | $240.00 |
| Excavator Driver | 213D345 | 12/1/14 | 12:30 PM | | $0.00 | 2 | $100.00 | $50.00 | $0.00 |
| Compactor | SCW009856112 | 12/1/14 | 12:30 PM | 0.5 | $25.00 | | $0.00 | $50.00 | $25.00 |
| Compactor Operator | 197D347 | 12/1/14 | 12:30 PM | | $0.00 | 0.5 | $25.00 | $50.00 | $0.00 |
| Concrete Truck | CT2Q1256008 | 12/1/14 | 2:38 AM | 0.35 | $0.00 | | $0.00 | $0.00 | $0.00 |
| Work Truck | F15023W12778641 | 12/1/14 | 7:45 AM | 8.5 | $42.50 | | $0.00 | $5.00 | $42.50 |
| Concrete Saw | CSS32WS56F54 | 12/1/14 | 8:05 AM | 0.45 | $20.25 | | $0.00 | $45.00 | $20.25 |
| Saw Operator | 197D347 | 12/1/14 | 8:05 AM | | $0.00 | 0.45 | $27.00 | $60.00 | $0.00 |
| Tiller | TL23987761009 | 12/1/14 | 9:02 AM | 1.2 | $108.00 | | $0.00 | $90.00 | $108.00 |
| Tiller Operator | 197D347 | 12/1/14 | 9:02 AM | | $0.00 | 1.2 | $60.00 | $50.00 | $0.00 |
| 336 Excavator | 3362W127866 | 12/1/14 | 10:31 AM | | $0.00 | | $0.00 | $120.00 | $0.00 |
| Excavator Driver | 213D345 | 12/1/14 | 10:31 AM | | $0.00 | | $0.00 | $50.00 | $0.00 |
| | | | | 25 | $898.25 | 7.65 | $342.00 | | |

Labor   $342.00
Machine   $898.25
Total   $1,240.25

Fig. 61

GEOTAGE AREA

MONITORED SITE

MESH NETWORK UTILIZING 802.15.4 COMMUNICATING
THOUGH MESH NODES IN PROXIMITY

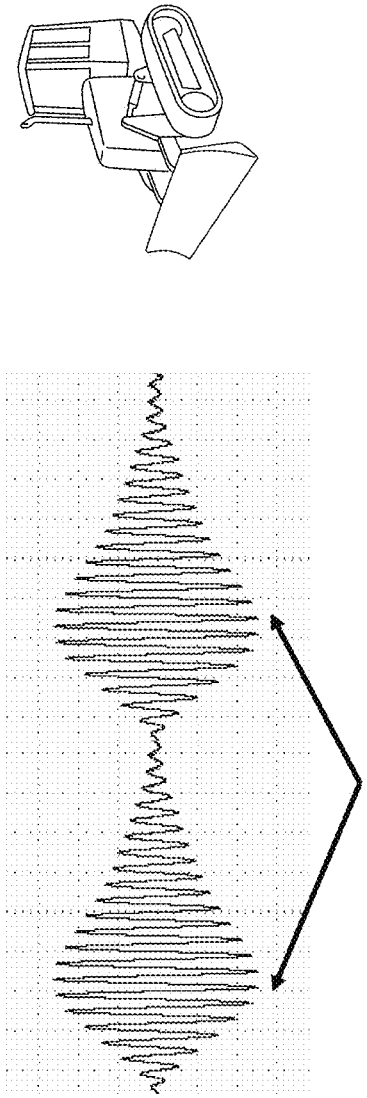

Table 1

AMPLITUDE, PATTERNS, SHAPE AND HF NOISE CAN BE RECOGNIZED FOR THE FOLLOWING:

| PATTERN RECOGNITION | HF NOISE | AMPLITUDE | COMPOSITE WAVELET | ATTITUDE | TIME | COMMENTS |
|---|---|---|---|---|---|---|
| FORWARD | WEAR LEVEL | WEAR LEVEL | FUTURE | WORK LOAD | DISTANCE | DISTANCE AT A GIVEN CONDITION = WEAR LEVEL |
| BACKWARD | WEAR LEVEL | WEAR LEVEL | FUTURE | WORK LOAD | DISTANCE | DISTANCE AT A GIVEN CONDITION = WEAR LEVEL |
| BEARING FAILURE | PATTERN | PATTERN | PATTERN | WORK LOAD | TIME FROM ID | RECOGNIZE PART FAILURE MODE |
| TRACK PRE-FAILURE | PATTERN | PATTERN | PATTERN | WORK LOAD | TIME FROM ID | RECOGNIZE PART FAILURE MODE |
| WORK LOAD | RANGE | RANGE | FUTURE | ANGLE & TIME | ANGLE & TIME | ATTITUDE, DISTANCE AND WEAR RANGE |
| WEAR ENVIRONMENT | TIME OF WEAR | TIME OF WEAR | FUTURE | WEAR WEIGHTING | WEAR WEIGHTING | WEAR WEIGHTING, MEDIA, MOISTURE, OP RANGE, DISTANCE, ATTITUDE |
| MOISTURE LEVEL | DAMPENING | DAMPENING | DAMPENING | PATTERN | TIME IN MOISTURE LEVEL | WEAR CHARACTERISTICS AND WEIGHTING CONTRIBUTOR |
| MEDIA TYPES | MEDIA TYPE | MEDIA TYPE | MEDIA TYPE | MEDIA MODIFIER | TIME IN MEDIA | TERRAIN AND MEDIA CONDITIONS |
| NORMAL OP LEVELS | RANGE | RANGE | CHARACTERISTICS RANGE | CONDITION | OPERATION WITHIN AND OUTSIDE OF OP RANGE | FLAG OPERATING CONDITIONS FOR ABNORMAL OPERATING CONDITIONS |

Fig. 77

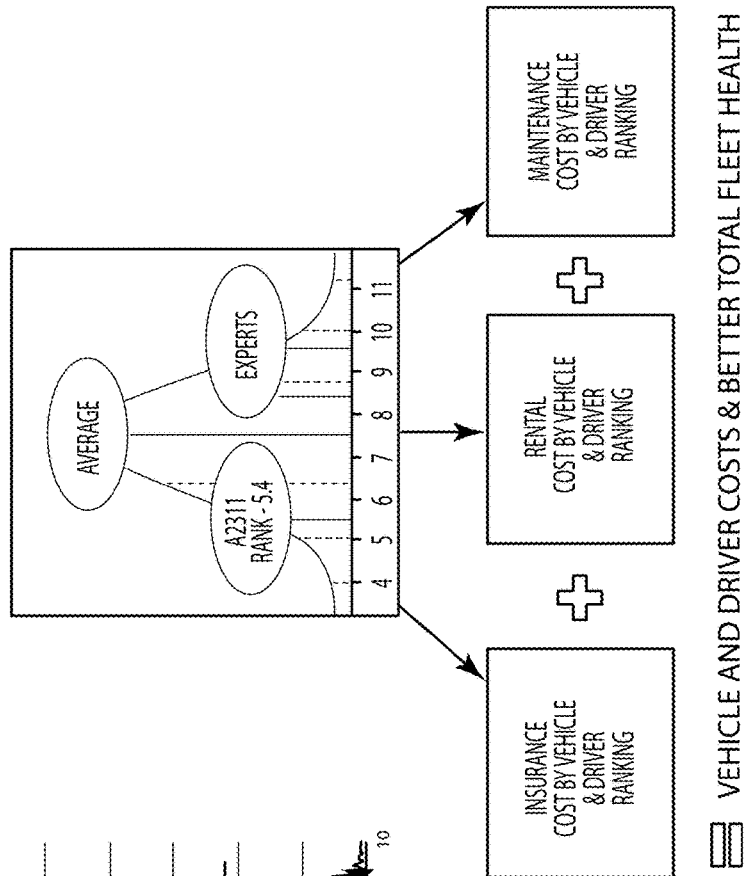
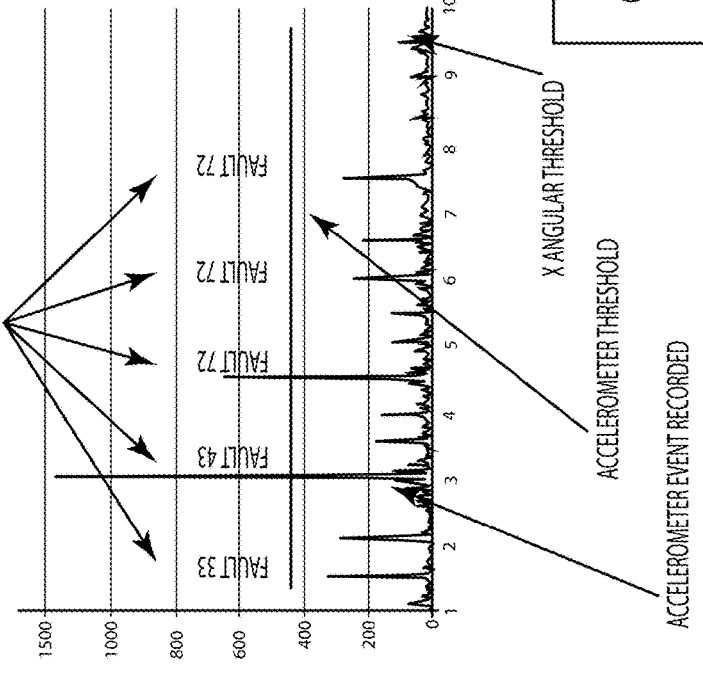
Fig. 89

| Measurement Criteria | Best | Score | Weighting 0=Best 10=Worst |
|---|---|---|---|
| Fault code frequency (2 every 40 Hrs) | 10 | 3 | (0-10) |
| Fault code group weighting (high RPM) | 10 | 2 | (0-10) |
| Avg. Accelerometer Speed Fwd. (>Max) | 20 | 3 | (0-20) |
| Avg. Accelerometer Speed Rev. (> Max) | 20 | 14 | (0-20) |
| Avg. Accelerometer Events (> Threshold) | 20 | 12 | (0-20) |
| Avg. Angular Events (> XYZ Threshold) | 20 | 12 | (0-20) |
|  | 100 | 46 |  |
| Formula (BEST-SCORE)*.1 = FSCORE |  | 54 | 5.4 |

*Weightings can have multipliers or be shifted based on system impact*

Fig. 91

| Code | Description |
|---|---|
| 11 | Variable Speed Governor Sensor Voltage Low |
| 11 | Variable Speed Governor Switch System Not Responding |
| 12 | Variable Speed Governor Sensor Voltage High |
| 13 | Coolant Level Sensor Input Voltage Low |
| 13 | Add Coolant Level Sensor Input Voltage Low |
| 14 | Intercooler Coolant Temperature Sensor Input Voltage High |
| 14 | Coolant Temperature Sensor Input Voltage High |
| 14 | Oil Temperature Sensor Input Voltage High |

| Code | Description |
|---|---|
| 41 | Too Many SRS (missing TRS) |
| 43 | Coolant Level Low |
| 44 | Coolant Temperature High |
| 44 | Oil Temperature High |
| 45 | Oil Pressure Low |
| 45 | High Range Oil Pressure Low |
| 46 | ECM Battery Voltage Low |
| 46 | RTC Backup Battery Voltage Low |

Fig. 92A

| | | | |
|---|---|---|---|
| 16 | Intercooler Coolant Temperature Sensor Input Voltage Low | 46 | Sensor supply Voltage Low |
| 15 | Coolant Temperature Sensor Input Voltage Low | 47 | Fuel Pressure High |
| 15 | Oil Temperature Sensor Input Voltage Low | 47 | Turbo Boost Pressure High |
| 16 | Coolant Level Sensor Input Voltage High | 47 | Air Inlet Pressure High |
| 16 | Add Coolant Level Sensor Input Voltage High | 47 | Injection Control Pressure High |
| 17 | Throttle Plate Position Sensor Input Voltage High | 47 | High Range Fuel Pressure High |
| 17 | Throttle Position Sensor Input Voltage High | 48 | High Range Fuel Pressure Low |
| 18 | Bypass Position Sensor Input Voltage Low | 48 | Fuel Pressure Low |
| 18 | Throttle Plate Position Sensor Input Voltage Low | 48 | Air Inlet Pressure Low |
| 21 | Throttle Position Sensor Input Voltage High | 48 | EGR Temperature Low |
| 22 | Throttle Position Sensor Input Voltage Low | 48 | EGR Delta Pressure Low |
| 23 | Fuel Temperature Sensor Input Voltage High | 48 | Injection Control Pressure Low |
| 23 | Oxygen Content Circuit Input Voltage High | 52 | A/D Conversion Fail |
| 24 | Fuel Temperature Sensor Input Voltage Low | 53 | Nonvolatile Checksum Incorrect |
| 24 | Oxygen Content Circuit Input Voltage Low | 53 | EEPROM Write Error |
| 25 | Reserved for "No Codes" | 53 | Out of Calibration |
| 26 | Aux. Shutdown #1 Active | 54 | Vehicle Speed Sensor Fault |
| 26 | Aux. Shutdown #2 Active | 55 | Other ECU Fault |
| 27 | Air Temperature Sensor Input Voltage High | 55 | J1939 Data Link Fault |

Fig. 92B

| Code | Description |
|---|---|
| 27 | Intake Manifold Temperature Sensor Input Voltage High |
| 28 | Ambient Air Temperature Circuit Failed Low |
| 28 | Air Temperature Sensor Input Voltage Low |
| 28 | Intake Manifold Temperature Sensor Input Voltage Low |
| 31 | Aux. Output #4 Open Circuit (High Side) - T3 |
| 32 | SEL Short to Battery (+) |
| 34 | Turbo Boost Pressure Sensor Input Voltage Low |
| 36 | High Range Oil Pressure Sensor Input Voltage Low |
| 38 | Fuel Pressure Sensor Input Voltage Low |
| 39 | EGR Valve Not Responding |

| Code | Description |
|---|---|
| 56 | Proprietary Data Link Fault (Receiver) |
| 57 | J1922 Data Link Fault |
| 61 | Injector xxx Response Time Long |
| 62 | Aux. Output #1 Open Circuit - F3 |
| 62 | Aux. Output #2 Open Circuit - A2 |
| 62 | Aux. Output #5 Open Circuit - W3 |
| 62 | Aux. Output #6 Open Circuit - X3 |
| 62 | Aux. Output #7 Open Circuit - Y3 |
| 62 | Aux. Output #8 Open Circuit - A1 |
| 62 | Aux. Output #2 Mechanical System Not Responding Properly - A2 |

| Code | Description |
|---|---|
| 63 | PWM #4 Open Circuit |
| 63 | PWM #1 Above Normal Range |
| 63 | PWM #1 Below Normal Range |
| 63 | PWM #2 Above Normal Range |
| 63 | PWM #2 Below Normal Range |
| 63 | PWM #3 Above Normal Range |
| 63 | PWM #3 Below Normal Range |
| 63 | PWM #4 Above Normal Range |
| 63 | PWM #4 Below Normal Range |
| 64 | Turbo Speed Sensor Input Failure |
| 64 | Turbo Overspeed |

| Code | Description |
|---|---|
| 73 | Aux Analog Input #1 Voltage Low (ESS Transmission) |
| 73 | Gas Valve Position Above Normal Range |
| 73 | Gas Valve Position Below Normal Range |
| 73 | Gas Valve Position Input Voltage High |
| 73 | Gas Valve Position Input Voltage Low |
| 73 | Gas Metering Valve Not Responding |
| 73 | Air Filter Restriction High |
| 74 | Oil Filter Restriction High |
| 74 | Optimized Idle Safety Loop Short to Ground |
| 75 | ECM Battery Voltage High |
| 75 | RTC Backup Battery Voltage High |

Fig. 92C

| | | | |
|---|---|---|---|
| 65 | Throttle Plate Position Above Normal Range | 75 | Sensor Supply Voltage High |
| 65 | Throttle Plate Position Below Normal Range | 76 | Engine Overspeed With Engine Brake |
| 65 | Throttle Plate Position Erratic | 77 | Cylinder Head Temperature Above Range |
| 65 | Throttle Plate Not Responding | 77 | Extended Range Oil Pressure Above Range |
| 65 | Air Filter Restriction Sensor Voltage High | 77 | Extended Range Coolant Pressure Above Range |
| 65 | Air Filter Restriction Sensor Voltage Low | 77 | Bypass Blower Door Position Above Range |
| 66 | Engine Knock Level Above Normal Range | 77 | Bypass Blower Door Position Below Range |
| 66 | Engine Knock Level Sensor Input Voltage High | 77 | Pump Pressure Below Range |
| 66 | Engine Knock Level Sensor Input Voltage Low | 77 | Exhaust Back Pressure Above Range |
| 66 | Engine Knock Level Sensor Not Responding | 77 | Exhaust Back Pressure Below Range |
| 66 | Oil Filter Restriction Sensor Voltage High | 77 | Exhaust Back Pressure Failed High |
| 66 | Oil Filter Restriction Sensor Voltage Low | 77 | Exhaust Back Pressure Failed Low |
| 67 | Coolant Pressure Sensor Input Voltage High | 77 | Exhaust Back Pressure at Rampdown Threshold |
| 67 | Coolant Pressure Sensor Input Voltage Low | 77 | Fuel Filter Differential Pressure Below Range |
| 67 | Air Inlet Pressure Sensor Input Voltage High | 77 | Oil Filter Differential Pressure Below Range |
| 67 | Air Inlet Pressure Sensor Input Voltage Low | 77 | Engine Oil Pressure Above Range |
| 67 | High Range Coolant Pressure Sensor Input Voltage High | 77 | Turbo Boost Pressure Below Range |
| 67 | High Range Coolant Pressure Sensor Input Voltage Low | 77 | Inlet Manifold Temperature Below Range |
| 68 | TPS Idle Validation Circuit Fault (short to ground) | 77 | Air Filter Differential Pressure Below Range |
| 68 | TPS Idle Validation Circuit Fault (open circuit) | 77 | Barometric Pressure Above Range |
| 71 | Injector xxx Response Time Short | 77 | Barometric Pressure Below Range |
| 72 | Vehicle Overspeed | 77 | Coolant Pressure Above Range |

Fig. 92D

| | |
|---|---|
| 77 | Coolant Temperature Below Range |
| 77 | Coolant Level Above Range |
| 77 | Ambient Air Temperature Above Range |
| 77 | Ambient Air Temperature Below Range |
| 77 | Air Inlet Temperature Below Range |
| 77 | Fuel Temperature Above Range |
| 77 | Fuel Temperature Below Range |

| | |
|---|---|
| 72 | Vehicle Overspeed (Absolute) |
| 72 | Oxygen Content Too High |
| 72 | Oxygen Content Too Low |
| 73 | ESS Transmission Stuck in Gear |
| 73 | Transmission Neutral Switch Failure (ESS Transmission) |
| 73 | Aux Analog Input Data Erratic, Intermittent, or Incorrect (ESS Transmission) |
| 73 | Aux Analog Input #1 Voltage High (ESS Transmission) |

Fig. 92E

Glossary of Acronyms

| | | | |
|---|---|---|---|
| ABS | Anti-lock Braking System | IRIS | InfraRed Information System |
| ACLS | Add Coolant Level Sensor | ISD | Idle Shutdown |
| ACS | Application Code System | LSG | Limiting Speed Governor |
| ACPS | Air Compressor Pressure Sensor | OEM | Original Equipment Manufacturer |
| AFRS | Air Filter Restriction Sensor | OI | Optimized Idle |
| AIM | Auxiliary Interface Module | OLS | Oil Level Sensor |
| ATI | Aux Timed Input | OPS | Oil Pressure Sensor |
| ATS | Air Temperature Sensor | OTS | Oil Temperature Sensor |
| CEL | Check Engine Light | MAS | Maintenance Alert System |
| CFPS | Common Rail Fuel Pressure Sensor | MPG | Miles Per Gallon |
| CLS | Coolant Level Sensor | MPH | Miles Per Hour |
| CPS | Coolant Pressure Sensor | MID | Message IDentification Character |
| CTS | Coolant Temperature Sensor | MUI | Mechanical Unit Injector |

Fig. 93A

| | |
|---|---|
| DDR | Diagnostic Data Reader |
| DRS | DDEC Reprogramming System |
| ECM | Electronic Control Module |
| EDM | Electronic Display Module |
| EFC | Electronic Fire Commander |
| EFPA | Electronic Foot Pedal Assembly |
| EEPROM | Electronically Erasable Programmable Read Only Memory |
| EOP | Engine Over Temperature Protection |
| ESH | Engine Sensor Harness |
| ESS | Engine Synchro Shift |
| ETS | Exhaust Temperature Sensor |
| EUI | Electronic Unit Injectors |
| EUP | Electronic Unit Pump |
| FEI | Fuel Economy Incentive |
| FMI | Failure Mode Identifier |
| FPS | Fuel Pressure Sensor |
| FRS | Fuel Restriction Sensor |
| FTS | Fuel Temperature Sensor |
| HEI | Half Engine Idle |
| ICPS | Intercooler Coolant Pressure Sensor |
| ICTS | Intercooler Coolant Temperature Sensor |

| | |
|---|---|
| PGN | Parameter Group Number |
| PID | Parameter Identification Character |
| PTO | Power Take-off |
| PSG | Pressure Sensor Governor |
| PVM | Pulse to Voltage Module |
| PW | Pulse Width |
| PWM | Pulse Width Modulated |
| SEL | Stop Engine Light |
| SEO | Stop Engine Override |
| SRS | Synchronous Reference Sensor |
| SID | Subsystem Identification Character |
| TBS | Turbo Boost Sensor |
| TDC | Top Dead Center |
| TPS | Throttle Position Sensor |
| TRS | Timing Reference Sensor |
| VEPS | Vehicle Electronic Programming System |
| VIH | Vehicle Interface Harness |
| VIN | Vehicle Identification Number |
| VSG | Variable Speed Governor |
| VSL | Vehicle Speed Limiting |
| VSS | Vehicle Speed Sensor |

Fig. 93B

LATERAL ACCELERATION AND LONGITUDINAL
\ACCELERATION DETECTION $$\begin{cases} \mathbf{A}_{xh} = \mathbf{A}_x \cos\theta_z \\ \mathbf{A}_{yh} = \mathbf{A}_y \cos\theta_y \end{cases}$$

$$|\mathbf{A}_I| = \sqrt{|\mathbf{A}_{xh}|^2 + |\mathbf{A}_{yh}|^2} \quad \begin{cases} \alpha = \arccos(\mathbf{A}_{xh}/|\mathbf{A}_I|) \\ \beta = \arccos(\mathbf{A}_{yh}/|\mathbf{A}_I|) \end{cases}$$

$$\begin{cases} \mathbf{A}_{lat} = \mathbf{A}_{xh} \sin\alpha + \mathbf{A}_{yh} \sin\beta \\ \mathbf{A}_{lon} = \mathbf{A}_{xh} \cos\alpha + \mathbf{A}_{yh} \cos\beta \end{cases}$$

Fig. 95

Wavelet Modulus Maxima

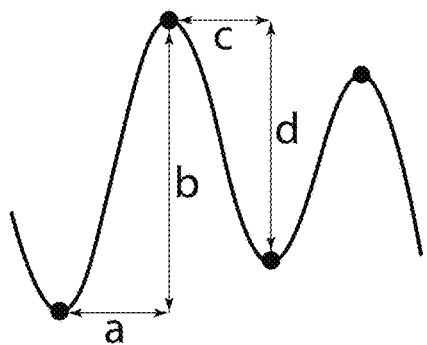

$$[\alpha_1 \ \beta_1 \ \gamma_1 \ \delta_1] = [f(a,c) \ f(c,a) \ f(b,d) \ f(d,b)]$$

Fig. 96

CONFIGURABLE MONITOR AND PARTS MANAGEMENT SYSTEM

BACKGROUND OF THE INVENTION

Some embodiments of the present invention relate to heavy duty equipment. The costs to operate and maintain heavy duty equipment can be expensive. Further, downtime of heavy duty equipment can be a key factor in the costs associated with heavy equipment. Maintaining well-organized and well-oiled equipment can help ensure safety and keep costs at a reasonable level.

Tracking hours of use of heavy equipment and where heavy equipment travels during use can provide assistance in service and maintenance of heavy equipment—it can also help reduce the costs, for example the cost per ton of mining can be lowered in some situations.

Although advanced GPS tracking and telematics monitoring has been installed on many pieces of heavy duty equipment, these units are expensive, difficult to install, and difficult to use.

Further, these systems do not enable tracking of work tools that are used in connection with heavy duty equipment. For example, there are a multitude of different larger work tools that can couple to heavy duty equipment such as augers, backhoes, bale spears, blades, brooms, brush cutters, buckets, cold planers, compactors, couplers, forks, grapplers, rakes, saws, shears, snow blowers, stump grinders, tillers, trenchers, and booms to name a few. There are also a multitude of different smaller work tools or assets used in managing a business, such as concrete saws, laser levels and even tool boxes. These work tools can be easily misplaced on a job site or a dealer lot.

Although some heavy duty equipment have engine control modules or other systems for interfacing with a telematics or monitoring system, a large portion of the heavy duty equipment market does not have such an integrated system. However, heavy equipment is surrounded by mobile technologies and people utilizing these technologies.

In the past world of heavy equipment we have seen many attempts to couple and associate equipment with vehicles. Typically this is only for the more expensive devices, as the cost was high. Wires and computers have been used to connect, control and associate one device to another. The problem with some of the past solutions was that they exposed connections and required connections or specific alignment. RFID is a solution for these types of associations but also require a sensitive coil to be exposed without protective metal cover to allow RF energy to transfer through the air. This leaves a more venerable material like plastic to be exposed with earth and metal contact. This exposure to failure makes this a less than favorable solution and requires specific proximity. The key problem is to have a physical entity that moves and informing associations through that movement and a communications link. Upon solving this problem we have seen many new innovation possibilities for this intrinsic recognition of association.

Some embodiments of the present invention also relates to Internet of Things ("IOT") device connections and interactions. One problem is how IOT devices can recognize machine and social interactions that are possible within this ecosystem. Utilizing machine access control ("MAC") addresses that each IOT device can have its own identifier ("ID"), but the MAC address does not define the IOT device, and does not define the capabilities of the IOT device.

Some known IOT devices are configured for a specific user. These systems may utilize specific identification credentials or pairing criteria for interactions within the computer communications protocol. One problem with this approach is that there is a greater ecosystem of communications available for these devices and for these users. Even if a social network layer of communications is capped at an unsecured level of communications for interconnecting these devices, vehicles, work tools and people it can be valuable within the network or ecosystem of interactions for these devices and for organizations attempting to understand how these devices are being used and how interactions are taking place within a network.

Another issue with known IOT devices is that within a network only specific interconnection or network uplinks are allowed and these are preprogrammed from identification and user configured.

SUMMARY OF THE INVENTION

The present invention provides components and a system for identifying, tracking and recording heavy-duty vehicle operation events and, as a function of these events, generating outputs that may alter vehicle operation, determine and predict areas of wear on the vehicle, provide instructions and rating scores for individual vehicle operators, locate and track vehicles and work tools within an inventory or fleet, and enable the ordering of replacement parts for those indicated as missing or worn.

In one embodiment, the system includes storing a plurality of patterns representing heavy duty vehicle operation events in memory, affixing an HDi monitor to a heavy-duty vehicle, operating the heavy-duty vehicle over time, collecting sensor data with the HDi monitor as the heavy-duty vehicle is operated, and identifying a heavy-duty vehicle operation event by comparing the sensor data with the plurality of patterns stored in memory. The HDi monitor may include one or more housings mounted to the heavy-duty vehicle, or a vehicle work tool, with at least one sensor, such as an accelerometer, and at least one transceiver disposed within the housing. The sensor data may include vibration data and the method may include analyzing the vibration data to track wear associated with a heavy-duty vehicle wear part.

In one embodiment, the method may include providing vehicle operator coaching related to a heavy-duty vehicle operation event based on identifying that heavy-duty vehicle operation event. For example, an HDi monitor may communicate with a mobile device carried by the operator, and may associate the operator with the vehicle type when the operator operates or comes into proximity with the vehicle. Upon identifying a particular vehicle event associated with the operator, the HDi monitor may function to send one or more instructions to the operator's mobile device to enable the operator to properly correct the event or operate the specific vehicle. The HDi monitor may further function to control one or more parameters of the vehicle, or to control operation of a particular work tool attached to the vehicle, upon identification of an event or upon associating the operator with the vehicle.

The system may additionally include calculating an operator rating based on one or more events identified on the vehicle and associated with a particular operator. In one embodiment, an HDi monitor may include a controller (or may communicate with a controller that is remote from the HDi) and may include stored data relating to scoring for one or more specific vehicle operations. As the operator operates the vehicle over time, a collection of data relating to the events identified during the operators operation of the vehicle are compared to the stored scoring data to provide the operator or the vehicle owner with an operator score for the vehicle or a series of vehicles associate with the operator.

In another embodiment, the system may associate a heavy-duty vehicle and a work tool using sensor data such as accelerometer or vibration data. For example, an HDi monitor can be affixed to a work tool that is or will be installed on the heavy-duty vehicle. The heavy-duty vehicle and the work tool can be associated based on a comparison of the sensor data from the HDi monitor affixed to the heavy-duty vehicle and the sensor data from the HDi monitor affixed to the work tool. In this way, the system can detect whether a work tool is installed to a particular heavy-duty vehicle. The system can also detect whether there is an issue with the installation, for example, if the work tool is not installed properly on the heavy-duty vehicle.

The system may track wear of a work tool or work part based on the sensor data. For example, an accumulator can track the number of a variety of different heavy-duty vehicle operations. A work tool's or work part's status can be predicted based on the accumulated number of heavy-duty vehicle operations. For example, a scoop may have a pre-defined number of digs before replacement is recommended. The accumulator can also attribute a wear value to each vehicle operation, for example, certain digs may attribute less wear than other digs. Empirical data can be collected and compared to actual sensor data to differentiate the amount of wear attributable to a vehicle operation. In embodiments where the heavy-duty vehicle or work tool are associated with a user, wear of the work tool or a wear part can be attributed in a user profile for vehicle operations conducted by the user.

Heavy-duty vehicle operation events can include a variety of different events such as, for example, heavy-duty vehicle movement events, heavy-duty vehicle work tool events, environment events, and shock events. For example, a heavy-duty vehicle work tool event may include digging with a work tool attached to the heavy-duty vehicle, moving the heavy-duty vehicle, or turning a turret of a heavy-duty vehicle. Shock and tip-over events can be triggered by a pattern of sensor data outside of normal operating ranges for a particular heavy-duty vehicle operation.

In one embodiment a plurality of HDi monitors can be affixed to a fleet of heavy-duty vehicles and work tools. Sensor data for the fleet of heavy-duty vehicles can enable additional functionality. For example, the sensor data can provide fleet vehicle data, maintenance data, usage information data, and location data that can be utilized by a fleet management application.

HDi monitors in the system can include one or more communication systems for communicating with other HDi monitors in the system. One communication system may be utilized for intra-vehicle communication and a different communication system may be utilized for external communication, for example with other heavy-duty vehicles, an application on a user's smart device, or a remote server. In one embodiment, a social mesh protocol enables the system to know what other devices and communication types are available within the network. In one embodiment a pre-authentication mode such as the advertising mode in BLTE enables communication between and among Bluetooth devices about the status and metrics collected by various devices in the network. In this way, devices in the heavy duty social mesh network can communicate quickly and without authentication.

Additional HDi sensors can be affixed to various wear parts and other components in the system. For example, sensors can be included on the oil filter, various wear surfaces, and in the filter system to provide sensor data regarding various aspects of the heavy-duty vehicle.

In one embodiment, moveable equipment, such as a heavy-duty vehicle can have a plurality of work tools selectively physically coupleable to the equipment and an accelerometry network can determine which, if any, of the work tools are physically coupled to the equipment. A primary accelerometer is affixed to the moveable equipment for collecting primary accelerometer data and secondary accelerometers are respectively affixed to the various work tools for collecting secondary accelerometer data. A controller can analyze the primary accelerometer data and the secondary accelerometer data to determine the physical coupling relationships between the work tools and the moveable equipment. For example, similar accelerometer data in a work tool accelerometer and the equipment accelerometer can indicate the work tool is installed to the equipment. The inverse can also be true, dissimilar accelerometer data in a work tool accelerometer and the equipment accelerometer can indicate the work tool is not installed to the equipment. A communication system can facilitate communication among the accelerometry network components including the accelerometers affixed to the work tools and equipment, and the controller.

In one embodiment an HDi monitor includes a semiconductor. The HDi includes a microprocessor, a memory including a non-volatile portion, a plurality of transceivers, an accelerometer, a gyroscope, and a wireless power management system for charging and powering the HDi monitor. One of the transceivers can be configured for short range communication and one of the transceivers can be configured for long range communication. The semiconductor can have a MEMS portion for addition of energy harvesting using motion. The semiconductor can have an energy harvesting power management system for managing multiple power input means. The semiconductor can have an input power supply that is designed to be low power and manage multiple power sources.

These and other objects, advantages, and features of the invention will be more fully understood and appreciated by reference to the description of the current embodiment and the drawings.

Before the embodiments of the invention are explained in detail, it is to be understood that the invention is not limited to the details of operation or to the details of construction and the arrangement of the components set forth in the following description or illustrated in the drawings. The invention may be implemented in various other embodiments and of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components. Any reference to claim elements as "at least one of X, Y and Z" is meant to include any one of X, Y or Z individually, and any combination of X, Y and Z, for example, X, Y, Z; X, Y; X, Z; and Y, Z.

BRIEF DESCRIPTION OF THE DRAWINGS

FIG. 5 illustrates an embodiment of an HDi monitor with a cabin dust sensor installed within a filter system.

FIG. 7 illustrates an example of a slave unit using RFID.

FIG. 15 illustrates a block diagram of RF signal harvesting.

FIG. 16 shows one embodiment of a driver scoring formula.

FIG. 17 shows a screenshot of video performance of an excavator digging along with the accelerometer data associated with that operation.

FIG. 18 shows one embodiment of a score card for tracking a total vehicle experience.

FIG. 25 illustrates an exemplary state classification.

FIG. 26 illustrates one embodiment of a confusion matrix showing correctly and incorrectly classified states.

FIG. 33 shows a screenshot of driver ranging.

FIG. 34 shows a screenshot of warranty and non-warranty wear of assets in inventory as a factor or time of use and type of use.

FIG. 35 shows configurations of an HDi and IOTs in a network

FIG. 36 shows an HDi solutions matrix.

FIG. 50 shows another method to capture, save and transfer sample data.

FIGS. 51A and 51B show a scoring method with the time and amplitude minimum and maximum values for the window for each peak.

FIG. 52 shows one example of the difference in the monitored data and the range of acceleration operation.

FIG. 57 shows one embodiment of a portion of a mesh protocol that defines the identifier that details an interaction.

FIG. 59 shows one embodiment of a Heavy Duty Interactive ("HDi") monitor with some of the related features and sub-systems to transfer and relay information to other nodes within the network.

FIG. 61 shows some of the benefits from tracking these machine and social events by automatically building out a billing worksheet.

FIG. 77 shows an example of how sound and ultrasonic sensors can be used to monitor patterns and general operation.

FIG. 89 shows a graph for tracking accelerometer activity over time with telematics fault codes and use data.

FIG. 91 shows a measurement scoring criteria chart.

FIGS. 92A-E show exemplary codes and descriptions for use with an HDi system.

FIGS. 93A-B show a glossary of acronyms.

FIG. 95 shows formulas for lateral acceleration and longitudinal acceleration detection.

FIG. 96 shows wavelet modulus maxima.

DESCRIPTION OF THE CURRENT EMBODIMENT

Figure 1:
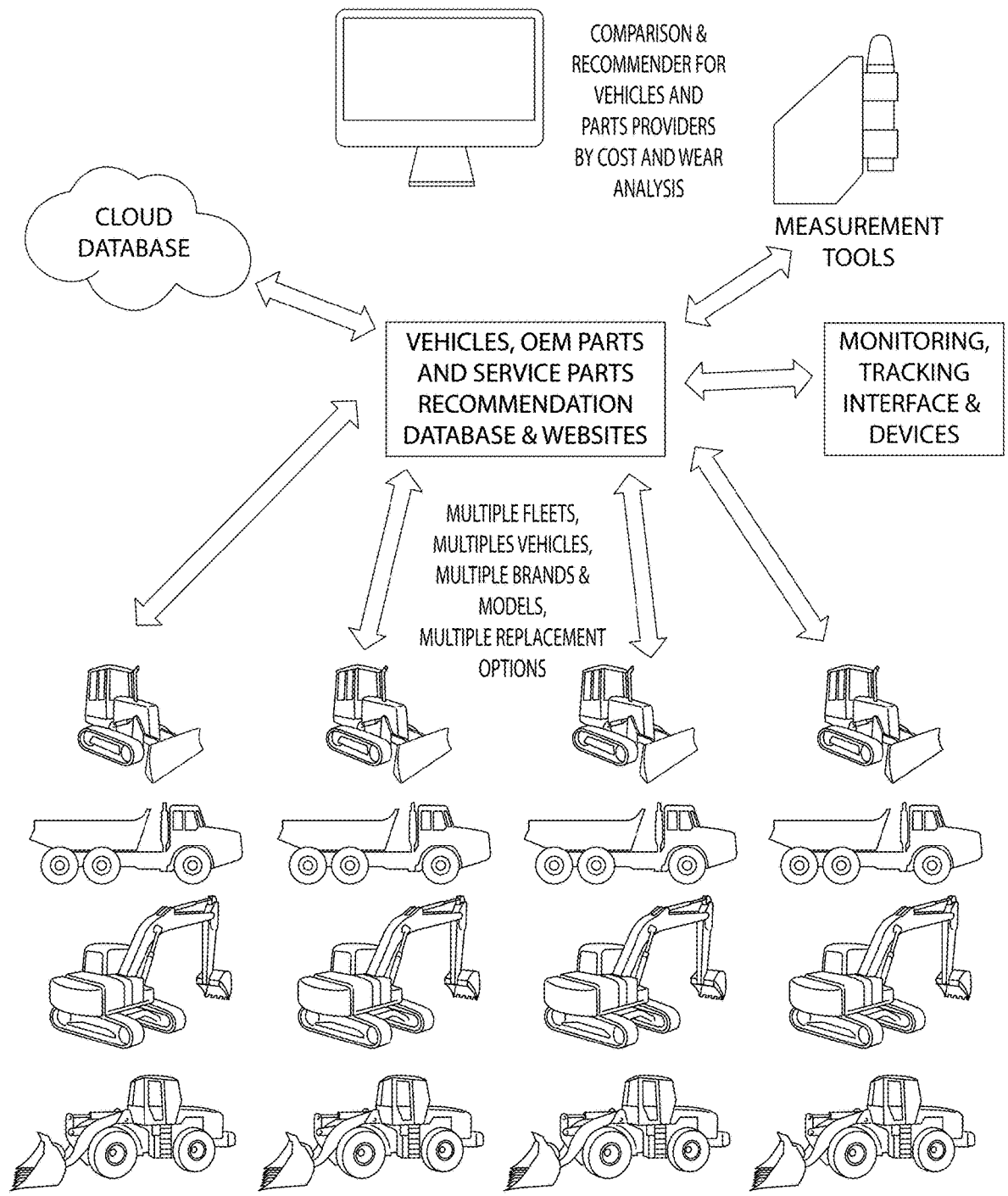
FIG. 1 illustrates one embodiment of a system for comparison and recommender for vehicles and parts providers by cost and wear analysis.

FIG. 1 illustrates one embodiment of a system for comparison and recommender for vehicles and parts providers by cost and wear analysis. The depicted embodiment includes vehicles, OEM parts and service parts recommendation database and website. This database can be populated with data from a variety of different sources including heavy duty equipment, devices installed on heavy duty equipment, or measurement tools used to collect various data about the heavy duty equipment. The collected information can be used to determine information about various wear parts in the heavy duty equipment. That information can be used to order new wear parts, automatically if desired by the user.

The system can include a measurement tool to collect wear data about heavy duty equipment, such as the measurement tool described in International Patent App. No. PCT/US2014/053321 to Steketee, entitled DETECTION SYSTEM, filed on Aug. 29, 2014, which is hereby incorporated by reference in its entirety.

The system can include a thermal management system for a portable electronic device such as the one described in U.S. Patent App. No. 62/104,241 to de Bock filed on Jan. 16, 2015 entitled THERMAL MANAGEMENT SYSTEM FOR A PORTABLE ELECTRONIC DEVICE, which is hereby incorporated by reference in its entirety.

The system can include a fleet management system such as the one described in U.S. Patent App. No. 62/103,706 to Steketee et al., filed on Jan. 15, 2015 entitled FLEET, EQUIPMENT AND MAINTENANCE INFORMATION MANAGEMENT SYSTEM, which is hereby incorporated by reference in its entirety.

The system can include components that communicate using a social mesh protocol, such as on the described in U.S. Patent Application 62/212,266 to Baarman et al., entitled MACHINE SOCIAL MESH AND INFORMATION MANAGEMENT SYSTEM filed on Aug. 31, 2015, which is hereby incorporated by reference in its entirety. Such a protocol can be used to allow interactions with other devices, for example a protocol may enable communications and inner action tracking.

Figure 2:
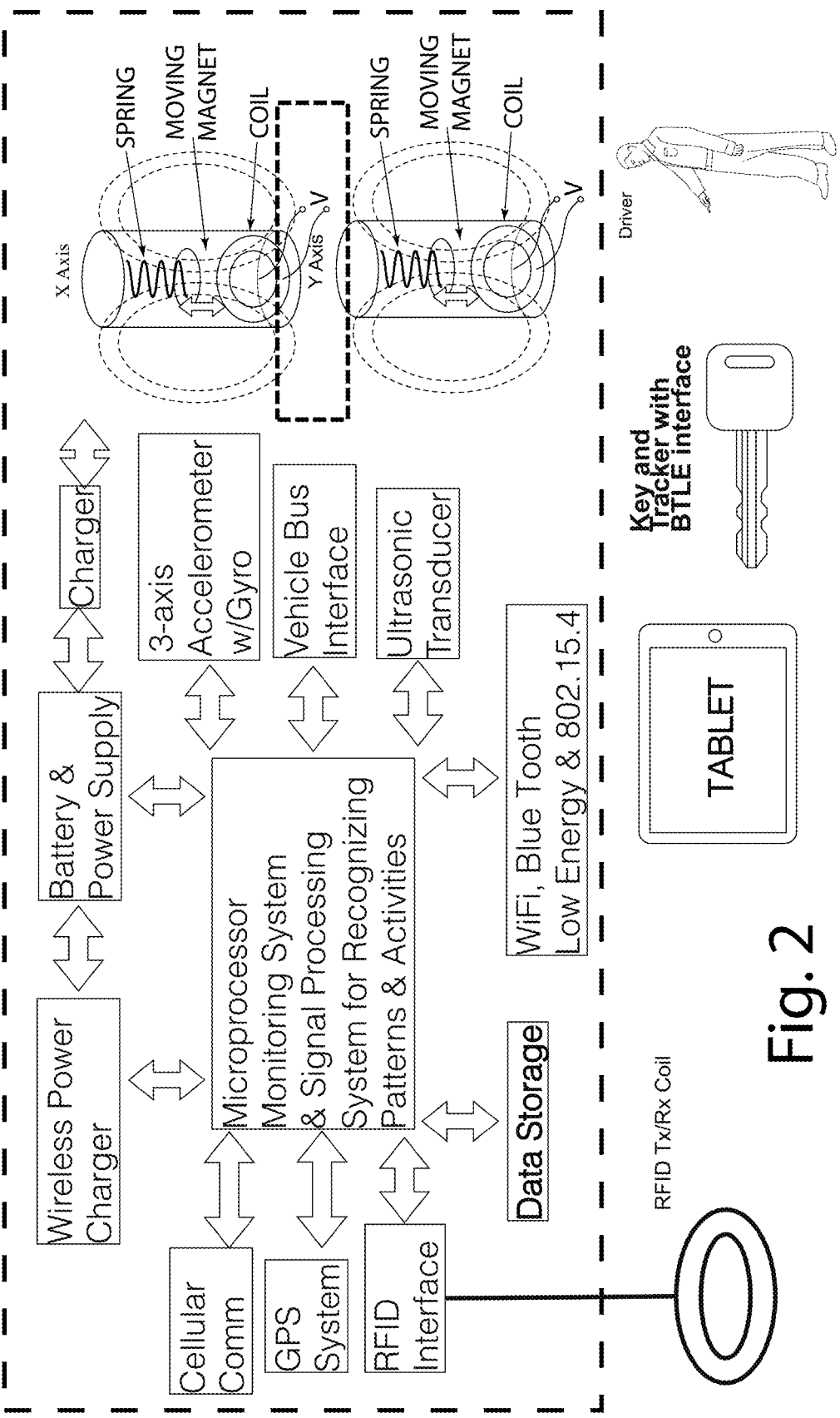
FIG. 2 illustrates one embodiment of an HDi monitor.

A configurable monitoring device located on heavy duty equipment can generally be referred to as a heavy duty interactive ("HDi") monitor. The terms HDi monitor and configurable monitor can be used interchangeably. One embodiment of an HDi monitor is illustrated in FIG. 2. This embodiment of an HDi monitor is a self-powered acceleration, location, driver ID, vehicle status and wear monitor. Other embodiments of HDi monitors may have different, additional, or less functionality.

An HDi system (or just HDi) can refer to a suite of cost effective sensors to connect customers with their machines, work tools, and parts. That is, an HDi system may include machines/vehicles, work tools, parts, and a plurality of HDi monitors that can be configured in a variety of different ways and may include a variety of different components. Although we show this monitor as an add-on device it could be incorporated into the vehicle and computer systems. This would provide the opportunity to utilize pressures, controls and engine sensors and diagnostics to enhance present performance and wear diagnostics. An add-on version is illustrated, but the system could be integrated with an engine control system, and in other sub systems to add additional monitoring and data value. The add-on version can be installed on vehicles while technology can also be added to present vehicles for the following added features.

In the embodiment depicted in FIG. 2, the HDi monitor includes a microprocessor monitoring system and signal processing system for recognizing patterns and activities, an RFID interface coupled to an RFID Tx/Rx coil, a GPS system, a cellular communication system, a wireless power charger, a battery and power supply, charging circuitry, a 3-axis accelerometer with a gyroscope, a vehicle bus interface, an ultrasonic transducer, and circuitry for communicating using WiFi, Bluetooth Low Energy & 802.15.4 protocols. Specifically a low power BTLE transceiver and a longer distance transceiver when needed. This design allows variable power consumption based on use case selection. The system may include a display and visual interface for a driver to interact with. For example, the driver can enter a user ID to rent more time, obtain training, provide feedback, or enter a maintenance mode. A kinetic energy harvesting unit can be included in the HDi. In the depicted embodiment, the kinetic energy harvesting unit is coupled to a charger circuit. One form of kinetic energy harvesting unit is a tuned weight, spring, and magnet that moves with the motion of the vehicle. When the magnet moves past the coil it produces energy. In an alternative embodiment, a piezoelectric harvester can replace or augment the kinetic energy harvesting unit. In an alternative embodiment a MEMS device can be used to harvest movement for energy and can be located on a chip form of the HDi.

Figure 3:
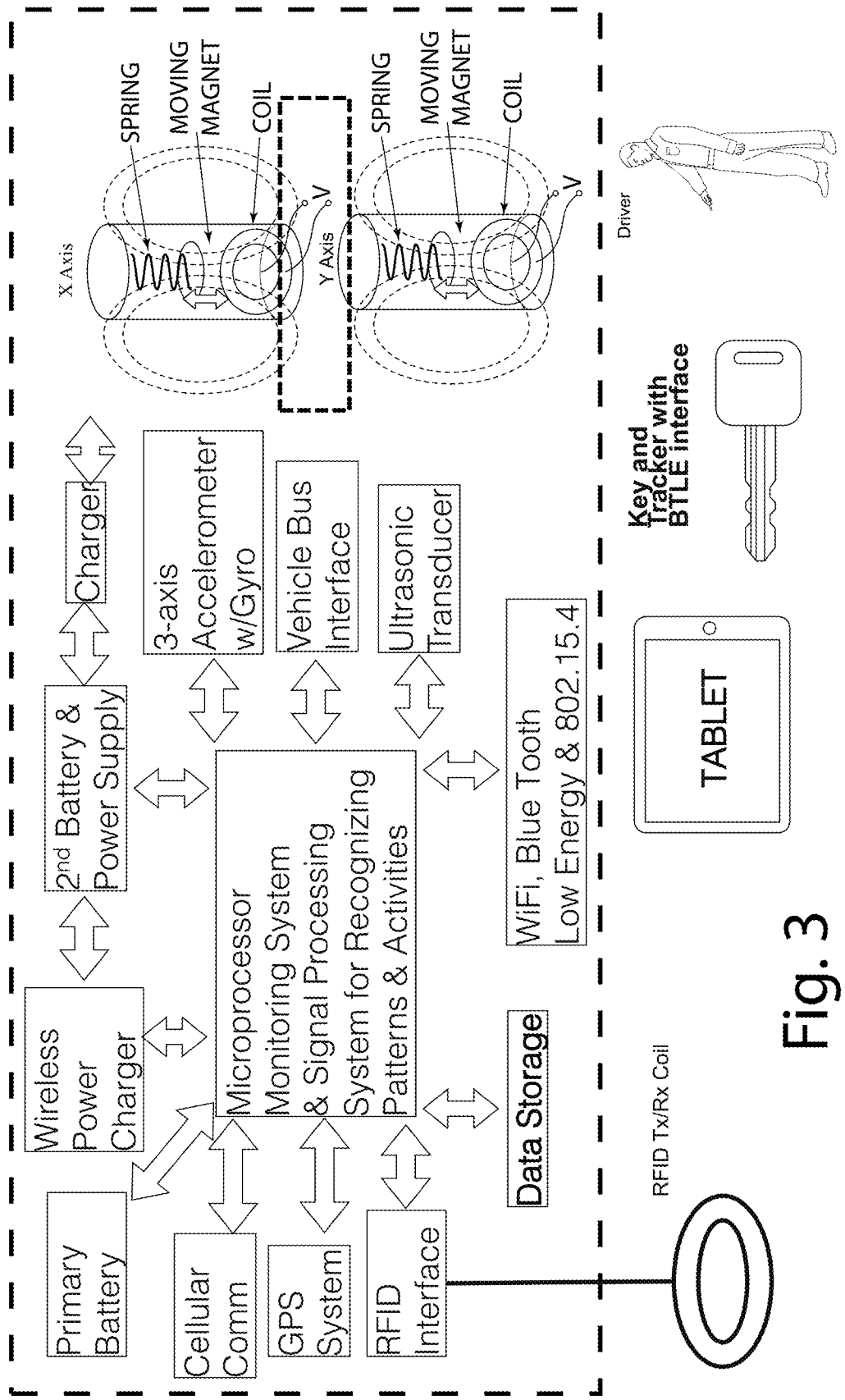
FIG. 3 illustrates another embodiment of an HDi monitor.

FIG. 3 illustrates another embodiment of an HDi monitor. This HDi monitor is similar to the HDi monitor shown in FIG. 2 except that it includes two batteries. The HDi monitor may be capable of receiving wireless power. In one embodiment, a primary battery of about 1500 mA hours can power the system for four to five years. In order to augment this or provide additional life, a system may include a secondary battery and charging methodologies utilized for energy harvesting. These methods can include harvesting hydraulic energy on heavy equipment by tapping into the fluid and steam turbine, and utilizing the vibrations in this equipment as a kinetic source of energy.

One aspect of the invention includes monitoring and analyzing operation and failure of heavy equipment. Heavy equipment may include a variety of different wear parts. Wear parts are parts that wear out over time and eventually need to be replaced. There are a variety of factors that can influence the rate of wear on a wear part. By monitoring and analyzing operation and failure of heavy equipment, the status and condition of wear parts can be tracked and verified.

One example of a wear part is an oil filter. An oil filter may be expected to filter a certain particulate for a period time in a typical situation. However, if that filter encounters an atypical situation, for example a higher than expected distribution of particulate over a period of time, the filter can wear out sooner than expected. This can cause issues throughout the heavy equipment.

Another example of a wear part is a wear surface such as an undercarriage part or other ground engaging surfaces for a work tool. An HDi can use an accelerometer to understand when a work tool has engaged the earth and can track hours of engagement to track wear of a wear surface. Although heavy-duty vehicles may track the time the machine is on, that data may not accurately reflect the actual usage or work time and level of use of a tool, vehicle, or device. Using the accelerometer data, additional information can be surfaced and allow discernment of these additional layers of information that can impact coaching, wear, service, maintenance and machine value.

One aspect of the invention enables dynamic wear part ordering based on the monitored status of heavy equipment. The dynamic nature of the system does not only relate to ordering wear parts dynamically, but also relates to operator performance, environmental conditions, and service interactions. This can take into consideration the rate of usage against the rate of decay of a given part to determine the timing needed in ordering and delivering on time replacements for service. Scheduling of that service is also a key outcome.

An HDi monitor can be configured in a various number of ways. For example, it can be configured as a cellular communications module that tracks a vehicle's GPS position, hours, events and operator performance. An HDi monitor can be configured at manufacture by selecting a certain set of components to include in the monitor. Alternatively, an HDi monitor can be configured at installation by enabling or disabling certain components in the HDi monitor. An HDi monitor can also be reconfigured in the field to enable features previously disabled or disable features previously enabled. In this way an HDi monitor can be configured for whatever application is desired and can be repurposed for a different application if the HDi includes the appropriate hardware.

One embodiment of a configurable monitor can be configured as a master communications module. This may be a vehicle of higher value or a strategic placement of a gate, tool crib or remote jobsite office. These master units can be selectively distributed amongst the other vehicles.

If heavy duty equipment already has built-in telematics capability, the HDi monitor can be connected to a vehicle CAN bus or a serial port to receive the telematics data. The telematics data can be pushed through an HDi monitor installed on the vehicle where additional features can be added.

This master communication module can be configured to communicate using a variety of different communication technologies including Bluetooth low energy, 802.15.4 and Wi-Fi. Communicating via multiple communication protocols unites the vehicle with a multitude of different devices, such as mobile communication devices and work tools. The 802.15.4 protocol provides a greater range than Bluetooth while Bluetooth provides universal access to mobile and computing devices. Wi-Fi (802.11) can be used to communicate and may also be used as a wireless power harvesting source of energy. Any of the 802 protocols may be used by a slave unit to harvest power and in return provide sensor data back to the master.

The master unit can control the flow of information. For example, the master unit can poll surrounding sensor units, which can provide data indicative of a vehicle's performance Performance can be monitored not only when the vehicle is on, but also when the vehicle is off. Transportation can be a key factor in monitoring health of a vehicle. For example, the number of miles a vehicle has traveled, the speed of travel, the frequency of travel, etc., can all be monitored and used to analyze the performance of the vehicle. Impact events while a vehicle is off may be a key contributor to wear part failure. The configurable monitor can monitor low power sensors located around the vehicle that return specific data, such as environmental or wear data. A weighting of environmental conditions, which can be collected by environmental sensors or user input, can be used to impact or modify the wear data collected. Accumulators of time operated in various environmental conditions can be used to modify the wear calculations.

A configurable monitor can be configured as a slave communication module. This can be stationary as an environmental sensor unit, an RFID reader, or mobile monitoring additional details of movement or reading attachment or filter RFID tags.

One embodiment of a slave communication module is a sensory unit. Sensory units can include one or more sensors that sense data and transmit that data to another device, such as a master communication module.

The sensory unit can include environmental sensors that sense environmental data. External air quality sensors and internal air quality sensors are examples of environmental sensors. This data can weight or modify the calculation for end of life of these filters and the related percentage of life display.

The sensory unit can include wear data sensors that sense wear data.

Figure 4:
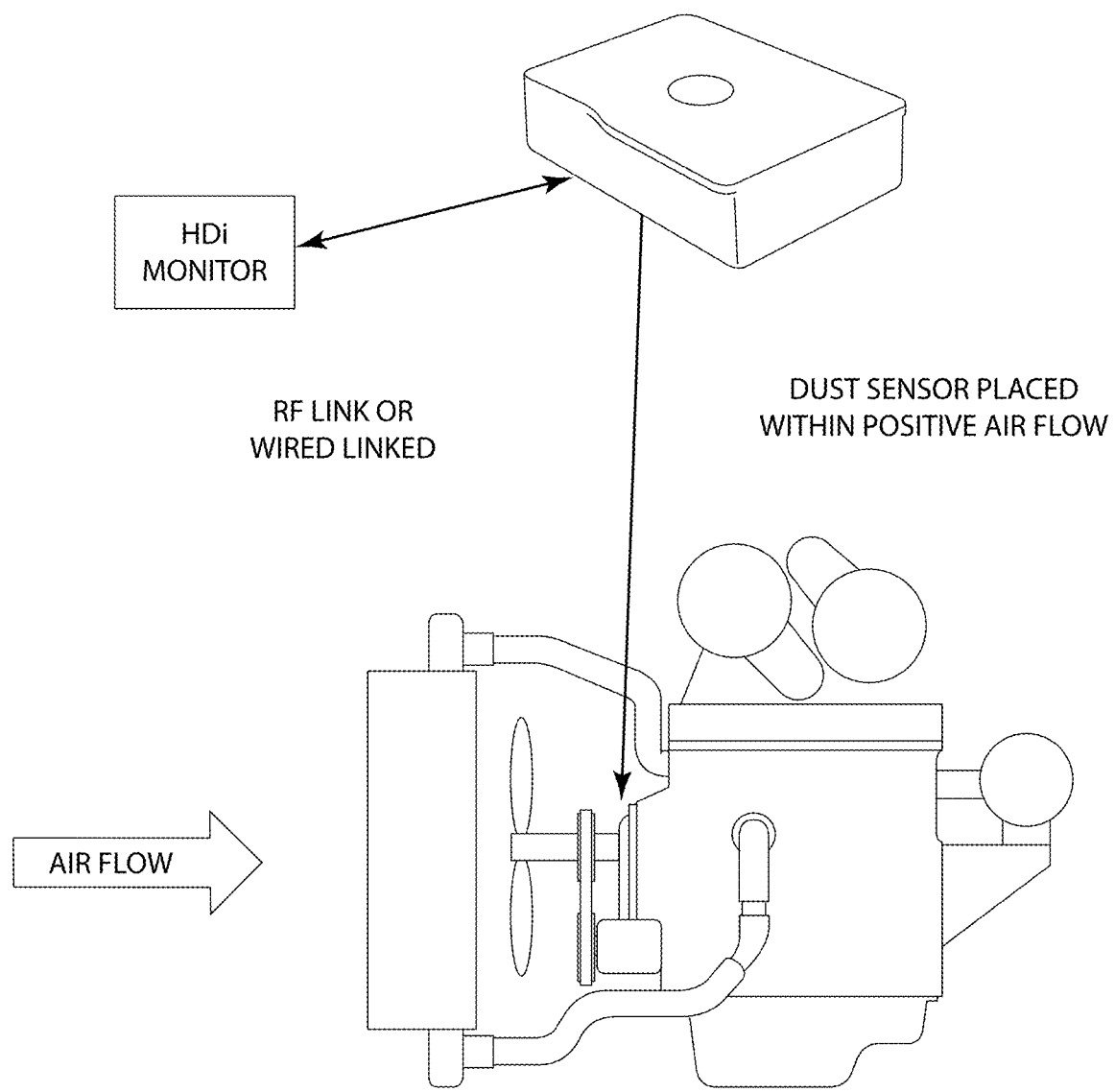
FIG. 4 illustrates an embodiment of an HDi monitor with a dust sensor installed within a filter system.

One embodiment of an HDi monitor is shown in FIG. 4 and FIG. 5. In these figures, sensors are illustrated gathering environmental data that can impact filter life or performance, or other sensor data.

By predicting consumable parts life changes, the system can implement automatic consumable order fulfillment based on assisted monitoring and prediction of life. For example, if the life of a consumable is different from an expected life, either more or less, a consumable order such as a fluid or filter order could be delayed or ordered sooner so that the consumable arrives close to the predicted end of life of that consumable.

FIG. 4 illustrates an embodiment of an HDi monitor with a dust sensor installed within a filter system. The HDi monitor with the dust sensor is installed in the positive air flow path. The HDi monitor with the dust sensor can communicate the data it collects to another HDi monitor.

FIG. 5 illustrates an embodiment of an HDi monitor with a cabin dust sensor installed within a filter system. The HDi monitor with the cabin dust sensor is installed in the cabin and can communicate the data it collects to another HDi monitor. The data collected can be used to make an air quality filter replacement prediction.

In one embodiment, a system can track driver related events related to environmental conditions and potential impact for safety.

In one embodiment, filter life can be adjusted based on environmental conditions.

In one embodiment, interior air quality monitor data can be compared to exterior air quality monitor data. The comparison can be used to determine how well the air filter is working and whether the air filter should be replaced.

The performance impact can be respiratory or visual as it relates to the operator. Monitoring the differential between the internal air quality and the external air quality provides a performance metric for cabin air quality. The data can be used to determine a correlation between air-quality and hours to filter replacement. This can be a dynamic tracking method utilizing various types of sensors to improve the quality of operation and the overall health of the vehicle.

An HDi monitor slave unit can be configured as a tool monitor. A tool monitor can be configured to perform a variety of different tasks such as communicating GPS position data and radio frequency identification. In one embodiment, RFID communication can be enabled simultaneously with 802.15.4 communication in order to maintain the same dynamic information associated with tag when the slave is queried by the master. The slave may be mounted on smaller tools that are co-located in a general area to the hub GPS location to allow a general radius. This can then be co-located closer between the low power and higher power transceivers locating slaves or nodes within a specific radius.

For example, an operator can communicate to HDi monitors around the work site to locate certain work tools or to determine what work tools are available and not currently in use. Put another way, the operator can determine what work tools that are disconnected from vehicles and the list of the available work tools associated with that vehicle and associated with an area for the identified job site.

Another example of a slave unit is a fleet manager seeking to understand inventory associated with a specific request by a prospective customer. In this situation, a request can be transmitted over the network and each work tool can report over the network its availability and position.

By tracking hours of each work tool in motion versus idle, maintenance can be scheduled based on hours of tool usage. This tracking of tool utilization can assist in increasing the accuracy of wear status.

Figure 6:
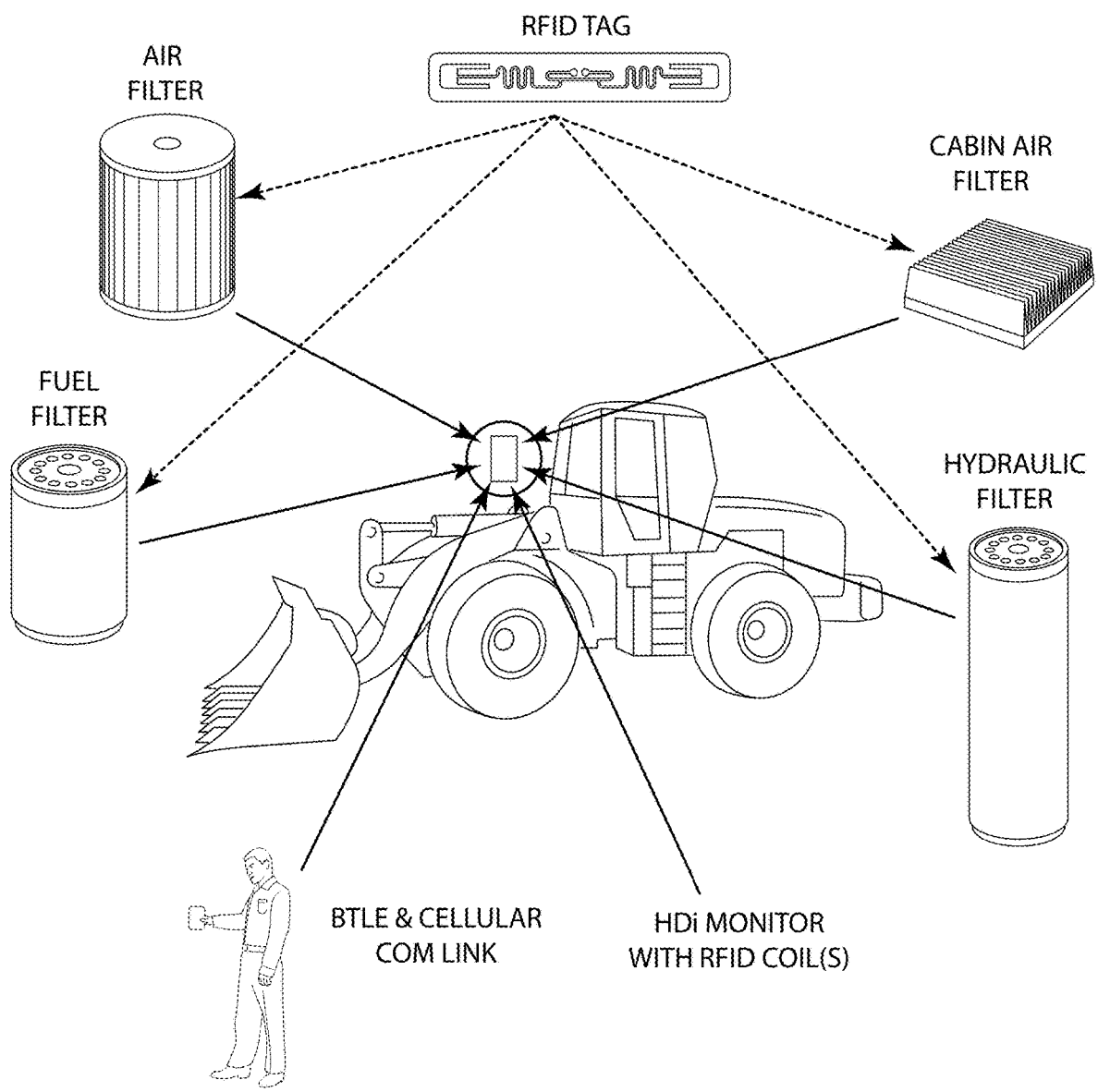
FIG. 6 illustrates several filters being monitored using RFID.

Another example of a slave unit is utilizing RFID directly on the vehicle. Although this may also be incorporated in the master unit, a slave unit can be placed wherever needed in order to monitor specific RFID placements. In FIG. 6 several filters are monitored using RFID. The information gathered from these filters can include install dates, hours of usage, dealer ID, service ID, manufacturing information and dates, and each filter can provide its recommended hours of usage. The RFID data can also include a table associated with air quality and environmental information for more dynamic limit of usage.

Filter life is designed for worst-case scenarios when engineers set the life of the filter but the tips and tales of these distributions can have an impact on vehicle life and health. An example of this is when the filter has clean air and the filter distributions are designed for a specific amount of particles. In that case the filter could last longer but if the air was worse than the estimated particle loading, the filter should be replaced sooner.

Referring to FIG. 7, another example of a slave unit using RFID is to place an active element within the RFID tag that when flexed produces a different voltage than when not flexed. The difference in voltage can be generated by a carbon resistor network or a basic load sensor. The RFID tag allows flexing of the filter to report pressure through the filter. This allows monitoring of the Delta P, or differential pressure, for a dynamic view of the environmental conditions as it relates to air pressure. This method can also help with fluid filters where pressure change indicates contaminates within the fluids.

Other aspects of RFID connectivity enable work tools to be identified and associated with a vehicle. Work tools can include hydraulic hammers, brushes, pulverizers, compactors, saws, augers, de-barkers, grapples and other such tools. The RFID connectivity is not limited to larger type tools. This type of methodology can be implemented in hand tools in order to track the performance and usage of these tools for billing and job site management operations.

Work tool monitoring can assist in tracking machine integration and implications of such integration. Further, built into tracking of that asset can be what is connected to the asset, the health, and maintenance of that asset and or work tool, and even coaching associated with the using performance of that asset.

The HDi can enable the identification of patterns of behavior and operational events when associated with particular work tools. These events can be associated with opportunities to coach changing the way the operator utilizes the work tool in a way to provide better operation and less maintenance.

Utilization and productivity can be calculated as a rate identifying the opportunity to coach as a level of intensity associated with a particular operator. For example, the system can determine whether the operator needs basic training or active training while utilizing the work tool. This can also be associated with some of the ECM or engine control monitor inputs to monitor things like hydraulic flow, modulation, forward and reverse events, which can be monitored by the master and/or slave units. Monitoring can be conducted by a master HDi, a slave HDi, and the operator utilizing the accelerometer in a mobile device. Alternatively, monitoring can be conducted by all three in order to gain a more complete picture of the translation of these events through the vehicle.

With this type of tool, monitoring can be associated with coaching opportunities using an interface where the operator is associated with the vehicle and associated with a work tool. Vehicles and work tools can be monitored to identify service and maintenance opportunities as well as parts replacement opportunities for the OEM.

An HDi can utilize a Bluetooth low energy connection to interface back to the operator through messages, voice, video or other media that will enable opportunities to increase productivity and operational competence.

Another opportunity is a table or matrix of work tools and operational guidelines facilitating connections to specific vehicles. Some work tools are connected to vehicles where the vehicle can destroy the work tool quite easily. The system can enable the operator to be aware and potentially even set limits to protect tools and guide the user to utilize the work tool for increased or optimum productivity. The operational limits and capabilities of the work tool can be shared to the vehicle and operator enabling this shared data.

The lack of use of these work tools can also be an asset in a rental scenario. An owner can determine which tools are being used and which tools are not being used and potentially request a recall of any tools that are not being used in order to optimize rental performance and keep its renters happy. This can optimize the use of vehicles and work tools and increase productivity.

Figure 8:
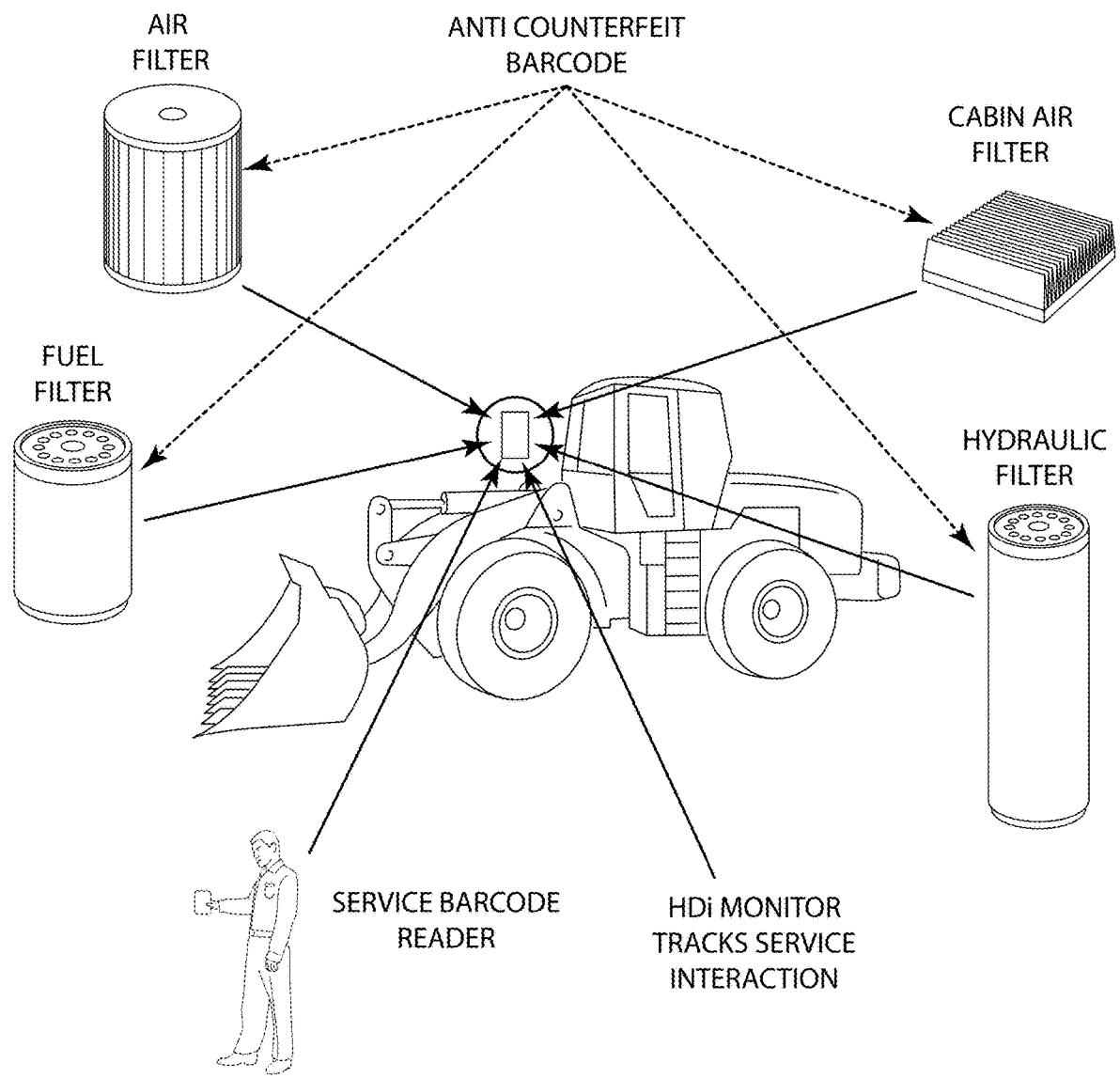
FIG. 8 illustrates selective bit barcode technology.
Figure 9:
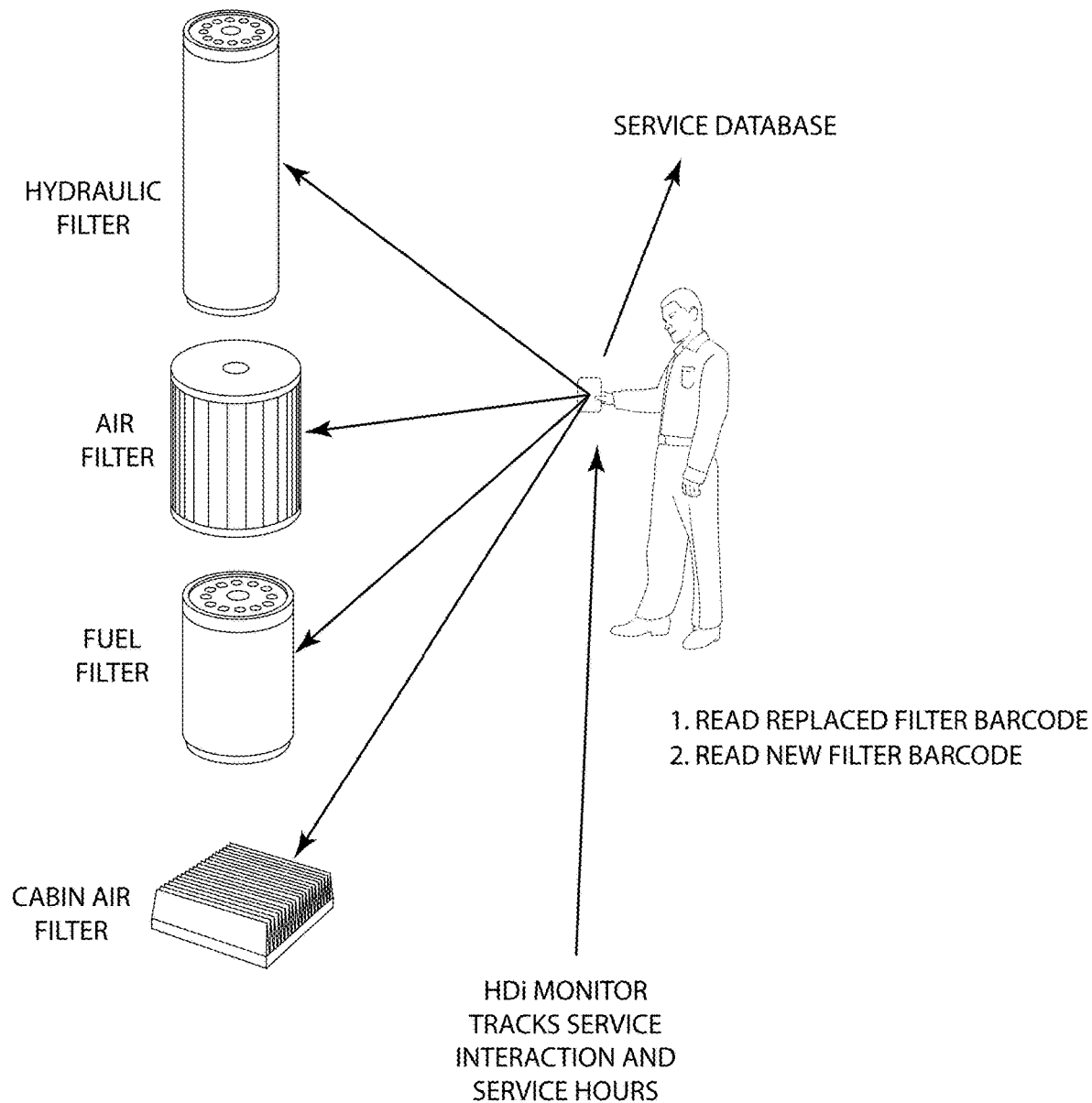
FIG. 9 illustrates selective bit barcode technology.

In one embodiment, an alternative to RFID is described. Referring to FIG. 8 and FIG. 9, a secure selective bit barcode technology can be implemented. A camera not only recognizes the barcode, but recognizes a unique pattern in one or more of the elements of the barcode that looks black but is actually a pattern. The pattern acts as a selective bit that is hard to counterfeit and hard to duplicate.

In one embodiment, licensing revenue on replacement parts can be provided by having an approved code for suppliers.

In this way, as a user walks up to a piece of equipment and scans the barcode of the asset, the tag can be identified as a tag that has not been counterfeit, data can be looked up in an identification table for information associated with that equipment.

The opportunity to now identify that work tool as it relates with a vehicle and the related specifications associated with operation make it possible to drive coaching moments and operational videos associated with that particular work tool, the same thing to be done with and other parts associated with these vehicles. Again anything to help teach and minimize learning time or prevent issues associated from using a part of a tool or vehicle improperly is saved value.

Figure 10:
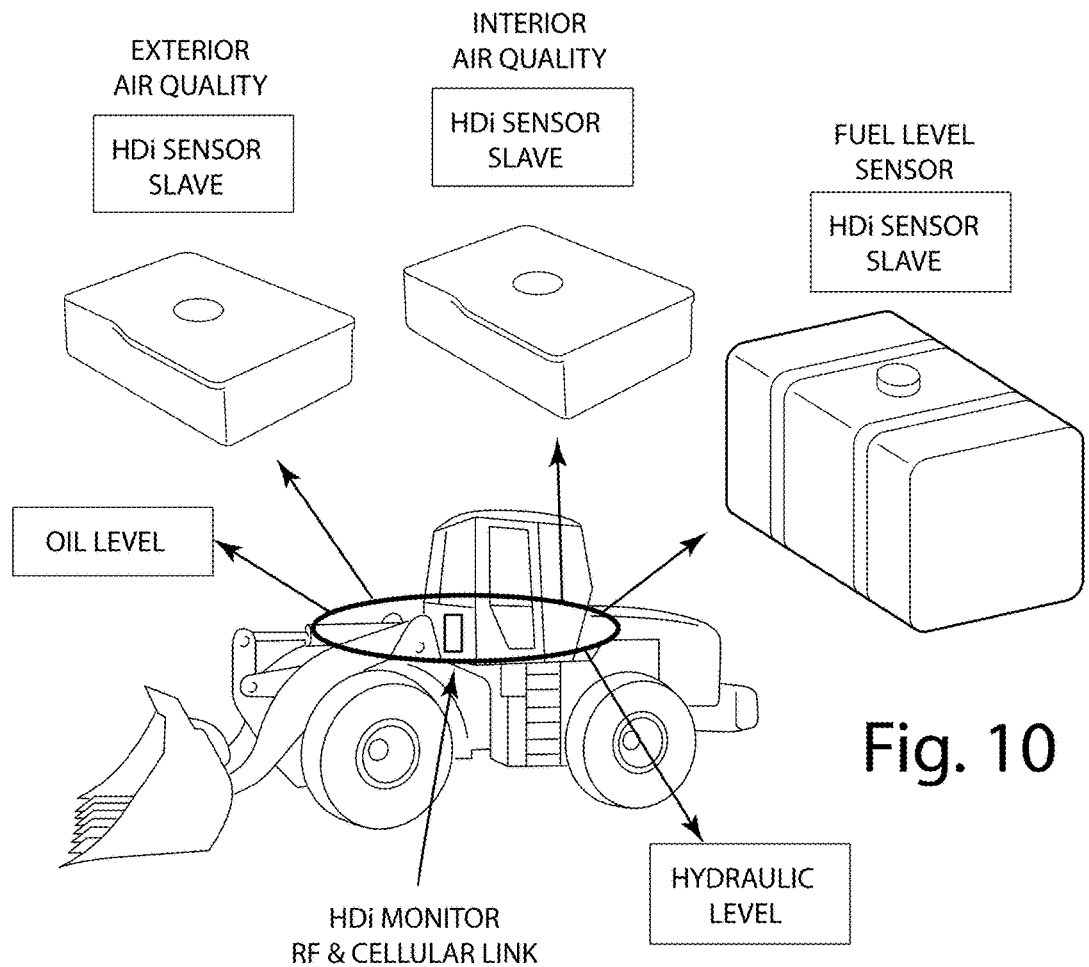
FIG. 10 illustrates one embodiment of an HDi monitor network.

FIG. 10 illustrates one embodiment of an HDi monitor network that includes an HDi sensor slave for monitoring exterior air quality, an HDi sensor slave for monitoring interior air quality, an HDi sensor slave for monitoring fuel level, and a master HDi monitor with an RFID reader and cellular link. The RFID reader can read the RFID tags from the HDi sensor slaves. The master HDi monitor can report the oil level and hydraulic level of the vehicle.

Figure 11:
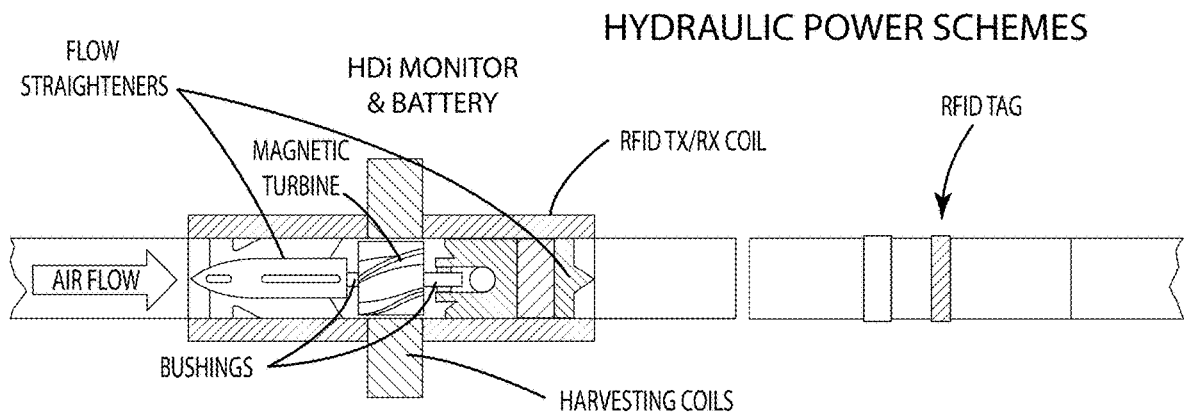
FIG. 11 shows a hydraulics generator that fits in a hydraulic connector.
Figure 12:
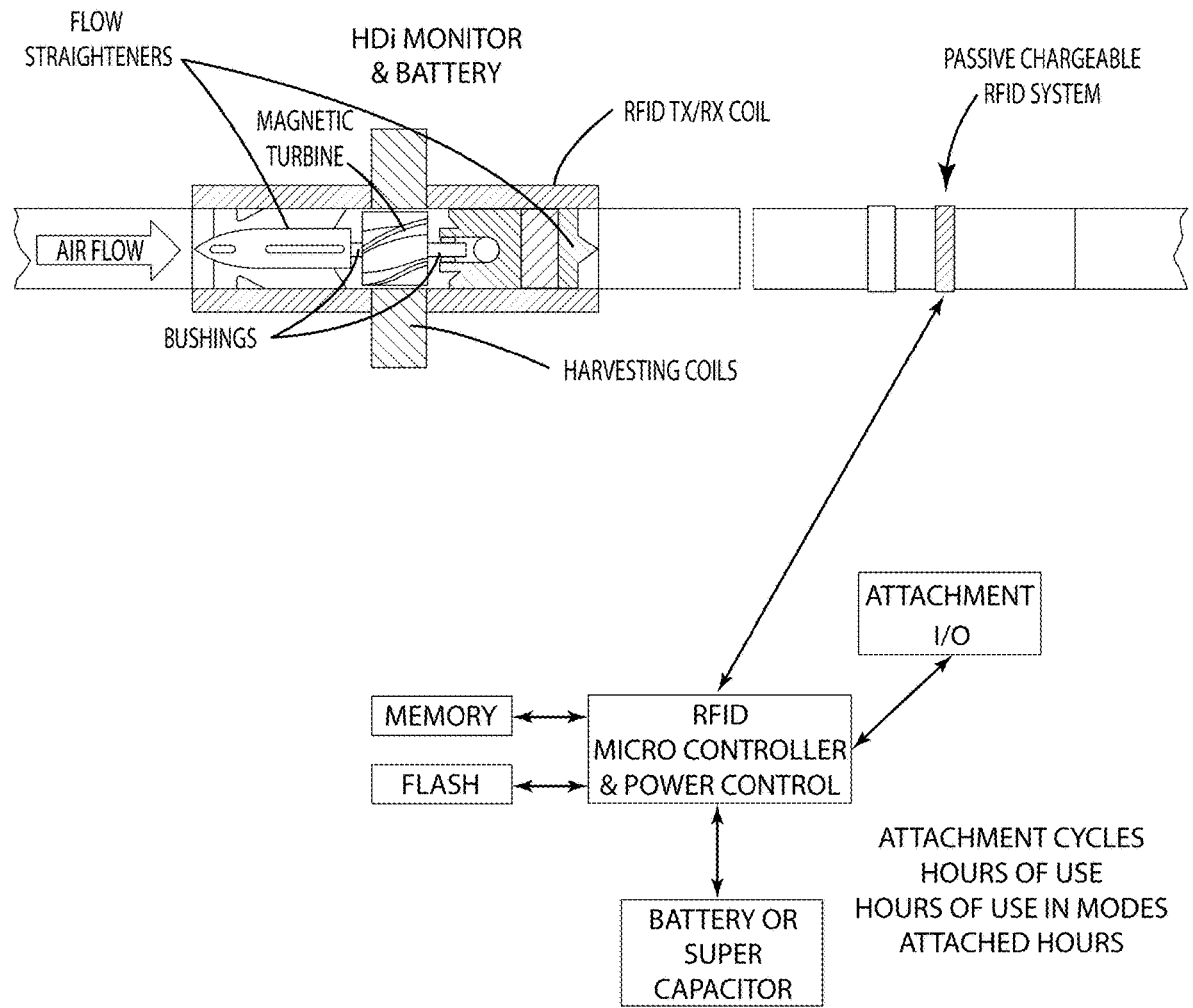
FIG. 12 illustrates one embodiment of a hydraulic powering scheme with a passive chargeable RFID system.
Figure 13:
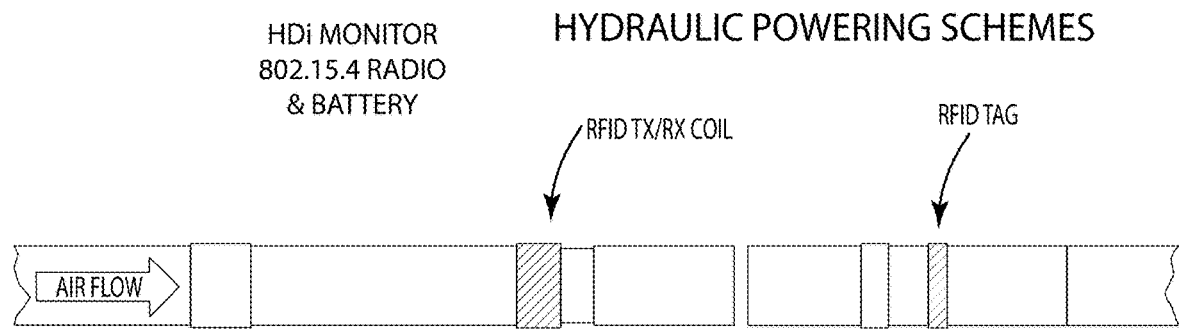
FIG. 13 illustrates one embodiment of a hydraulic powering scheme with a passive chargeable RFID system.

FIG. 11 shows a hydraulics generator that fits in a hydraulic connector. The power from the hydraulic generator can power the RFID that identifies the work tool. This solution can be with or without energy harvesting as a 1500 mA hour battery can maintain communications for up to five years. The RFID connection can be on the work tool and the hydraulic connector. FIG. 12 and FIG. 13 further illustrate a hydraulic powering scheme with a passive chargeable RFID system.

In one embodiment, a fluid connector is provided with hydroelectric energy charging and storage for powering an HDi monitor for connection, identification, and communications.

Figure 14:
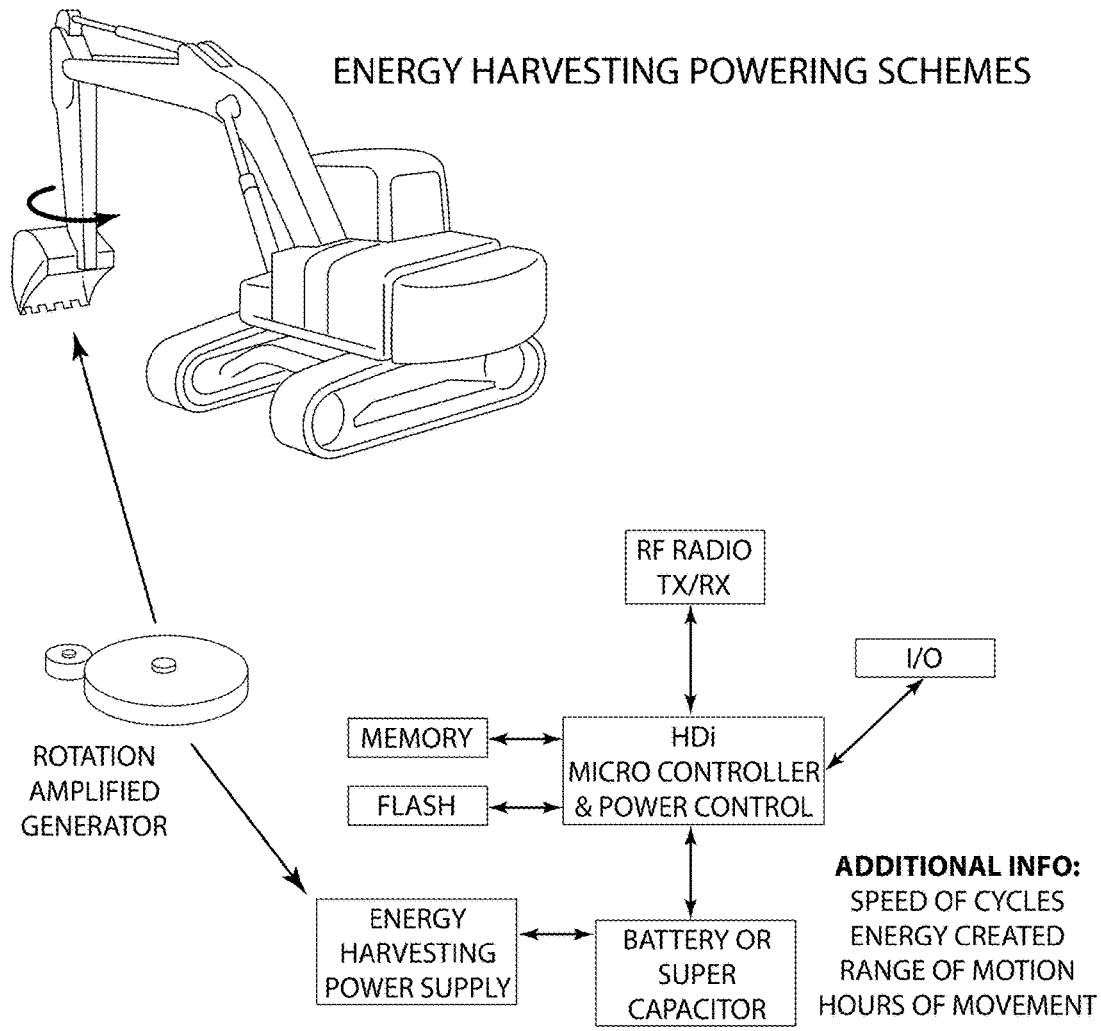
FIG. 14 illustrates one embodiment of a rotational amplified generator.

In FIG. 14, a rotational amplified generator with small movements generates large RPMs. The massive force asserted from a work tool allows that tort to be harvested to create larger RPMs to generate energy for energy harvesting.

FIG. 15 illustrates utilizing RF signal harvesting generating up to 1 W power for charging and potentially monitoring different sensor modules. RF energy can power cameras and sensors that transmit signals on an intermittent basis to a master unit without batteries. Capacitors in these devices can store up RF energy harvested over a period of time and send a signal out on an intermittent basis or by taking a picture and sending that picture on an intermittent basis.

FIG. 16 shows one embodiment of a driver scoring formula. The driving scoring formula utilizes distributions of population driving these vehicles and scores people based on these distributions. Accordingly, the driver scoring formula is a dynamic table that grows with time. By understanding the problems, interactions, inspections, and technician interactions we can derive the experience score. If the service is good the total experience increases. If the service is poor the experience decreases. This allows ratings for each aspect of this value chain to be ranked within the social/machine network.

Three categories used for scoring may include speed, energy, and transitions. Speed can have thresholds and can be both over eager and highly proficient. An example of speed is used to take a bigger vehicle with a bucket the shock of which can be considered harmful to the vehicle whereas this can be compared to an operator being highly efficient and moving from point A to point B and creating a very smooth transition.

An example of the energy scoring category is the intensity of the movement. The amount of energy used for each event and movement can be tracked and scored. There is an optimum or desired amount of energy to be utilized for specific movements. Distribution curves for each of these events as part of the training mechanism involves experts for each of these vehicles and the fluid movements that they utilize in order to do the same operations for the patterns that we will be recognizing for all the operators so the tips and tales of these distributions will have the ideal operation criteria involved in these distribution curves.

The degree of difficulty is used to determine how hard it is to be proficient at executing a particular maneuver. The degree of difficulty can be determined based on expert rankings from the distributions.

The events are patterns recognized for monitoring basic machine functions. For example, digging with an excavator bucket, moving forward, moving backwards, turning around, dropping dirt, and moving dirt are examples of events. Pattern data from both optimum performance and sub optimal performance can be utilized.

The user can have a distribution curve across the energy and transitions. The energy curve can be compared to the distributions from experts and from the general population relating to the tips and tales of these distribution curves. The driver can be rated based on his distribution curves and percentages as well as where that driver sits within the distributions for each of these measurements. This provides an overall score for this user that is directly relatable to the professional community associated with these vehicles.

This can create a teaching moment and coaching moment for operators that are operating at different levels within a distribution curve. An operator's performance can be compared to professional performance as it relates to the shock data and accelerometer, energy and transition data associated with that performance. Coaching can be provided for speed, energy, and transitions. Metrics can be associated to over and under thresholds for operation. FIG. 16 describes how a driver's score can be calculated.

Referring to FIG. 16, coaching opportunities are noticeable for a given operator. This data can be used to rank operators for pay performance. This data can also be used to rank renters and the typical impact it will have on service and warranty associated with their proficiency. A renter that has low operator ranking maybe charged more to make up for the service and maintenance aspects of their performance FIG. 17 shows a video performance of an excavator digging along with the accelerometer data associated with that operation. Expert data and operator data can be overlaid to show differences in speed, energy, and transition between the two comparing in time optimum performance to present performance. In this embodiment every operator has the opportunity to become an expert utilizing this technique.

FIG. 18 shows one embodiment of a score card for tracking a total vehicle experience. A customer looks at the experience of owning a vehicle in terms of the service maintenance, inspections, dealer interactions, parts availability, and cost to maintain that vehicle. FIG. 18 shows various life characteristics and service characteristics of this vehicle.

A parts score, service score, hours score, technician score, and inspector score can be part of an overall vehicle experience score. An example of an hour score would be for a given distribution of this vehicle from all the users in the database (tips, tails and mean) of the vehicle under the typical hours in operation since purchase or over the number of hours since purchase. Each of these numbers can be compared to a distribution to understand the tips and tales as shown in the chart. This identifies the opportunities in the field to improve overall performance. In aggregate this system can be implemented on a global scale. A global tracking system can enable metrics such as which regions have the best performance and which regions have the poorest performance. Such a system would inform overall opportunities and demographics for improving performance.

Figure 19:
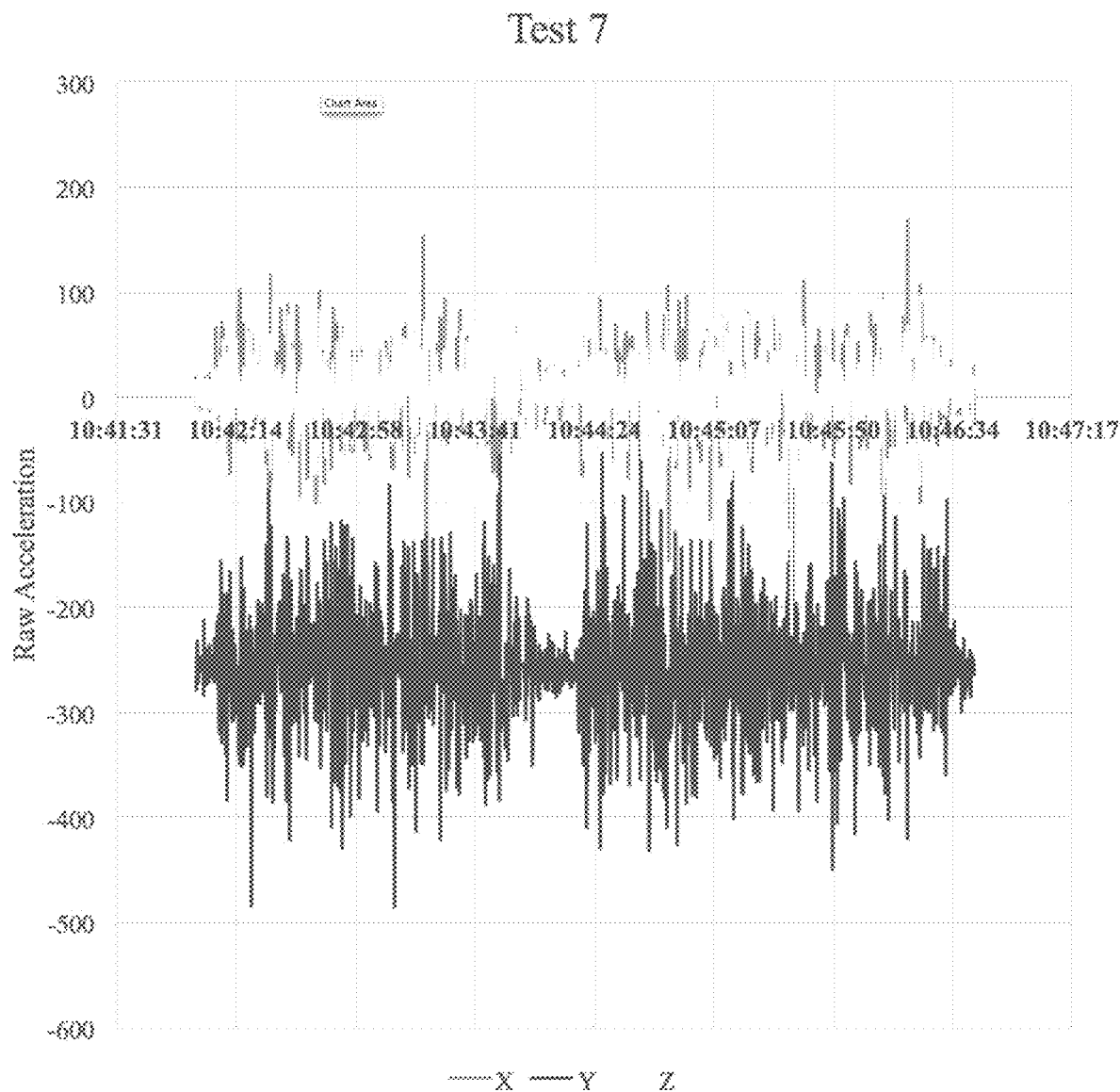
FIG. 19 shows in operation tracking the accelerometer of a vehicle performing a given function, in this case an excavator.
Figure 20:
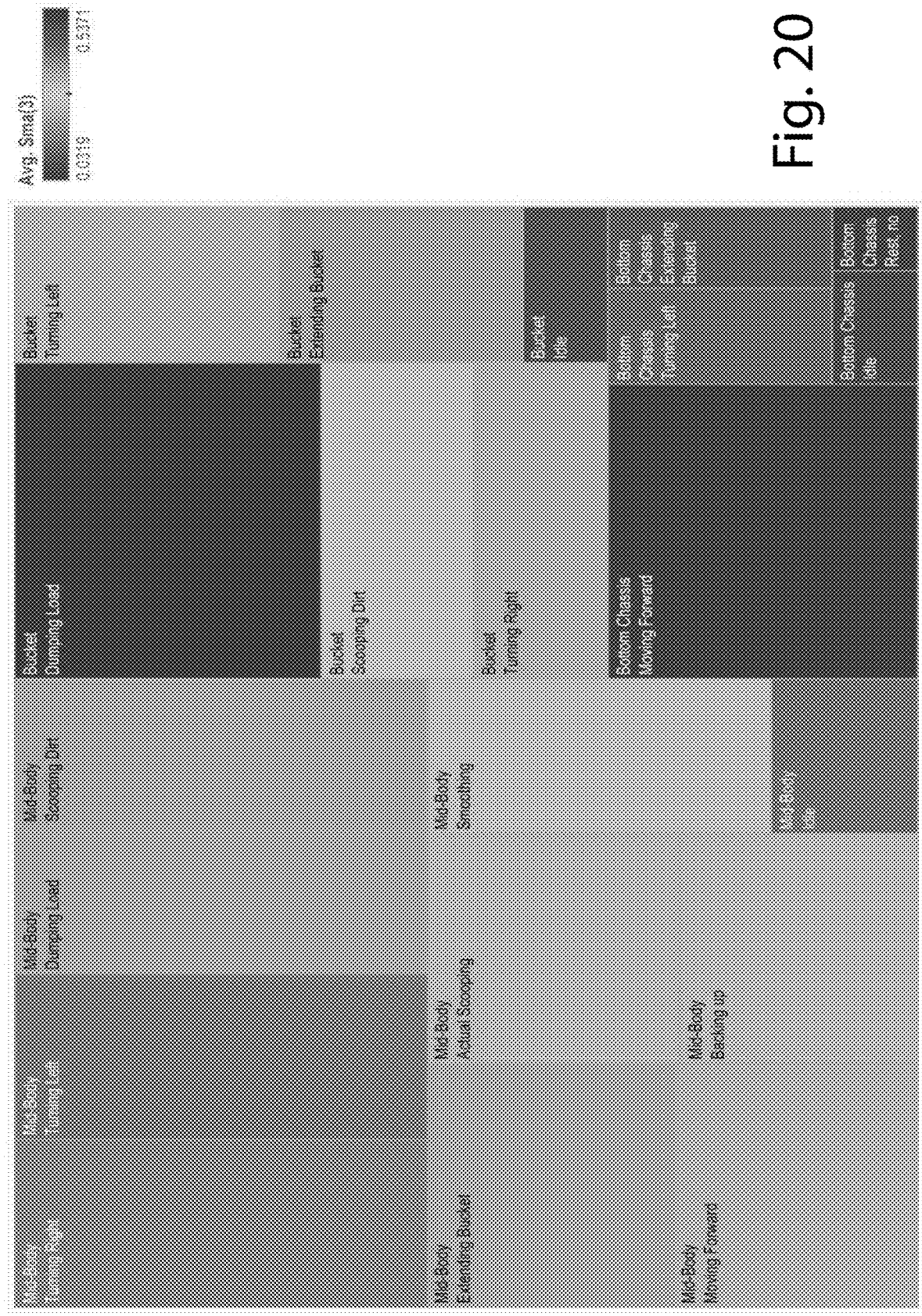
FIG. 20 shows the typical movements and their likelihood to be recognized with a basic pattern.

FIG. 19 shows in operation tracking the accelerometer of a vehicle performing a given function, in this case an excavator. FIG. 20 shows the typical movements and their likelihood to be recognized with a basic pattern. The top left are easily recognizable while the lower right are more difficult. A location within a vehicle becomes a location of interest based on the sensor readings. The ability to position the monitors on the vehicle allows monitoring and sensitivity to detect patterns. In this case, the body sensor is helpful in order to see the optimum pattern recognition.

In one embodiment, a method of visualizing multiple variables is provided. The size of the box is the RMS value, the color is the SMA value and the labels correspond to state and accelerometer location. In the upper right, when the accelerometer is on the bucket, activity is high, and vice versa when the accelerometer is on the bottom chassis at rest activity is low. This graphic can help inform where to position an HDi monitor with an accelerometer so that it could identify the different positions.

Figure 21:
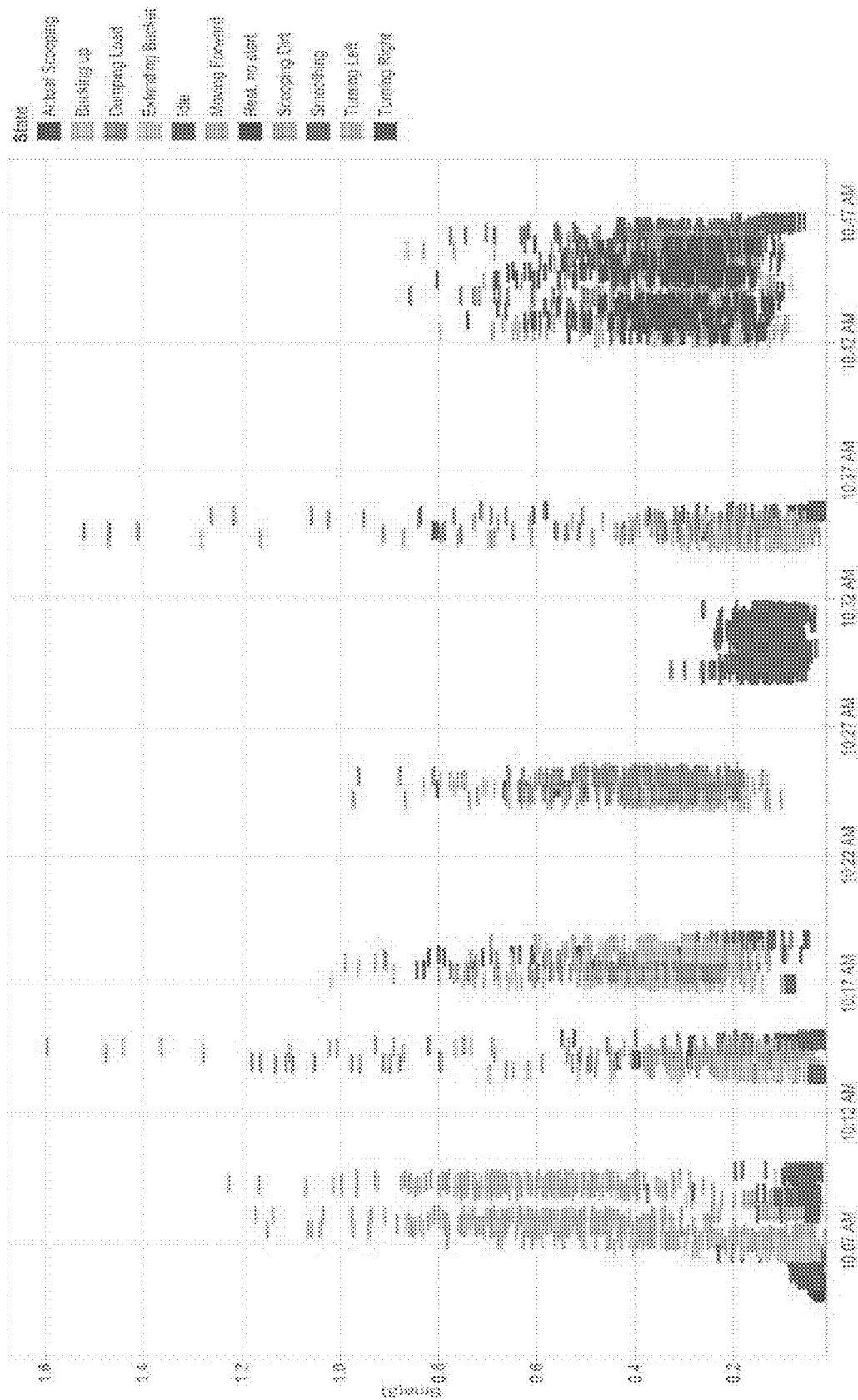
FIG. 21 illustrates SMA (Simple Moving Average) for different activities over the data.
Figure 22:
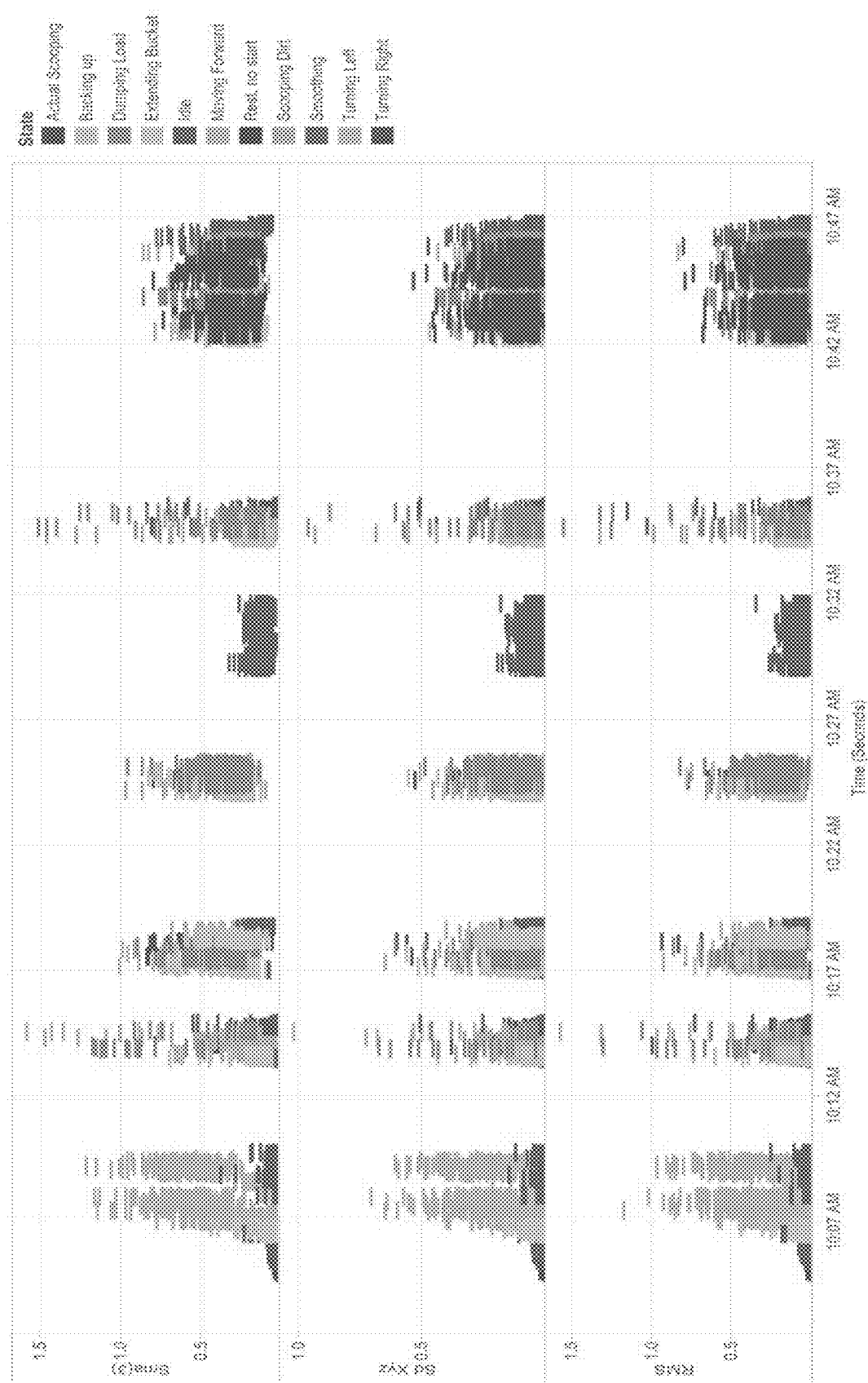
FIG. 22 shows the information from FIG. 21 broken out by axis.
Figure 23:
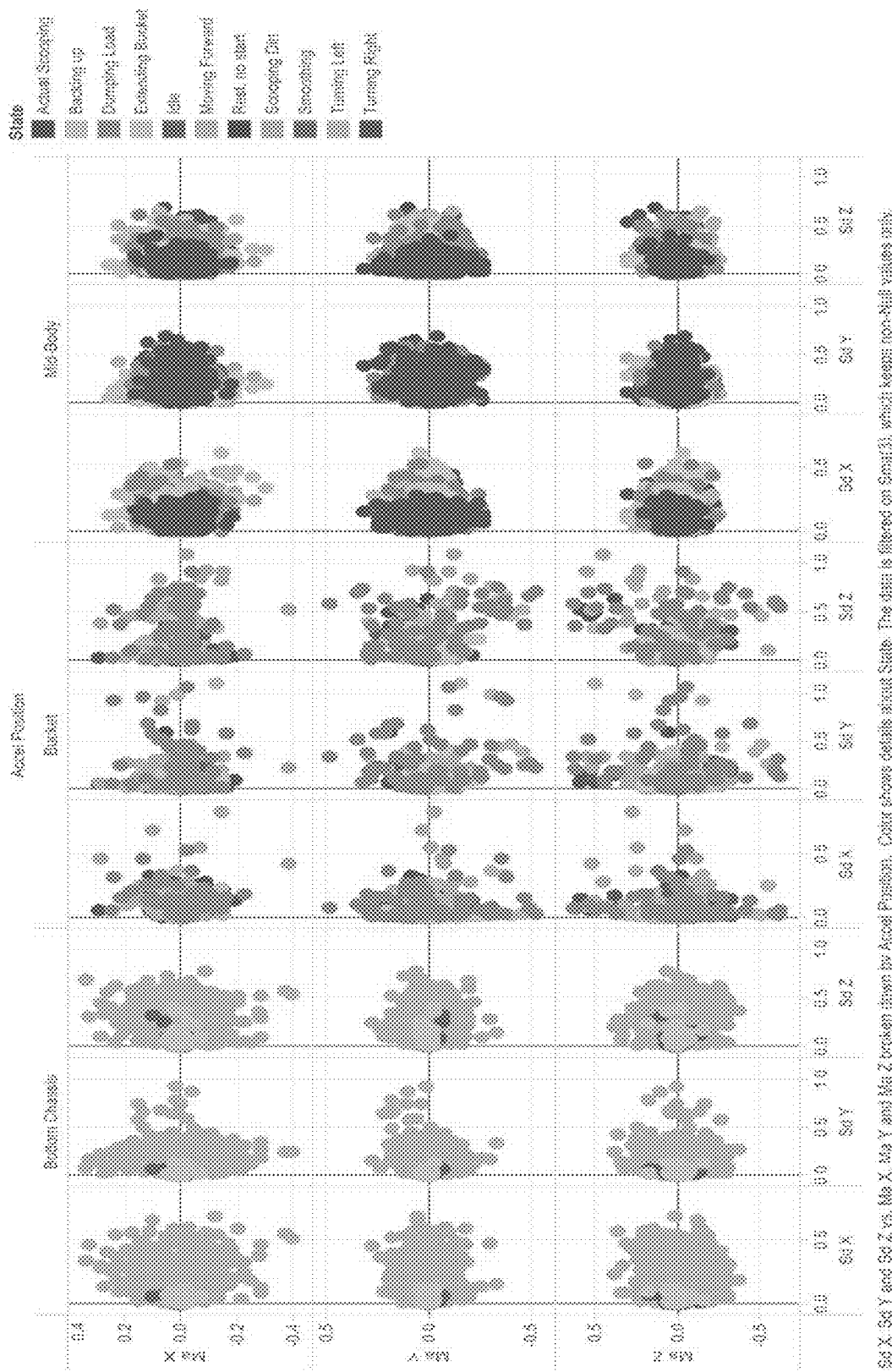
FIG. 23 illustrates clustering.
Figure 27:
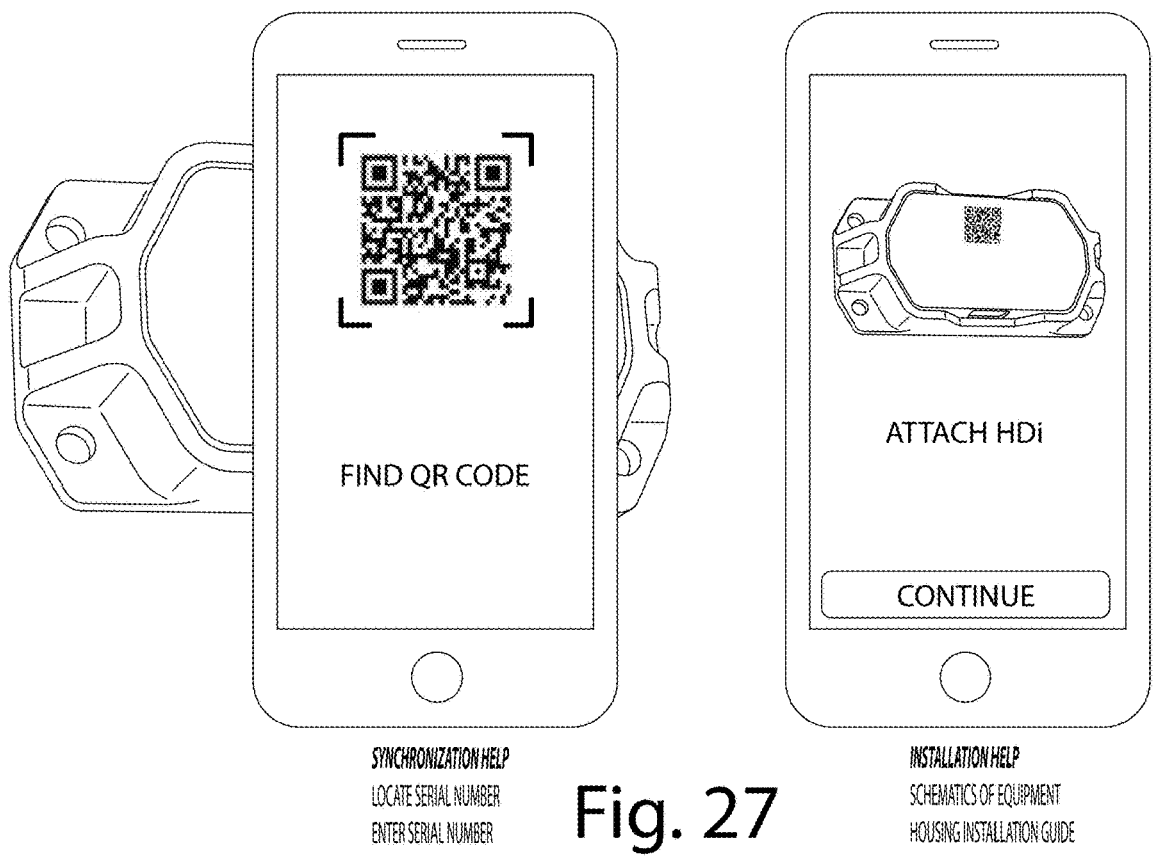
FIG. 27 shows one embodiment of a screenshot of a configuration for identifying an HDI module.

FIG. 21 shows a differentiation between the events and the time the event took place. FIG. 22 shows the same information but broken out by axis. FIG. 23 shows a more filtered version attempting to identify the patterns for each of these actions has a plot. FIG. 24 shows the data again from an amplitude perspective related to each event. All of this relates to the state classification as shown in FIG. 25. With filtering, aspects of the classifications can be identified. Pattern recognition can be used detect complex patterns with a high percentage of classification. With the number of different events, it can be useful to analyze specific events rather than grouping events into more generalized functions. Multiple attributes can be monitored to identify an event, such as six different attributes that can be monitored to identify extending a bucket. An example would be the excavator coming up, moving out, seeing the first rotation of the bucket and seeing the regional bucket and the end potentially stop point of the bucket all as aspects of extending the bucket and this can be put together in different sequences that identifies this overall pattern. FIG. 27 shows that overall the confusion matrix we see the highest number in the actual recognized classification for that device, so with some filtering it can be seen that a higher classification percentage can be reached.

FIG. 21 illustrates SMA (Simple Moving Average) for different activities over the data. There are seven distinct chunks corresponding to each test. SMA is helpful at identifying moving forward, but not as helpful for other states. This is a good way to help determine variables in the analysis and also helpful in determining how much activity occurs over time. FIG. 22 provides additional data on more variables. RMS, SMA, and standard deviation of the 3 axes behave similarly.

FIG. 23 illustrates clustering. This figure shows the moving mean and standard deviation of each axis individually to see if one axis can help drive classification.

Figure 24:
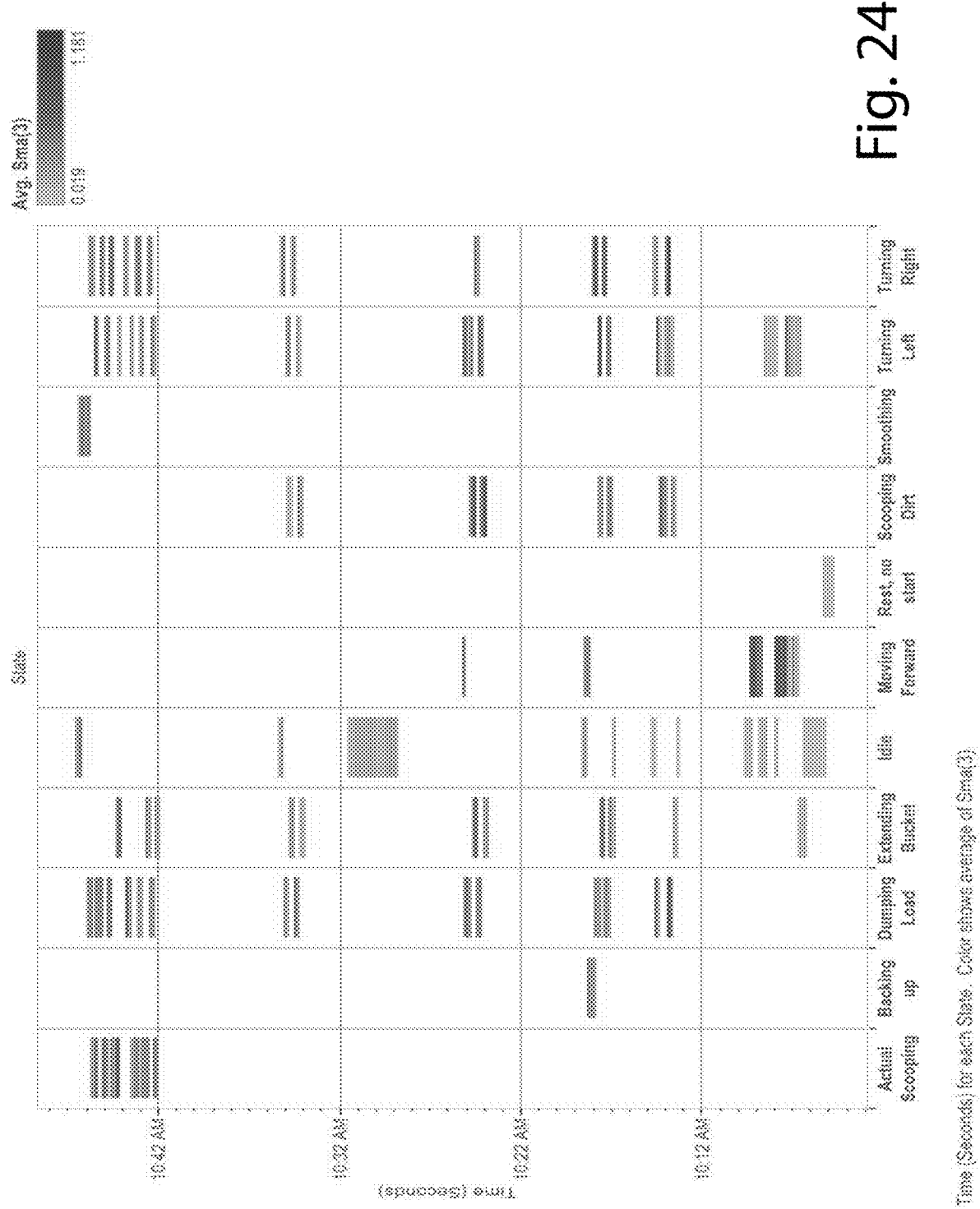
FIG. 24 illustrates a visual to show potential feedback to a user with a device.

FIG. 24 illustrates a visual to show potential feedback to a user with a device. The green shows SMA, which is an overall movement indicator. Darker green means more movement. By classifying the states, it is possible to see when a machine is in a specific state and also if there was an anomaly in the state. For example if idle was a constant light green and all of a sudden you see a dark green you know that there was an incident or something out of the ordinary happened.

FIG. 26 illustrates one embodiment of a confusion matrix showing correctly and incorrectly classified states.

The overall aspect of bringing in more monitoring in a configurable way to industrial vehicles becomes a matter of efficiency and proficiency of use in the way to bring a new customer experience and new raking rating systems to bear to identify the tips and tales of usage for each vehicle. Vehicle tool and environmental attributes surrounding this vehicle all providing a better picture as to parts maintenance and service opportunities that will enhance a life and will enhance the experience of this vehicle.

Figure 28:
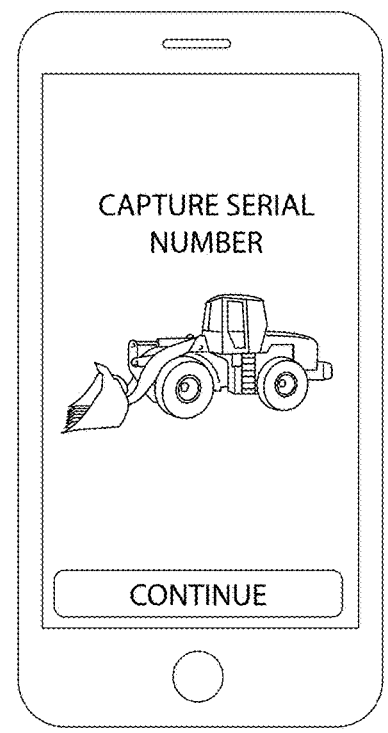
FIG. 28 shows one embodiment of a screenshot of a configuration that links an HDi unit with a vehicle or work tool by taking a picture of the serial number or entering that number.

FIG. 27 shows a configuration for identifying the HDI module and FIG. 28 links that HDi unit with a vehicle or work tool by taking a picture of the serial number or entering that number.

Figure 29:
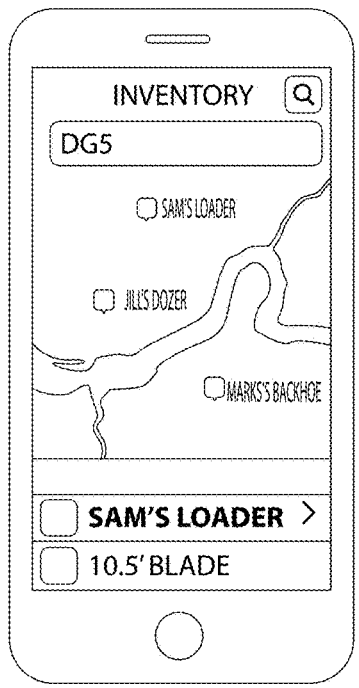
FIG. 29 shows a screenshot of the inventory of the HDi network and present status.

FIG. 29 shows the inventory of the HDi network and present status. The accelerometer allows hours, idle and other statistics along with operator associations and work tool configurations communicated and shown visually.

Figure 30:
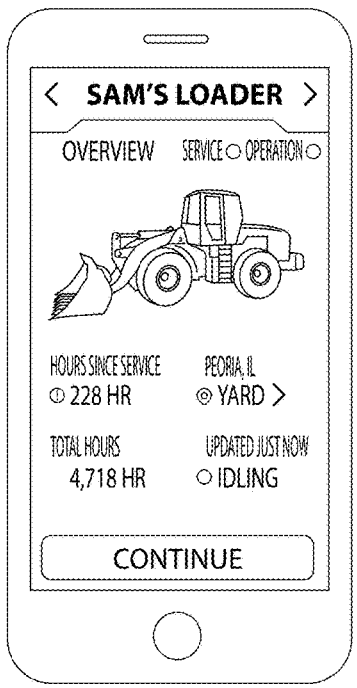
FIG. 30 shows a screenshot of HDi sharing service hours, location and flags for service interaction.

FIG. 30 shows an example of the HDi sharing service hours, location and flags for service interaction. These flags can be manual notifications or automatic messages directly provided to service personnel.

Figure 31:
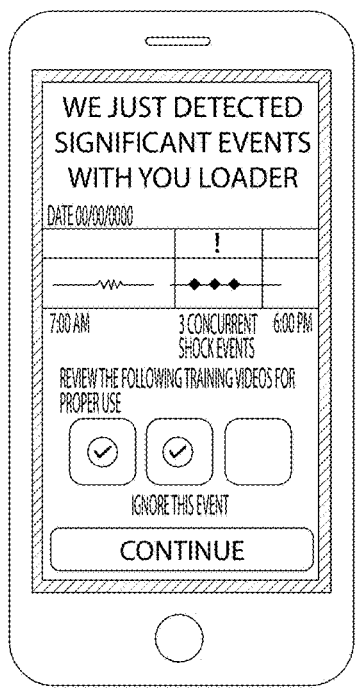
FIG. 31 shows a screenshot of an event used for training and tracking purposes.

FIG. 31 shows that events can be used for training and tracking purposes. This is for operator safety and personal alarms and jobsite safety linking to cell phones. Falls on a jobsite are a frequent injury and this allows notifications to be sent to the foreman of the jobsite so they can check on that worker. This is also designed to link to vehicles and work tools for these types of events linked to operators.

Figure 32:
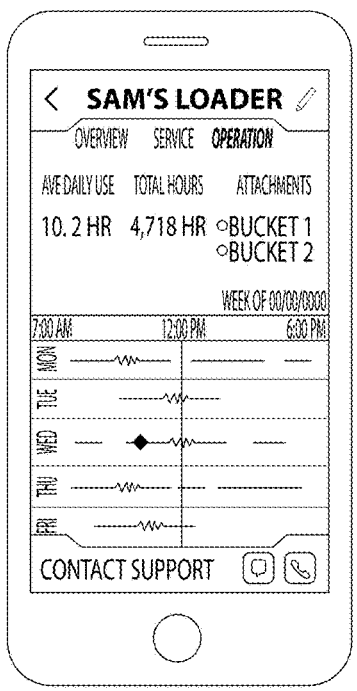
FIG. 32 shows a screenshot of events and operational statistics by vehicle, work tool and combinations of vehicles, operators and work tools.

FIG. 32 shows events and operational statistics by vehicle, work tool and combinations of vehicles, operators and work tools.

FIG. 33 shows the driver ranging discussed earlier in this disclosure. It tracks what vehicles, ratings, training events and status, suggestions, conditions and comments.

FIG. 34 shows the warranty and non-warranty wear of your assets in inventory as a factor or time of use and type of use. Utilizing dynamic wear management predictive maintenance makes service and parts ordering more predictive.

Figure 37:
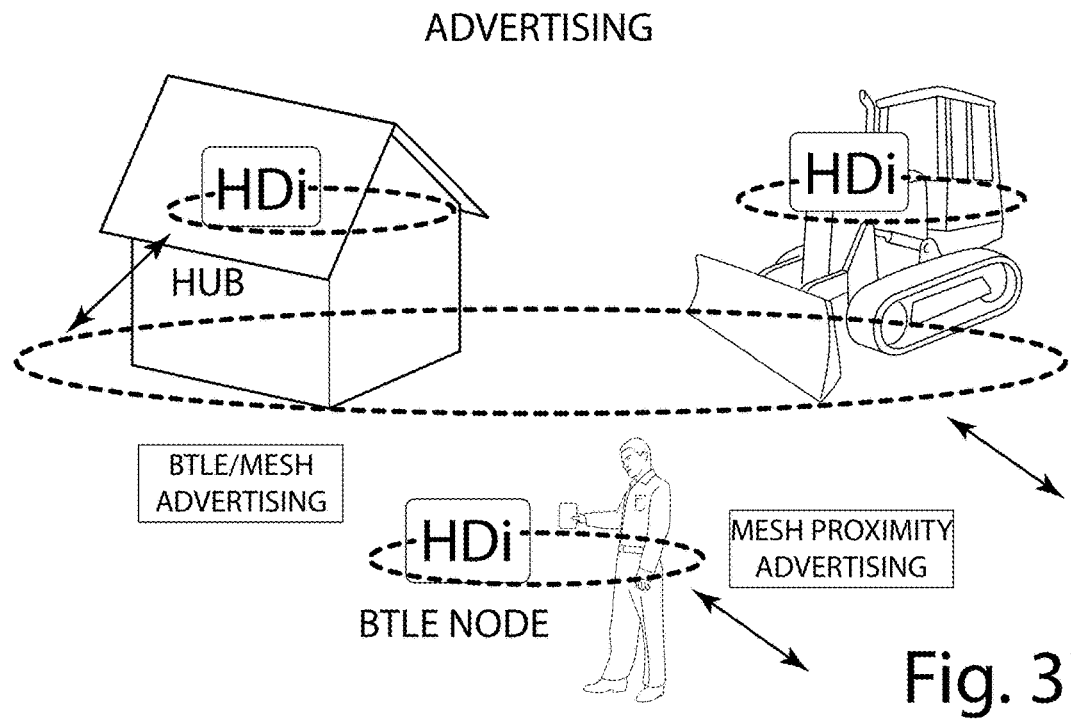
FIG. 37 shows exemplary communications layers that can make the network seamless.
Figure 38:
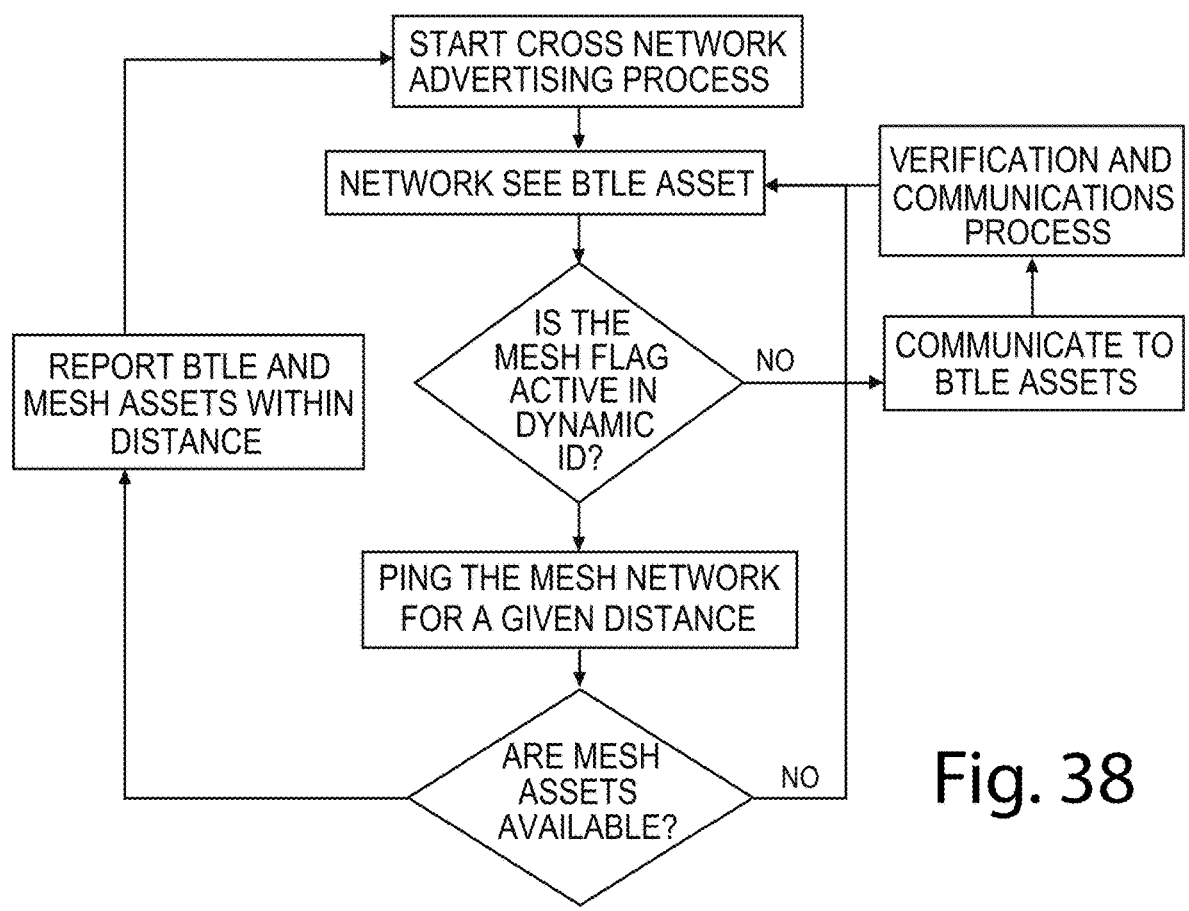
FIG. 38 shows a cross network advertising process.

FIGS. 35-36 show the configurations of the HDi and how a network may be configured. FIG. 37 shows the communications layers needed to make that network seamless. The advertising mode is a layer that enables each asset of the network to be accounted for in the machine social mesh network as disclosed in U.S. Patent Application 62/212,266 to Baarman et al., entitled MACHINE SOCIAL MESH AND INFORMATION MANAGEMENT SYSTEM filed on Aug. 31, 2015, which was previously incorporated by reference in its entirety. This protocol allows the system to know what other devices and communications types are available within the network. The process in FIG. 38 is used to identify IDs of these assets for further polling and communications directly as needed. This system enables multiple networks to exist serving different functions and capabilities.

Installation of an HDi on a vehicle is fast and easy. An application on a user's mobile device can be used to scan a QR code on an HDi monitor and scan a vehicle ID tag in order to associate the two in a system database. The HDi monitor is physically installed in the appropriate position on the vehicle.

By installing an HDi monitor on each attachment, tool, and vehicle in an HDi system, the position of vehicles, tools, and attachments can all be tracked on a user's mobile device and located on a map displayed on the user's mobile device. Further, the health of attachments, tools, and vehicles can be tracked through an application on a mobile device such that the status of wear parts, or any service alerts can be provided to a user through a central interface about all of the vehicles, attachments, and tools. The mobile device can provide coaching, training, and event visibility. If there is a significant shock event registered on a sensor of an attachment, vehicle, or work tool the HDi system user can be notified through the mobile application. Further, coaching and training tutorials tailored to the specific vehicle, attachment, or work tool being used by an end user can be viewed through a mobile application. The mobile device application can provide operator and vehicle performance metrics to an HDi system user.

The HDi system enables predictive maintenance, a unique data set for third parties, complements existing telematics, allows data alignment among old and new machines, allows mixed fleet initiatives, allows shared economy initiatives, insights on attachments, inventory management awareness, rental and geo-location efficiencies, price-point competition for smaller assets, and warranty claim validation.

Figure 39:
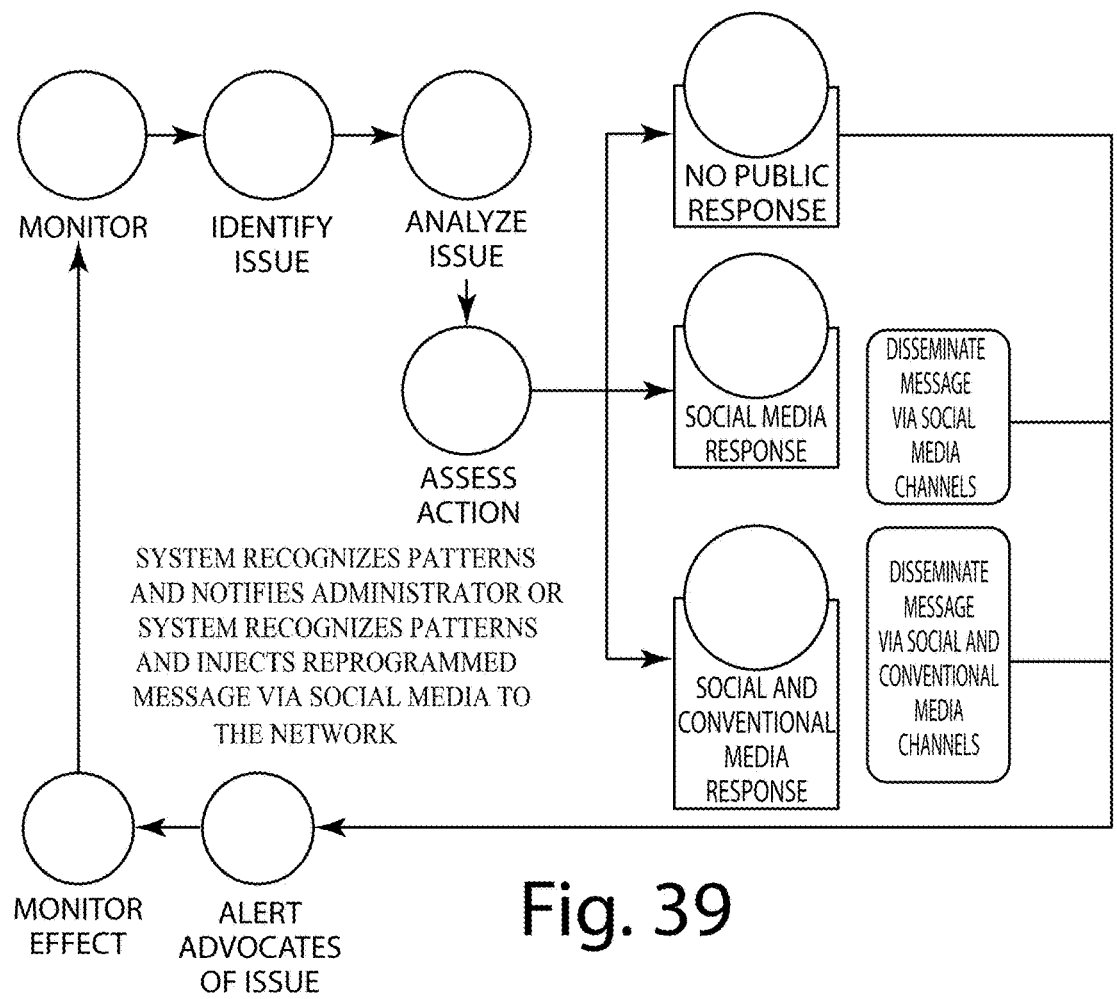
FIG. 39 shows the process used within the network to identify patterns or problems and how these patterns can push notifications or drive predefined messages to workers on a site or within a network.

FIG. 39 identifies the process used within the network to identify patterns or problems and how these patterns can push notifications or drive predefined messages to workers on a site or within a network. These can be inventory, service, schedule, weather issues, complications on a jobsite, service delays and new plans or sequence of events to follow, etc.

Figure 40A:
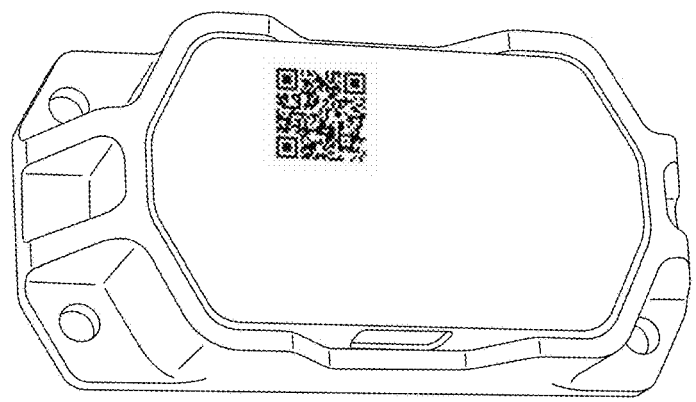
FIGS. 40A and 40B show one embodiment of an HDi monitor.
Figures 40B, 41:
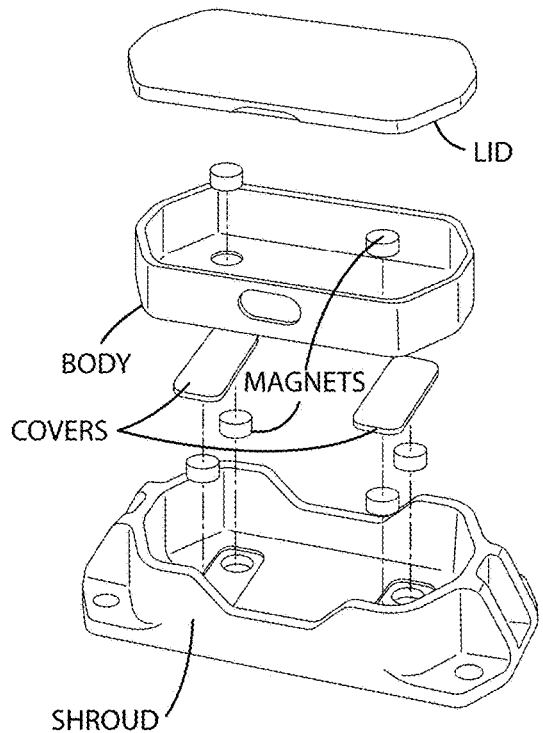
FIG. 41 shows a table of HDi Event Tracking.

The system can include the following:
Magnetometer and/or accelerometer in an HDi monitor.
HDi data plays
Data as a service to fuel ECA
Rating method that generates ratings based on machine use and time and adjust dynamically based on signature collected (renter)
Energy Harvesting from ac sources
Operator training app in cab—serves up warnings and rewards good behavior for good use "gamification"
Technician to find a machine or tool and validate hours or location
Data feed to track if other sensors are transmitting
Interface with thinkworks Internet of Things
Augment predictive analysis
Efficiency rating for fuel use and idle time
Machine abuse rating—how hard has the machine been run
True operational hours tracked by rep for a fleet manager
Operator efficiency rating
Fleet efficiency rating
Hdi data is sent along to augment quote and service request
App to show machines that are getting near 250 hour increment inspection need App to show machines that have been run hard and need to be inspected sooner then 250 hours Fleet Owner app—find my work tool, find my machine, flag bad operators, flag, flag machines that have been beaten, flag work tools that have been beaten up HDi can sense when a sensor trips or is missing and notifies as reference data against warranty claims HDI can send pings at known service hour levels as a data point (250, 500, 1000) as triggering data to drive notifications of inspections Inspector can use GPS to bring up machines within given area and auto rank machines needing to be inspected based on the reference data (last inspection, missing sensors, fault codes being sent ect) to prioritize visit Inspector or fleet can look up location of work tools with HDI and can tell from accelerometer hours used and any adverse event FIGS. 40A and 40B show one embodiment of an HDi monitor. The HDI monitor includes a shroud, body, and lid. The shroud can be attached to a vehicle, attachment, or work tool. The body includes circuitry and other components. The body uses magnets to couple to the shroud. The lid includes an identification tag and covers the components installed in the body.

In one embodiment, an HDi monitor can be configured as an HDi controller. When the system is connected to any network that allows the bandwidth, the HDi system can selectively listen to events, noises and record data remotely for real time research of field equipment. These interactions can be triggered by watches pushed up from the network. A watch can be a specific chain of events, a pattern or patterns. When these conditions are met the HDi system can record or transmit the data to the host system. This data can be used for enabling new features and capabilities that can be downloaded through the network. This enables the host to gather information from many units and perform data analysis to better the overall monitoring system. The input can be a microphone and/or the ultrasonic sensor. The speaker may be used to connect to the driver/operator for real time interface, alarms, service interactions or training opportunities. If an event occurs the host system can check on the operator for health and safety or other reasons.

A real time clock can track events and time of day. It can have a back-up battery. The real time clock can track off time or time a work tool lies dormant. The down time can be tracked between two active moments recorded by an accelerometer.

When an HDi recognizes a pattern of specific functions, the accumulated function time and cycles at temperature can be used to predict wear and failures. Referring to the example shown in FIG. 41, an HDi can connect and accumulates time, temperature, and cycles to build a recommendation of wear and replacement for service and inventory control. Hoses can be manufactured with serial numbers that link to manufacturing dates, materials, and test data. When tracked in the field the cycles of these hoses are another aspect of wear. When we identify the cycles we have empirical data that can be compared with test data for predictive failure timing and ordering. This information can be linked to failure data and changed as materials change for specific serial numbers. By understanding events, cycles, hours of actual use and other impacting attributes like load vs. unloaded along with environmental conditions, there can be a continuously better understanding and prediction of maintenance and service issues. This can be applied to wear parts such as joints, bearings, seals and earth engaging wear surfaces.

HDi Accelerometer

In the world of heavy equipment a vehicle can be involved in a variety of different interactions. Tracking these interactions is helpful for a variety of reasons. Tracking these interactions can include not only monitoring various sensors located on the vehicle, work tools used in conjunction with the vehicle, and user devices, but can also include tracking the relationships or associations between the vehicle, work tools, and user devices. Tracking this information can assist in numerous facets of the heavy duty equipment environment such as maintenance, repairs, wear data tracking, replacement part ordering, work data tracking, work tool interface, and coaching, to name a few. Internally to a vehicle the association technology can be used in multiple controllers. For example, the transmission controller and engine controller can be associated through tracking and synchronizing the vibration data. Association data can also allow the inverse to be tracked. When the vehicles acceleration data is known at the engine and at the transmission each system respectively can track differences from the vehicle data. This allows erroneous engine or transmission acceleration data to be filtered out and identified. For example, an engine issue is more local to the engine and can be factored out when there are multiple sensors on the vehicle on other probable sub systems.

Figure 42:
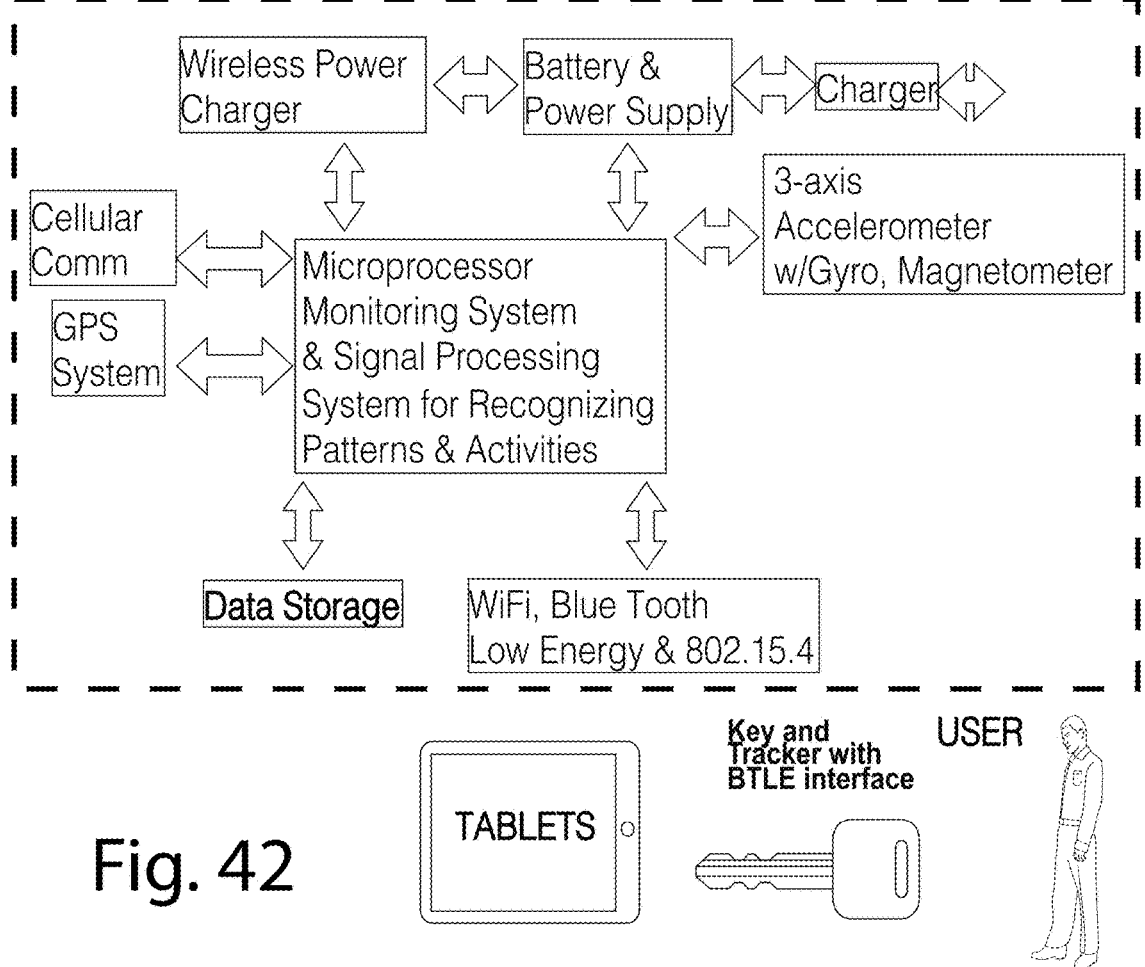
FIG. 42 shows an example of a block diagram of an HDi or tracking monitor that includes an accelerometer.

Accelerometers can be utilized to provide data for a variety of different functions in the world of heavy duty equipment. FIG. 42 shows an example of a block diagram of an HDi or tracking monitor that includes an accelerometer. In one embodiment, the tracking monitor includes a microprocessor, a communication system, and an accelerometer. The accelerometer can be essentially any type of accelerometer, for example, a 6 or 3-axis accelerometer with a gyroscope. The HDi monitor may include a communication system such as circuitry for communicating using one or more different protocols, such as WiFi, Bluetooth Low Energy, or 802.15.4, to name a few.

Some HDi functions can be provided by a single HDi monitor that collects accelerometer data. Other HDi functions can be provided by collectively analyzing accelerometer data from accelerometers in multiple HDi monitors. Some examples of functions that can be provided include: identifying a physical connection or other association between physical entities using vibration data, identifying force events (e.g., tip-over event or destructive force event).

In one embodiment, multiple monitoring devices are associated by comparison of the accelerometer data. In another embodiment, associated monitors utilize relationships between these monitors along with limits of differential operation. Rules and limits can be applied to monitor key operating parameters. For example, the system can track relationships between work tools and vehicles, such as how long a work tool has been attached to a vehicle. Relationship changes can be tracked. Relationships between a vehicle, tractor, trailer, work tool, and operator smart device may change over time. For example, accelerometer data can track the amount of time a work tool is physically connected to a particular vehicle or how much experience an operator has operating a particular vehicle/work tool pair. Rules and relationship limits can be monitored to assure proper transportation, loading and unloading.

In another embodiment, the associated relationships can determine wear differences when a vehicle is connected to or associated with specific devices. For example, by collecting acceleration data about various work tools and vehicles, and their relationships, an operator can be notified about the wear status. As an example, some work tools wear faster or slower depending on how much they are used, in what context they are used, and depending on what vehicle they are used in connection with. For example, a hydraulic hammer connected to a large excavator may show significantly less wear than the same hydraulic hammer connected to a smaller machine. Specific guidelines can be provided to mitigate impact to the equipment.

In yet another embodiment, the differential accelerometer data between these monitors can be utilized for relative wear building a dynamic wear table of associations and time. Activity above the average will have higher wear and below will have lower. See data table on FIG. 52. The wear table can be created that tracks wear over time based on various relationships. The wear table can be used in conjunction with the relationship data to identify end of life status and other wear thresholds before they occur. For example, a new part may be ordered and installed based on wear data in order to limit and make predictable the time a vehicle and work tool are out of commission for repair.

Synchronizing accelerometer data can be done in a variety of ways. In one embodiment, acceleration events can be used to synchronize associated homing window acceleration data for comparison.

In another embodiment, the associations between devices can be used to change operator settings and operator information. Vehicle parameters and operator coaching can be driven from the associations. The operator-associated information can be provided via the internet and a look-up recommender database.

In another embodiment, a tip-over event or destructive energy event can be detected by the use of one or more accelerometers. For example, a tip-over event may be detected by processing accelerometer data and determining a predetermined threshold change in the pitch or roll vectors has occurred. The data of multiple monitors associated together can be used to confirm the event. In another example, a destructive energy event can be detected by processing accelerometer data and determining a predetermined threshold spike in force has occurred. For example, a sudden drop in force can be detected by an accelerometer caused by a vehicle crashing or being driven recklessly. In the case of a crash, the accelerometer data can be utilized to identify where the crash occurred and provide guidance to maintenance crew for repairs.

In yet another embodiment the multiple associated monitors can be used to build a rule-based security system that analyzes associations and changes to that system to indicate security triggers and events. For example, tracking vehicles and attachments in the fleet or on a jobsite can be preprogrammed By checking the associated security tracker for equipment that is associated both pieces of equipment can track together. A work time schedule can also be set as a rule as well as a list of associated users. If the wrong user tries to start the vehicle and is not associated, the vehicle will not start or can be configured to trigger an alarm sequence.

In another embodiment, a sequence of events can trigger an association check and feedback mechanism. For example, tapping a work truck or tool box three times can be detected by an accelerometer and trigger an inventory check where each device's accelerometer data is verified to have felt the tapping confirming the device is present. The user can be notified on their smart phone whether or not the tools are on the truck, for example by a beep sound.

This method of detecting a physical connection via accelerometer output on two different entities can be enhanced by combination with a communication system. For example, the system can utilize a method for short range communication, such as Bluetooth. The formal link of communications such as BTLE provides a means to verify what is connected by sharing vibration data.

A. Installation and Calibration

Figure 43:
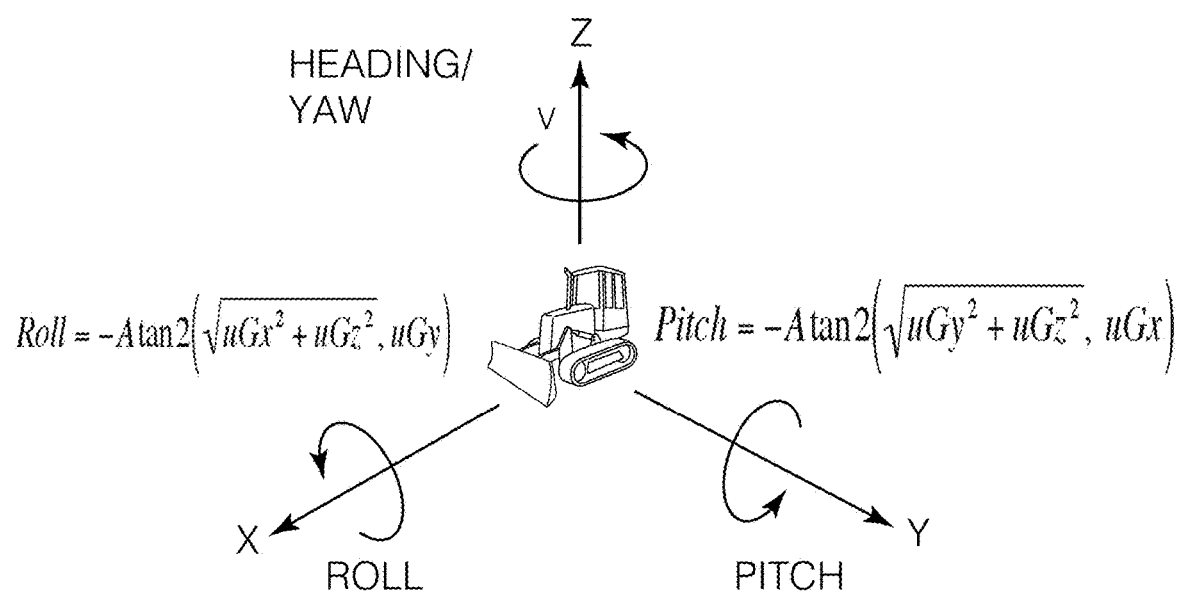
FIG. 43 shows exemplary measurement axes of an accelerometer.

An HDi can be installed such that accelerometer pitch, roll, and yaw/heading readings are provided at a desired orientation. For example, as shown in FIG. 43, the heading/yaw axis may be aligned generally perpendicular to a ground plane, while the pitch and roll axes are aligned generally parallel to a ground plane. The accelerometer output may be installed at one orientation and calibrated such that the pitch, roll, and yaw/heading axis align with those illustrated in FIG. 43.

Figure 44:
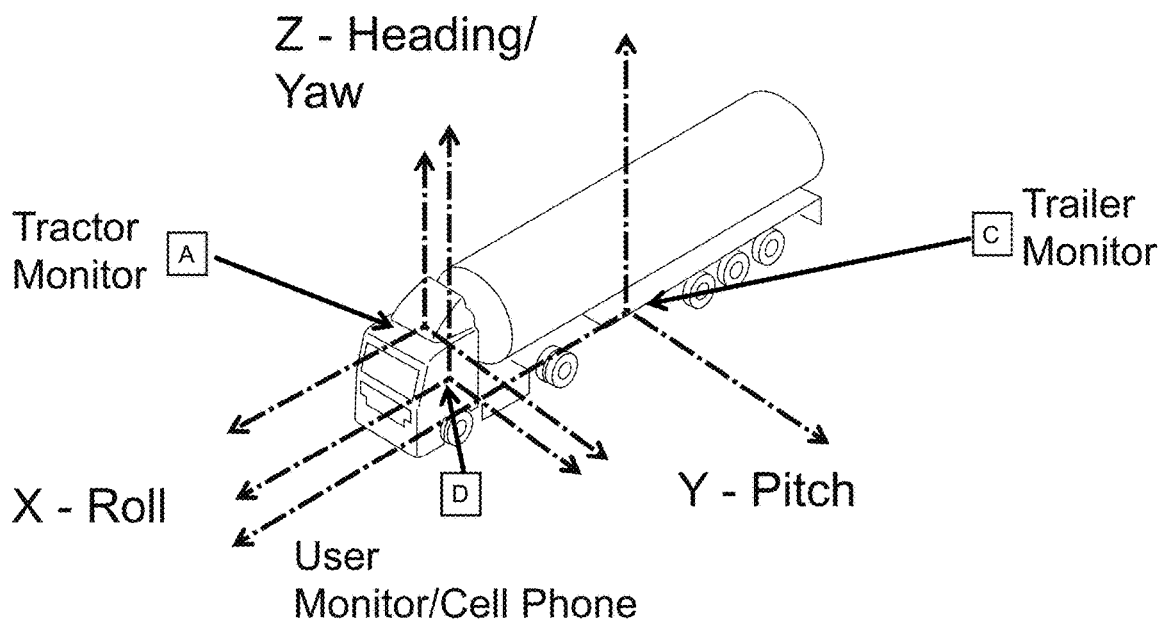
FIG. 44 shows one example of where monitors can be installed on a tanker truck.
Figure 45:
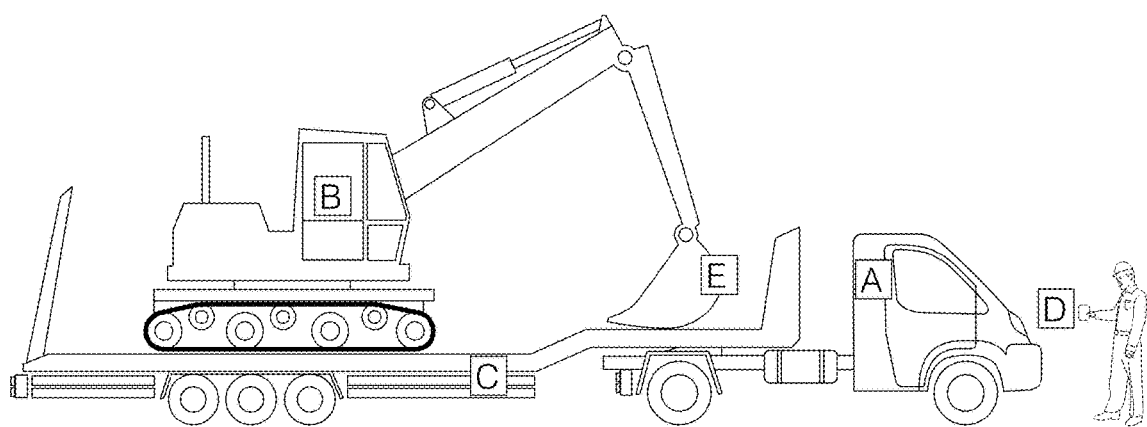
FIG. 45 shows another example of where monitors can be installed in the context of a different heavy-duty equipment environment.

FIG. 44 shows one example of where monitors can be installed on a tanker truck. Each monitor can produce accelerometer data that is normalized by the hub A. The monitoring data can be used to monitor the driver, tractor and tank trailer. FIG. 45 shows another example of where monitors can be installed in the context of a different heavy-duty equipment environment. In this situation, tracking monitors or HDi's A, B, C, D, and E are installed at various positions in the system as shown. In particular, in this embodiment, monitor A is installed on a first vehicle, monitor B is installed on a second vehicle, monitor C is installed on a trailer attached to the first vehicle, monitor D is the user's smartphone, and monitor E is installed on an attachment to the second vehicle.

Figure 53:
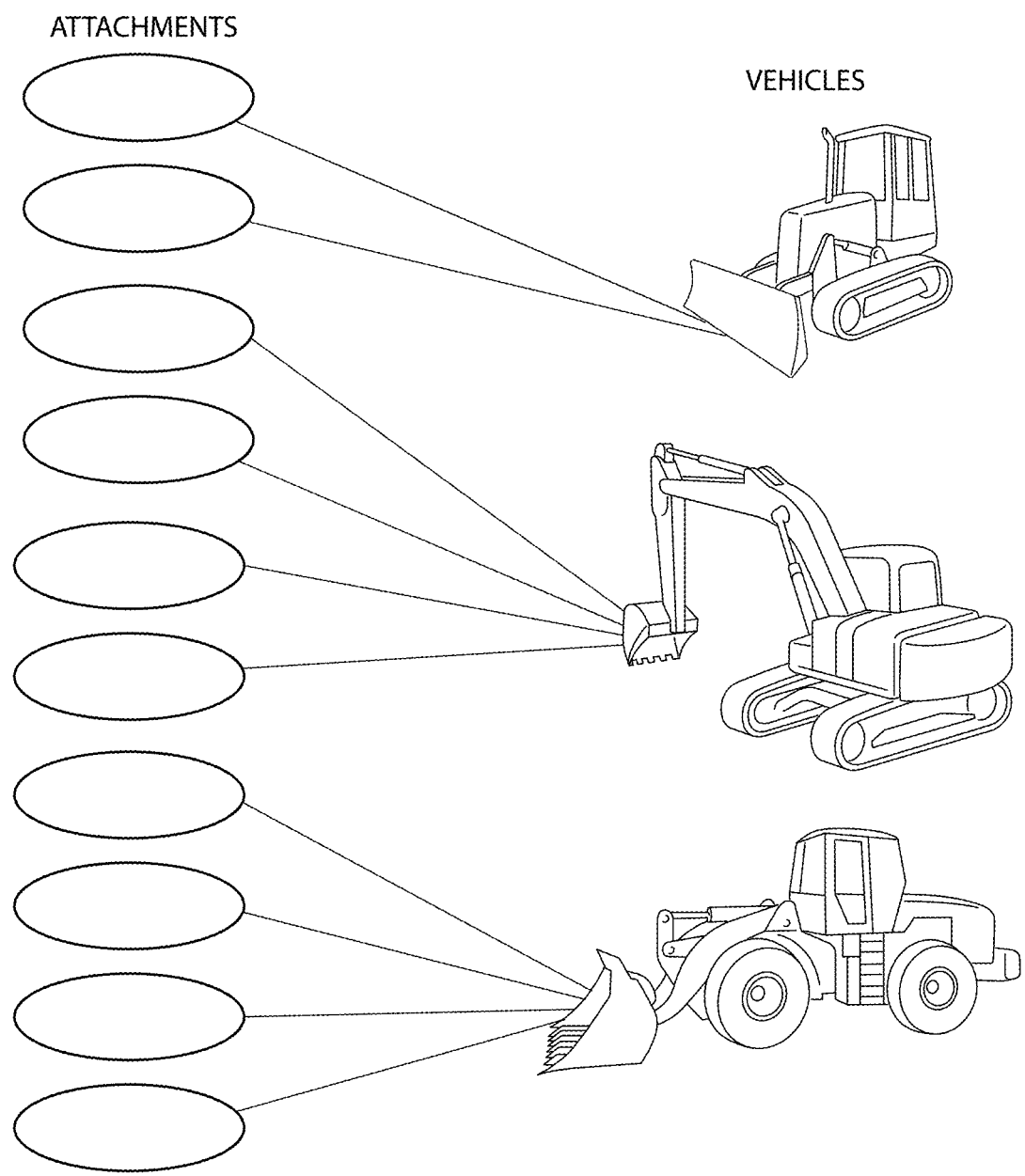
FIG. 53 shows examples of some of the attachments that may be associated to vehicles when the system is used.

FIG. 53 shows examples of some of the attachments that may be associated to vehicles when the system is used. Multiple training, setup, and configuration opportunities are possible with these work tools.

One or more HDi's can be configured to act as a hub. A hub HDi refers to an HDi monitor that collects information from other HDi monitors. The hub can include a microprocessor configured to analyze the information collected from the other HDi monitors (along with any information the hub itself collects). Alternatively, the hub can be programmed to relay information to a third party location for analysis. For example, a hub may have a cellular connection for communicating accelerometer data to a cloud-based server. Alternatively, as another example, the hub can be programmed to relay information to a user's smartphone application, which can analyze the information and provide output to the user in the application based on the information collected from the various HDi monitors.

B. Accelerometer Association

Accelerometer data can be used to track relationships between devices, such as vehicles and work tools. For example, by comparing the accelerometer data from multiple entities a determination can be made about whether or not those entities are physically connected or otherwise associated. The relationship between those entities can be tracked. For example, the amount of time a backhoe is attached to a vehicle can be tracked by tracking the accelerometer data. The operator associated with the vehicle can also be tracked and associated with the vehicle and work tool time respectively. The ability to make these associations without operator interface by using accelerometer data comparisons is seamless for the user.

By using acceleration data to associate devices, other methods of associating devices can be verified. Further, collecting acceleration data can provide benefits above and beyond detecting associations between components. Multiple monitors on the same moving entity provide event monitoring and autonomous redundant data verification.

An example of these associations will be described. A vehicle is started; while idling, the accelerometer data from an accelerometer in the driver's device, such as a smartphone, and the accelerometer data from an accelerometer installed on the vehicle, such as an HDi monitor, can be compared and the two devices associated due to having similar vibration patterns in the accelerometer data from the physical idling of the vehicle, thereby linking that driver with that vehicle. As discussed further below, the comparison of acceleration data may be analyzed to determine whether the driver and vehicle are experiencing similar rate of change in acceleration—that is due to variations in sensors, and due to different environmental factors the raw acceleration data may not match, but the rate of change of acceleration can be used to associate the driver's acceleration data with the vehicles acceleration data. Continuing with the example, after logging a few hours the operator decides to connect a hydraulic hammer work tool. Upon connection the new work tool is associated to the vehicle and the operator and starts tracking hours of operation, idle, and off, for the vehicle, work tool and operator respectively. The various metrics can be tracked by analyzing the accelerometer data collected from the hydraulic hammer, and where needed comparing to accelerometer data of other accelerometers, such as accelerometers located in the vehicle and the driver's device.

By correlating accelerometer data from accelerometers installed on separate devices, a physical connection or other association between devices can be detected. For example, an HDi can be installed on a vehicle and an HDi can be installed on a vehicle attachment. Accelerometer data from both HDis can be analyzed to determine whether the vehicle attachment is physically connected or otherwise associated (e.g., carried by) with the vehicle. That is, the accelerometer output of an accelerometer installed on a vehicle and the accelerometer output of an accelerometer installed on a vehicle attachment that are physically connected can be distinguished from accelerometer output of an accelerometer installed on a vehicle and accelerometer output of an accelerometer installed on a vehicle attachment that are not physically connected.

One method of detecting a physical connection or other association between two objects is to collect and score accelerometer data from accelerometers installed on each object. In one embodiment, samples of accelerometer data are collected from separate accelerometers. The accelerometer data from each accelerometer can be scored and compared against the accelerometer data from the other accelerometer(s). Accelerometer data scores similar to each other can be deemed to be physically connected. For example, accelerometer data within a pre-determined threshold value may be deemed physically connected.

Figure 47:
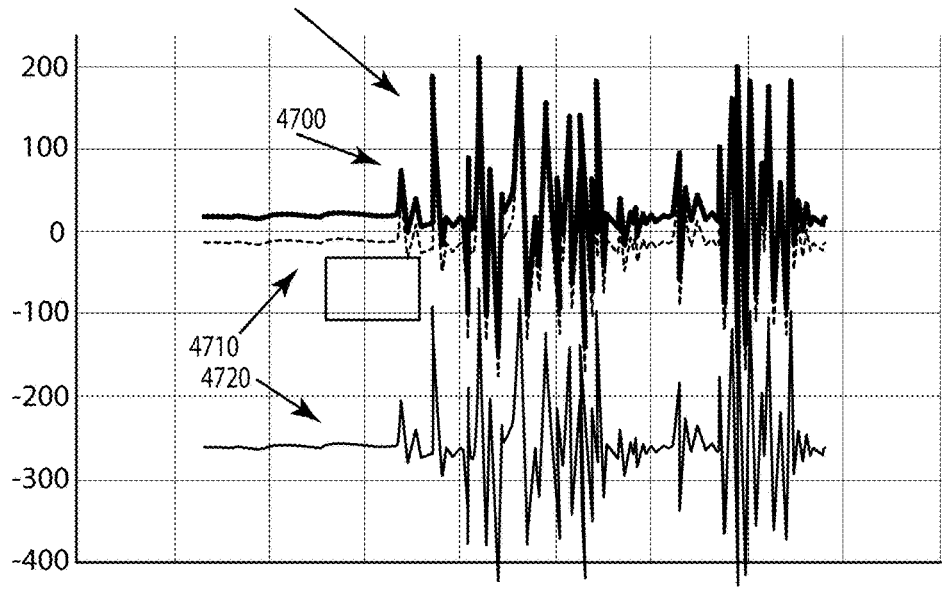
FIG. 47 shows sample accelerometer or vibration data from three accelerometers.

For example, FIG. 47 shows sample accelerometer or vibration data from three accelerometers. This data can be utilized to identify whether the devices of these three accelerometers are installed on are connected. The first accelerometer data set 4700 was collected from a mobile phone. The second accelerometer data set 4710 was collected from a work tool. The third accelerometer data set 4720 was collected from a vehicle. The X-axis is time and the Y-axis is magnitude of force.

Figure 46:
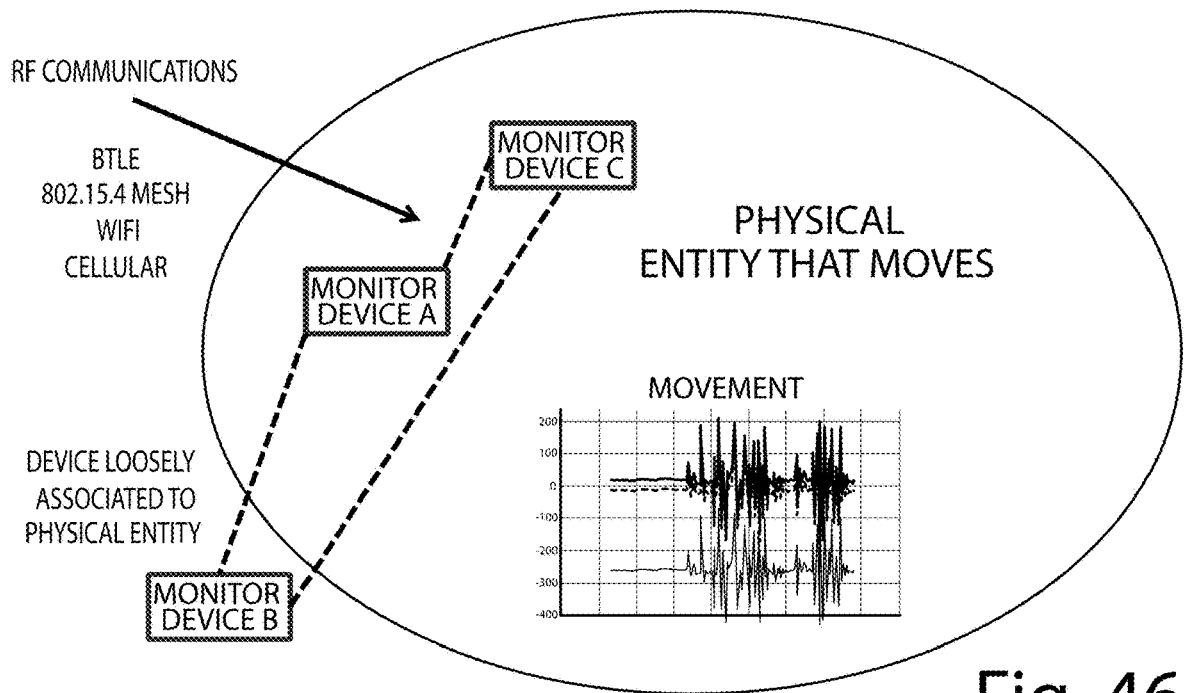
FIG. 46 shows a representation of a physical moving entity as an opportunity to associate devices moving relatively in the same direction.

FIG. 46 shows a representation of a physical moving entity as an opportunity to associate devices moving relatively in the same direction. Loosely associated devices can also be associated if the relative data compares to the relative data. Anything connected to the core moving entity is an opportunity to check if it's associated. If a device is disconnected for example a mount breaks but the device is held loosely this event can be detected. The oval represents the area of detection while around that may still be detectable but at a lesser level.

In order to compare the accelerometer data, the data can be collected at one location. For example, one of the HDis can act as a hub that collects the accelerometer data for analysis. Alternatively, all of the accelerometer data can be communicated to a different processor for analysis, such as a user's smartphone application or a server in the cloud. Because there is time associated with communicating the accelerometer data before analysis, the data can be synchronized to ensure that comparisons between the accelerometer data compare the same time frame.

The data can be synchronized by using events as key identifying details for relative comparison. That is, a predetermined known event can be timestamped and used to synchronize the two accelerometer data sets. For example, the user could be directed to move the vehicle without moving the work tool attached to the vehicle so that the accelerometer data can be evaluated.

Figure 48:
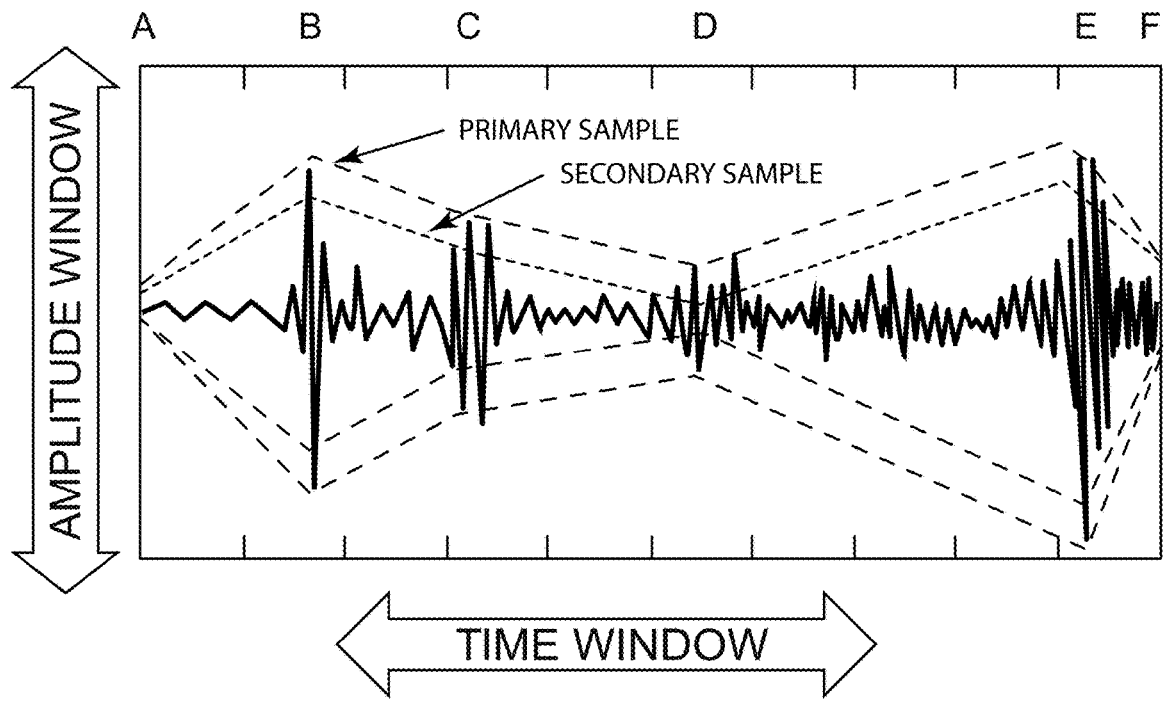
FIG. 48 shows an example of how accelerometer data from two devices can be compared to associate those devices.

FIG. 48 shows an example of how accelerometer data from two devices can be compared to associate those devices. FIG. 48 shows a comparison window of acceptance on a sample window. In one method the peaks of the data are scored and normalized. The score is combined and compared to the other monitors for associations. The example shows how each respective waveform is scored for comparison.

Figure 49:
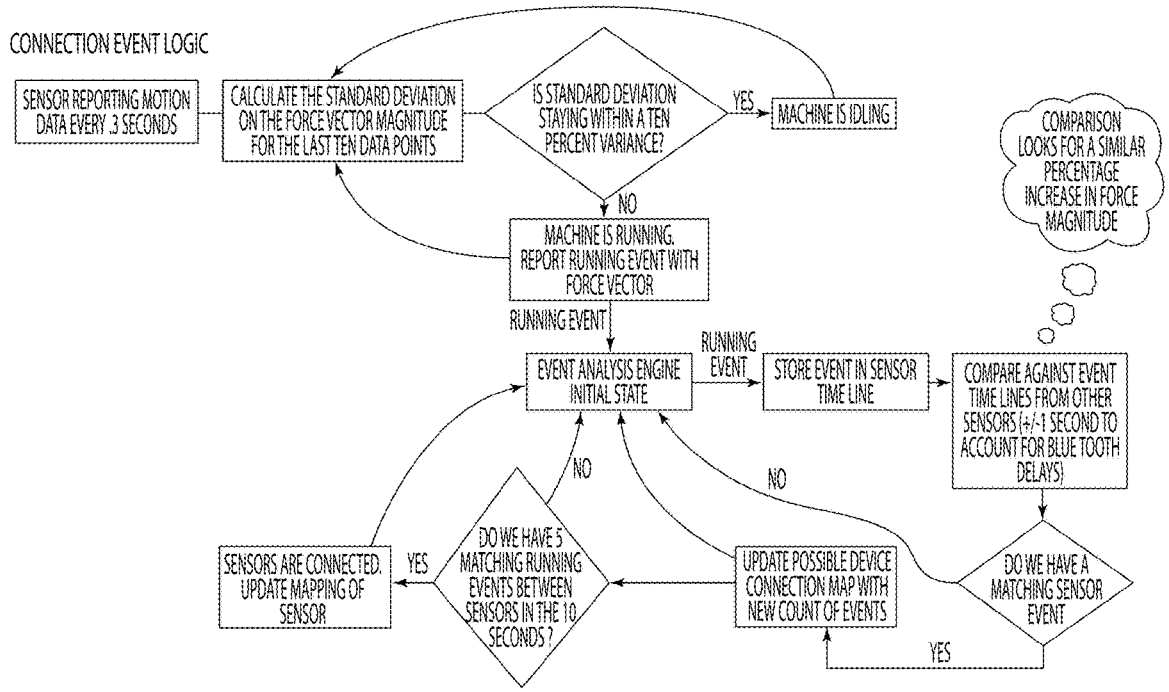
FIG. 49 shows one example association method using standard deviation to filter probable associations.

FIG. 49 shows one example association method using standard deviation to filter probable associations. When the associations are made the data can be compared to limits and thresholds for relative event monitoring.

Each accelerometer sensor in the system can report accelerometer data continuously or periodically at a predefined rate (e.g., every 0.3 seconds). In alternative embodiments, accelerometer data can be reported at a different rate. It is worth noting the accelerometer data may be sampled at a different rate than it is reported.

The accelerometer data from each accelerometer can be communicated to a processor. The processor can determine the force vector magnitude from the raw accelerometer data. A force vector magnitude generally refers to the magnitude of the resultant vector from a sum of the vectors from the accelerometer.

The processor can calculate the standard deviation on the force vector magnitude for a previous number of data points (e.g., over the last ten data points). If the standard deviation is within a predefined percent variance (e.g., 10%) the accelerometer's device is labeled as idling. If, instead the standard deviation of the force vector magnitude is outside of the predefined percent variance (e.g., 10%) the accelerometer's device is labeled as running and a running event is generated and communicated to an event analysis engine.

Upon receipt of a running event, the event analysis engine stores that event in a sensor timeline. For example, the event may include a sensor ID, a time stamp, and a force vector magnitude for the running event. An example of this could range from an interaction with a service device to contact with a new work tool. Additional sensor data could be air quality or cycles of a specific event or pattern stored in the accumulators.

One embodiment of the event analysis engine is configured to determine whether two devices are associated (e.g., physically connected) by determining whether other devices have had a similar relative change in force magnitude.

The relative change in force magnitude can be tracked in a variety of different ways. In the current embodiment, the running event force vector magnitude for a given accelerometer is compared to the previous running event force vector magnitude for that accelerometer to determine a percentage change in force magnitude. For example, if the previous running event for a vehicle sensor had a force magnitude of 5 m/s$^2$ and the latest running event for that vehicle sensor has a force magnitude of 8 m/s$^2$, the percentage change in force magnitude would be 60%. In alternative embodiments, the percentage change in force magnitude could be calculated in a variety of different ways such as by using a running average of a predetermined number of samples. The mass and rotation of an excavator can impact these ratios. For example if the bucket is extended and the vehicle is on an angle the weight of the bucket and arm can impact the safety angle dramatically. This can be exaggerated if the bucket is loaded.

In the current embodiment, the percentage change in force magnitude can be compared against event timelines from other sensors to determine if there is a matching sensor event. That is, because of communication delay of the accelerometer data, and because the accelerometer data may not be synchronized, the percentage change in force magnitude can be compared against values slightly earlier or later in time from other accelerometers. For example, if the sensor on the vehicle attachment saw a 59% change in force magnitude 0.3 seconds before (or after) the 60% change in force magnitude in the vehicle, the event analysis engine can register that as a matching sensor event. If a matching sensor event is found, a device connection may be updated in memory. Once a predetermined number of matching sensor events are detected within a predetermined time frame, the devices can be associated in memory and tracked accordingly. For example, in the current embodiment, the event analysis engine considers devices associated if there are five matches within ten seconds.

Additional accelerometer data can be derived from the various g-readings provided by the accelerometer. For example, some embodiments may calculate the angle of the force vector as well as the magnitude of the force. The accelerometer data can be used not only for detecting associations with other devices, but also for tracking other metrics.

FIG. 50 shows another method to capture, save and transfer sample data. This system captures the input, frames the data, sums the data with a homing zero crossing window, and then converts the data into an FFT and compares that data to an FFT. This allows the mathematical solution to be captured, transferred and compared with minimal data transfer. The FFT is the mathematical expression of the signal sample. Acceptance ratios can be used in the amplitude and frequency vectors. This method takes a complex frequency and amplitude domain signal to an equation. The equation can then be compared within an acceptance window set by the factory.

FIGS. 51A and 51B show a scoring method with the time and amplitude minimum and maximum values for the window for each peak. The primary signal (PS) is compared to these values for acceptance. The acceptance ratio can be changed for more or less resolution and sensitivity. Acceptance is the sensitivity window of the comparison between the reference signal to the active signal. If the acceptance is low a basic signal may pass, if the acceptance is high the exact signal is required.

FIGS. 51A and 52B also show a method for normalizing the data across the multiple monitors. By normalizing the monitors across the network a common signal is provided and an offset is provided that can be used for understanding the differences between the monitors. This data can be used for wear calculations and table comparisons and look-ups to calculate wear.

FIG. 52 shows one example of the difference in the monitored data and the range of acceleration operation. The differential data shows the +/− index for that monitor location or device. An example of this is the operator's mobile device located in the cab. It shows that it is isolated or dampened by the shocks in the seats and cab. These signals, while normalized, allow easier comparison while the difference data can also be compared as an expected range of performance. These windows of difference are also indications of performance changes. Shocks, dampers, and other key performance criteria can be monitored for wear and trigger replacement.

The data for each of the monitors can be collected for a predetermined amount of time or a predetermined number of samples. The data for each of the monitors can be analyzed to obtain a maximum value, minimum value, span value, average value, and a differential value. The units for these values can be described in terms of gravity, for example ±2 g/±4 g/±8 g dynamically selectable acceleration and ±1200 μT magnetic sensor. Although this embodiment utilizes acceleration data for associations, other types of sensor data such as sound data can be added to enhance this relationship and add another dimension for monitoring and comparison. The calculations, filters and pattern matching techniques are similar for sound data analysis.

C. Tip-Over and Shock Events

Accelerometer data can be used to detect tip-over and shock events. For example, accelerometer data can indicate a vehicle has tipped over on its side or a crash has occurred.

A vehicle can roll in the pitch or roll directions. In one embodiment, the rolling data of averages can be monitored while looking for a change of greater than 45 degrees in the pitch or roll vectors.

The relationships between the Z axis or heading can be monitored between accelerometers. Examples of use include angles between cab (A) and trailer (C), pitch events, speed and roll events. The differential information between these systems can be used for understanding operator (D) activity while driving, relationship activities between the cab and trailer and multi sensor confirmation of major events like tip-overs. A wearable device or a mobile device can monitor the associated operator (D) activity.

An example of a method for detecting a tip-over event will be described. A tractor, trailer and transport vehicle are each provided with an HDi monitor. The tractor can have a separate series of movements while connected to the trailer. This is also true with the transport vehicle. The relationships of the transport vehicle to the trailer, and the trailer to the tractor, can be monitored for orientation as well as for tip-over events. A tip-over event can be a predetermined change in a roll or pitch vector greater than a predefined threshold. For example, in one embodiment, a tip-over event is generally considered a 45 degree change from the associated running average of the operating plane. A calibration can be used to establish the ground plane or a gyro can be used to establish the gravitational direction. The associations also allow for driver status or presence through a wearable device or mobile device.

The tip-over detection may account for environmental conditions. If it is raining in that area the soil may be less stable. The system could monitor environmental conditions that could impact performance The tip-over detection may be configured to detect not only a force vector above 45 degrees, but also the accompanying change in force magnitude by the stop.

In response to a tip-over event, an HDi hub can be configured to communicate a notification.

The tip-over detection may include notifying the user of a danger zone where the vehicle is starting to tip over. Further, the tip-over detection may factor in the specific equipment or combination of vehicle and work tool installed on the vehicle. For example, the specific vehicle and work tool combination may affect the tip-over angle and the tip-over angle danger zone.

A shock event or destructive energy event can also be detected by accelerometer data. For example, a user may use a work tool improperly exerting non-standard force on the work tool causing wear, such as using a bucket to pound in a post. A user may have a crash, drop the vehicle, or drive the vehicle recklessly in such a way as to stress the vehicle. The effects of the stress caused by these destructive energy events may not be immediately apparent, but with accelerometer data, the events can be detected and used to address the user in question as well as used in maintenance of the vehicle.

D. Wear Tracking

As discussed in more detail above, tracking the wear on vehicles and work tools is useful. Accelerometer data can assist in this regard. Raw accelerometer data can be processed to provide a variety of different metrics. An example would be watching wear out over time. The signature can then be transformed to limits and triggers for that specific wear out. Identifying these patterns are all about monitoring the raw data and mining the possibilities. The associated activity data among the monitors can be used to assure safety, enable training, and understand use. The use and associations can be used to calculate wear over time. This calculation uses wear index tables for each association.

E. Security

Typically security devices are connected via wireless or wired means. By associating monitoring devices by wireless communications and physical associations, an additional layer of security can be provided. For example if a vehicle being monitored is on a trailer and the vehicle is moving but the trailer is not, a theft event can be triggered. The addition of the physical association verification for monitors connected to the physical entity.

An example of this is a rules-based security system and would be a system that maintains and monitors the present security associations. If a vehicle or the associated device is moved, any unauthorized changes can trigger a theft event. This can be a work tool, vehicle or other device.

An operator interface may be a wearable accelerometer with a BTLE device or a mobile device. The movement of a fuel cap or tank tampering can indicate fuel theft. A gas cap monitor can be utilized.

Unapproved starting of a vehicle may lead to lock out. Lock out can include turning the engine off or locking out engaging the transmission and hydraulics. This can be done through commands sent on the CAN bus and connected to the engine control system. This same system can be used on work trucks for significant tools.

By having several sensors associated the probabilities are higher for event recognition like tip-overs and other pattern-based activities. Security is also enabled by assuring associations. When these are broken or security rules are changed, theft is reported.

The HDi system can provide coaching. For example, using the tracked relationships coaching opportunities on a user's mobile device or via output provided in the vehicle, coaching can be provided to the user. The coaching can be based on the tracking data, for example, the type of vehicle, the type of attachment connected to the vehicle, and/or the user's experience with that type of vehicle and/or the particular attachment connected to that vehicle. For example, if a vehicle is connected to a grinder or tree-barking attachment, coaching can be provided to the user providing instruction about how to use the grinder or tree-debarking tool. Further, if there is user experience data available, for example if the number of hours the user has worked with a tool has been tracked and is over a threshold amount of time, a different set of coaching instructions can be provided to the user tailored for that experience level or situation. The user may be required to review a training lesson based on the user's profile. For example, if the user has never used the vehicle or work tool before, the system may require the user to watch a training lesson.

The coaching instructions may also provide tips based on the context of the situation, for example, if the attachment is attached to an undersized or oversized vehicle, different coaching instructions may be provided.

Coaching may also be provided in response to events. For example, if the system detects a tip-over event, coaching instructions can be provided that instruct the user on what to do, for example how to get the vehicle back into its upright position.

The relationships between vehicle, work tool, and user device can be used to develop a heavy duty equipment profile for a user. The profile can track the total amount of hours of use for each vehicle, each work tool, and each vehicle/work tool combination. Further, feedback or grading, such as a 5 star grade can be recorded for the user's expertise for each piece of equipment. An objective score may be provided based on a predefined set of criteria, for example, if the user has fewer or more than a predefined number of shock/destructive energy events for a period of time, the user's grade may increase or decrease respectively.

An event may trigger maintenance. For example, if the system detects a tip-over or a destructive energy event, maintenance can be scheduled to determine damage and whether any repairs are recommended.

An event, such as a threshold darkness event, threshold humidity event, tip-over event or destructive energy event can be reported to an owner for enforcement of a rental agreement. Rental agreements may have clauses where the renter agrees to use the heavy duty equipment in a particular way, for example, the agreement may include a clause requiring the user not to use the vehicle at night or in the rain. Further the agreement may specify that the user must pay a fine if they crash the vehicle, tip-over the vehicle, or drive the vehicle into water. The HDi sensors can detect these events and report them to the owner so that such rental clauses can be enforced and the renter can be forced to pay a fee.

Social Mesh Network

A social mesh network can store social interactions in a layer of information as a way to inform and broaden the IOT device perspective. This disclosure details a communication protocol that will enable iOS, Andriod, OSX, Windows devices, WiFi, 802.15.4 devices, RFID and other communications within a network or ecosystem. This opens the door to a wider communications protocol over many networks for various specific needs within this ecosystem.

This disclosure shows how a machine social mesh network can enable tracking of social events, connections, and interactions between heavy duty equipment, attachments, and mobile devices. For example, knowing an operator is near a piece of heavy duty equipment, or knowing that a certain attachment is or is not attached to certain heavy duty equipment can be valuable. Different assets from different machines and IOT devices can be used to communicate within the network sharing this type of information, which can improve interconnectedness to the cloud. Other examples include interactions between heavy duty equipment, attachments, and mobile devices, service devices, RFID tags, stationary sensors, gateways and jobsite hubs.

Heavy equipment, such as a vehicle can have many different interactions. For example, heavy equipment can interact with other heavy equipment, work tools, or attachments. There can be a wide array of different interactions tracked, for example tracked interactions may include attaching an attachment, replacement of a wear part, wear on a wear part, maintenance on a wear part, or vicinity tracking among the various devices. Today those interactions are not tracked or monitored. A social mesh network protocol can provide low-cost tracking in an interoperable format to connect IOT devices, vehicles, service personnel devices, maintenance personnel devices, inspection personnel devices, and fleet management systems to manage and understand interactions associated with each vehicle and its network.

Figure 54:
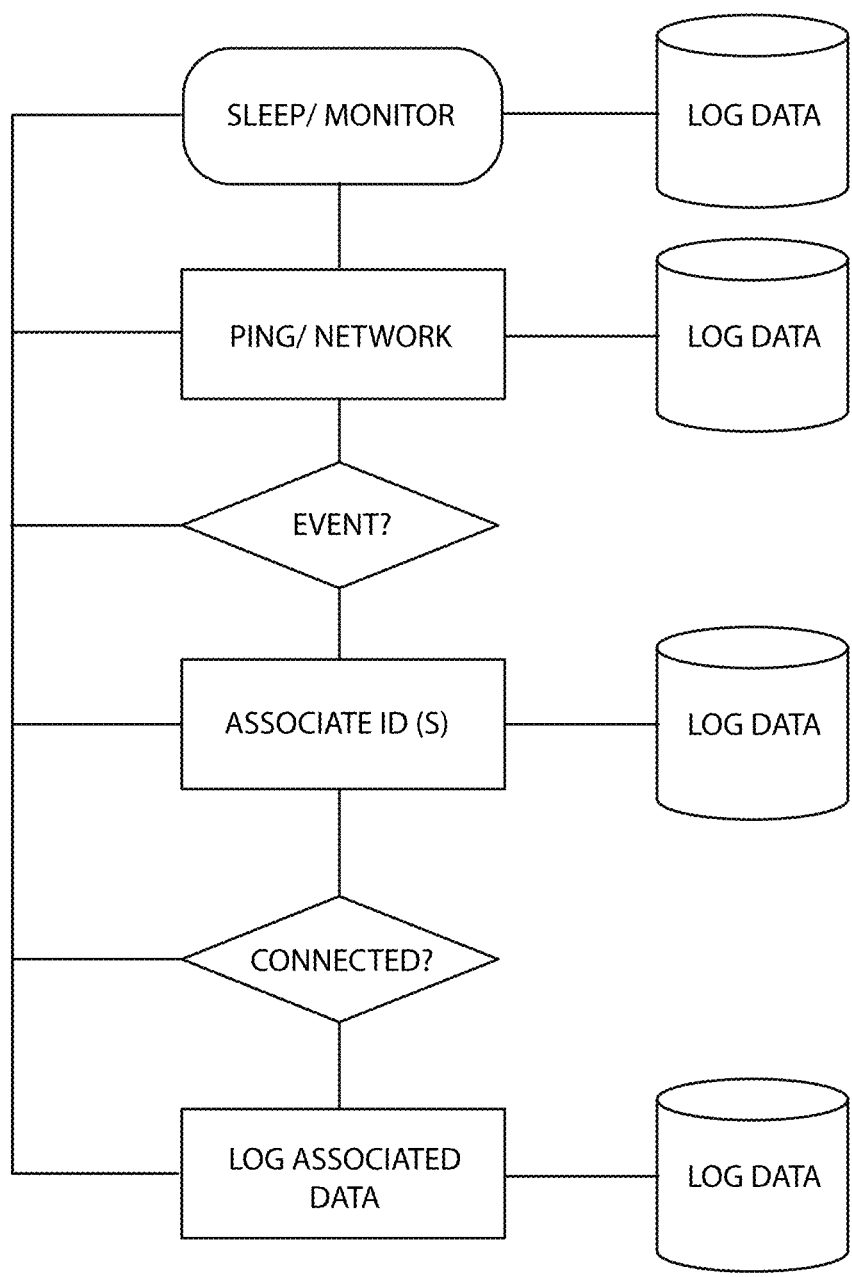
FIG. 54 shows a flow diagram.

FIG. 54 illustrates one embodiment of a social mesh map of a heavy duty market. This map illustrates examples of various interactions in a heavy duty market. A social mesh protocol enables devices associated with each entity on the map to recognize and record the various interactions. For example, the fleet has vehicles, inspectors, brokers, operators, renters, new equipment reps, used equipment reps, replacement parts, work tools, service reps, factory reps, and all of these interact. Interacting in good ways and in bad ways. These interactions are typically around a cause associated with the events within this network. The devices in this ecosystem can interconnect.

For example, when an inspector walks up to a piece of equipment to inspect the quality of the undercarriage it would be valuable if that vehicle shared its serial number, past history, hours, and service history. This information can be shared without reaching a security level important to managing vehicle health. A network having Bluetooth low energy from a tablet connected to Bluetooth low-energy dongle or monitor in the vehicle can establish a connection. The BTLE advertised serial number becomes a key data point to start this interconnection.

The social mesh protocol allows information sharing between two devices using the social mesh protocol without having to conduct an authentication step. Certain data in the social mesh protocol layer can be communicated among social mesh protocol devices without the hassle and time of establishing a secure connection.

One known problem of a pairing scenario is that users on one or both devices have to take some action in order to accomplish the pairing. In contrast a social mesh protocol can enable communication without pairing in a way that is practically seamless to the user. Additional information to be shared fortifying and enhancing the data collected in the process of interacting. A secure paired connection can still be created in which more sensitive data can be communicated between and among devices.

This also allows for various levels of intelligence associated with these devices. It is low cost to build an hours of activity monitor that can be placed on a work tool and only when it sees a connection to a device will it be enabled to communicate to the cloud. If the social mesh network is utilized we can see how a flag can be posted by a device and when it comes in contact with other devices that have usable assets to communicate to the cloud, such as cellular or Wi-Fi or Internet connected device becomes more intelligent and capable utilizing this protocol.

Figure 55:
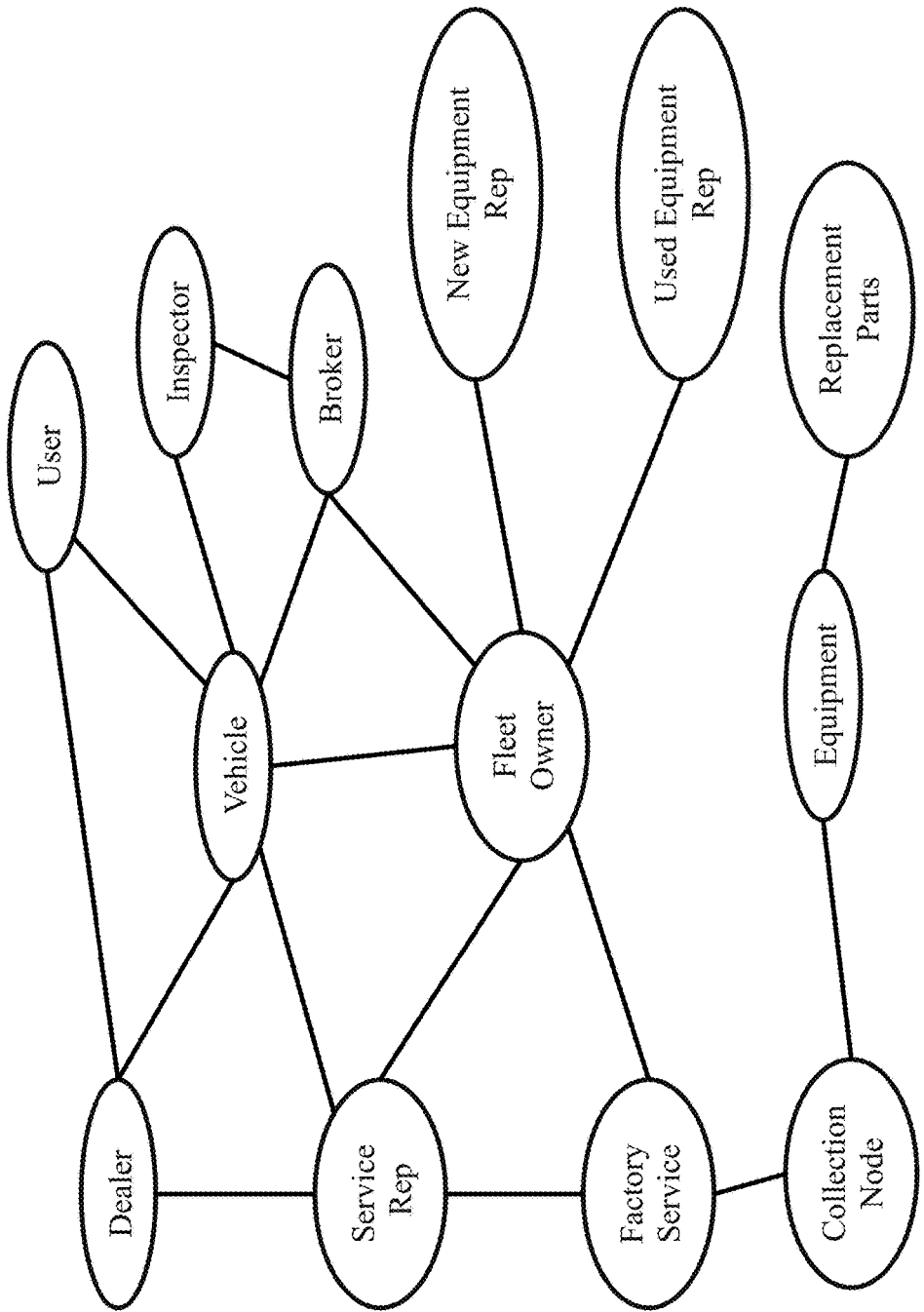
FIG. 55 shows one embodiment of a mesh map with a view of potential interactions within the ecosystem of heavy equipment.
Figure 56:
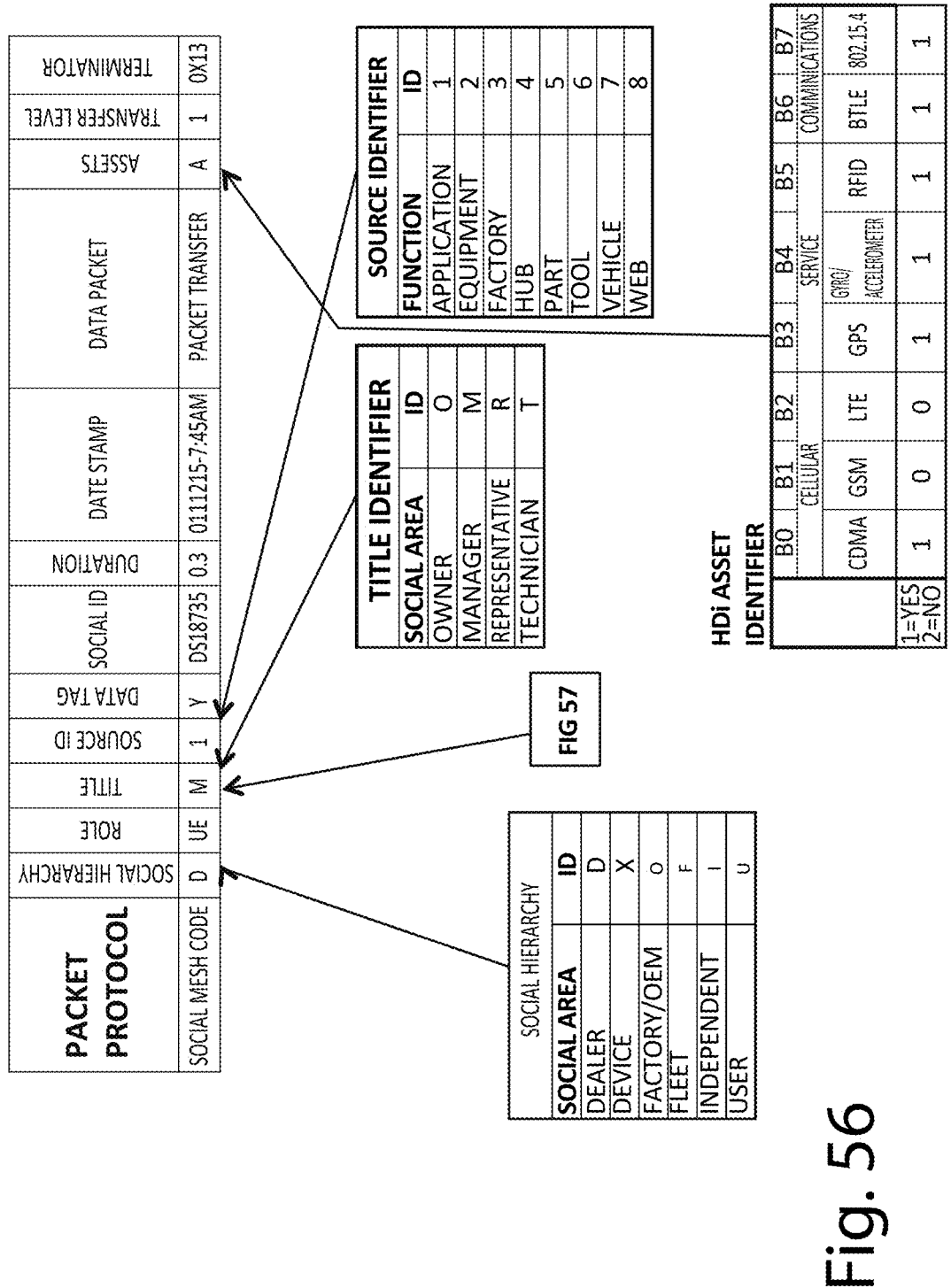
FIG. 56 shows one embodiment of a portion of a mesh protocol that defines the identifier that details an interaction.
Figure 58:
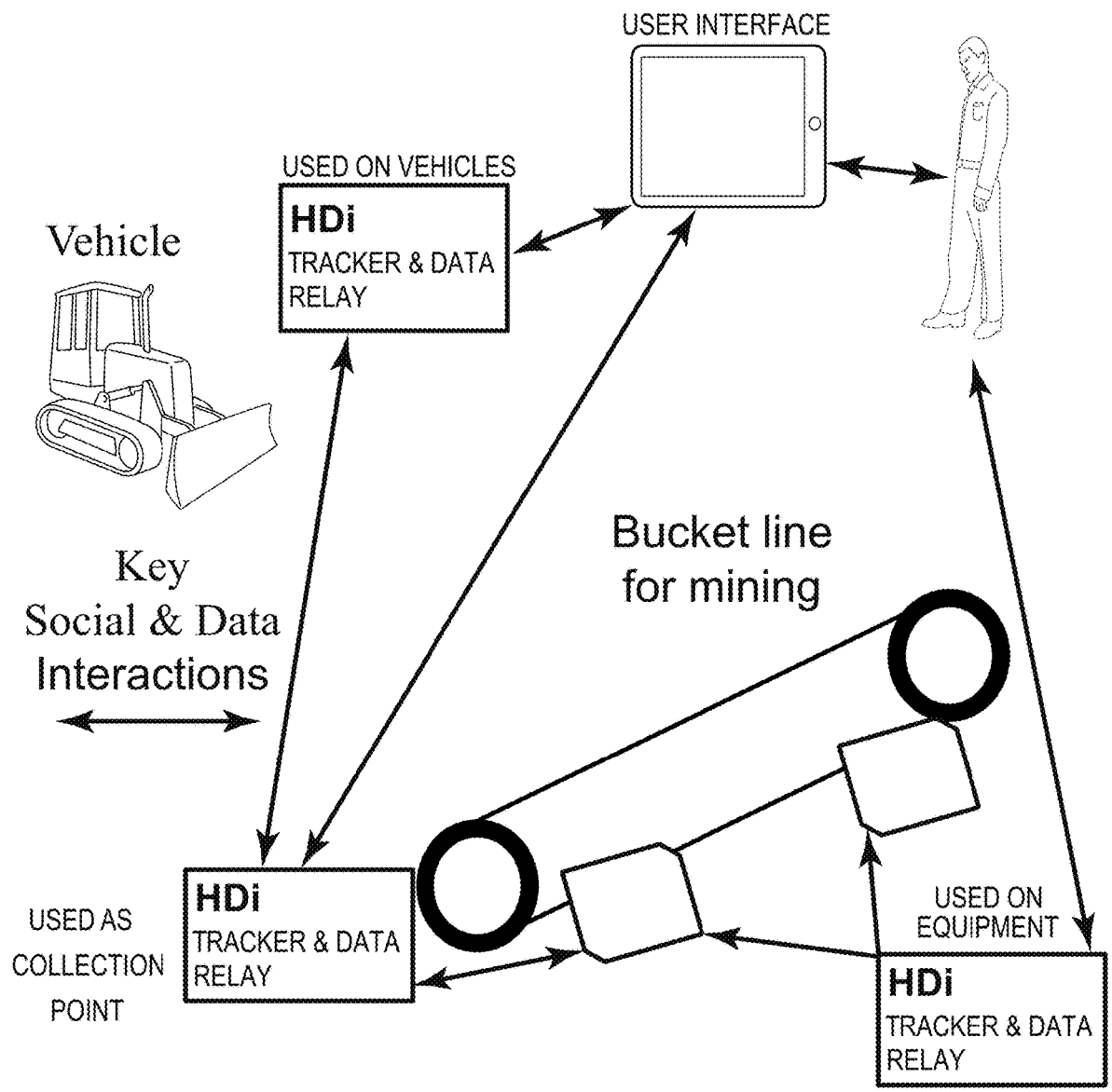
FIG. 58 shows a jobsite example of tools, vehicles and people that represent machine and social interactions.

FIG. 55 shows the benefits of tracking a social connection layer of information to the user, to the factory, and into the various levels of users within an ecosystem. An example of this is that tracking service, inspections and interactions have typically been a manual effort of associations. Utilizing the social mesh we can see how a vehicle identification number can be used to see a complete history of interactions within its ecosystem. This can be achieved if the network is enabled to communicate, track and store this type of information.

The social mesh protocol can create unique identities and share those identities and those interactions in a way that allows each application, each vehicle, and each work tool to gain this information associated with its associations within the ecosystem. An example of this would be a report that shows the utilization of each work tool, what vehicles these work tools were attached to, and how they were used. This would allow for service personnel to understand how long each vehicle was used and with what piece of equipment so that they could service equipment appropriately. These reports can be generated automatically based on hours of usage and where associated with that usage.

Another example is that if an OEM wanted to understand certain characteristics associated with a vehicle and saw a specific anomaly associated with that vehicle additional information can be obtained by understanding what work tools that vehicle was involved with or associated with and during what time to gain additional knowledge of that particular wear. This type of information tracking provides powerful engineering insights that have not been available before.

Table 1 shows one embodiment of a value map for the benefits to respective Social Mesh Interface Groups.

TABLE 1

| Area of Interface | Responsibility | Connectivity Hub: | Connectivity to: | Connectivity Tools | Factory Benefits | Benefits to Responsibility Holder |
|---|---|---|---|---|---|---|
| FACTORY | Factory quality | HDi | Quality Tools | Factory quality and tracking tools | Vehicle history and ongoing user habits | Connection to vehicle for change management and tracking |
| | Factory testing | HDi | Test Tools | Factory quality and tracking tools | Vehicle history and ongoing user habits | Connection to vehicle for change management and tracking |

TABLE 1-continued

| Area of Interface | Responsibility | Connectivity Hub: | Connectivity to: | Connectivity Tools | Factory Benefits | Benefits to Responsibility Holder |
|---|---|---|---|---|---|---|
| | Factory sales rep | HDi | Sales Tools | Factory quality and tracking tools | Start the social tracking for the organization and hierarchy | Vehicle data and history over the whole database for performance |
| | Factory parts rep | HDi | Parts testing and sales tools | Factory quality and tracking tools | Track the performance of various suppliers and engineering methods over usage | Part data ad history over the whole database for performance |
| | New equipment rep | HDi | Sales tools | Factory quality and tracking tools | Track social engagement of the network and time spent | |
| | Factory service rep | HDi | Service, parts & History tools | Factory quality and tracking tools | Understand service by model and part type and user habit, informs engineering | Service knowledge and history by vehicle, track time by rep and service network |
| DEALER | Dealer sales | HDi | Inventory, sales tools, test tools | Dealership management tools | Track times and contact by staff with equipment and users; Historical part information and usage | Dealer sales and engagement |
| | Dealer service technician | HDi | Service tools | Dealership management tools | Track times and contact by staff with equipment and users; Historical part information and usage | Historical service and interface information |
| | Dealer parts sales and service rep | HDi | Parts and service tools | Dealership management tools | Track times and contact by staff with equipment and users; Historical part information and usage | Historical parts and service information with usage stats |
| | Dealer parts sales and service manager | HDi | Parts and service tools | Dealership management tools | Track times and contact by staff with equipment and users; Historical part information and usage | Historical parts and service information with usage stats |
| | Fluid tech | HDi | Testing and parts tools | Dealership management tools | Track times and contact by staff with equipment and users; Historical part information and usage | Historical parts and service information with usage stats |
| USER | Operator | HDi | Cell phone operator tool | Operator history, expertise, training and performance | Training and best practices understanding | Information and training |
| FLEET | Fleet owner | HDi | Use tools, service tools | Fleet management tools | Track times and contact by staff with equipment and users; Historical part, service and usage information | Fleet performance and history |
| | Fleet manager | HDi | Equipment usage and maintenance | Fleet management tools | Track times and contact by staff with equipment and users; | Fleet performance and history |

TABLE 1-continued

| Area of Interface | Responsibility | Connectivity Hub: | Connectivity to: | Connectivity Tools | Factory Benefits | Benefits to Responsibility Holder |
|---|---|---|---|---|---|---|
| | Fleet service technician | HDi | Historical service, and interactions | Fleet management tools | Historical part, service and usage information Track times and contact by staff with equipment and users; Historical part, service and usage information | Fleet performance and history |
| | Rental equipment manager | HDi | Inventory, service, equipment & service tools | Fleet management tools | Track times and contact by staff with equipment and users; Historical part, service and usage information | Fleet performance and history |
| | Fleet service technician | HDi | Inventory, service, equipment & service tools | Fleet management tools | Track times and contact by staff with equipment and users; Historical part, service and usage information | Fleet performance and history |
| INDEPENDENT | New equipment rep | HDi | Sales tools | Factory tracking tools | Range of users and how they use data | Connection to the data for a vehicle |
| | Independent service technician | HDi | Inspection tools, service tools, history, sales tools | Factory tracking tools | Range of users and how they use data | Connection to the data for a vehicle |
| | Auction house manager | HDi | Inspection tools, service tools, history, sales tools | Factory tracking tools | Range of users and how they use data | Connection to the data for a vehicle |
| | Used equipment rep | HDi | Inspection tools, service tools, history, sales tools | Factory tracking tools | Range of users and how they use data | Connection to the data for a vehicle |
| | Inspector | HDi | Inspection tools, service tools, history, sales tools | Factory tracking tools | Range of users and how they use data | Connection to the data for a vehicle |
| | Broker | HDi | Vehicle history, sales tools | Factory tracking tools | Range of users and how they use data | Connection to the data for a vehicle |
| | Third party suppliers | HDi | Part validation & comparison tools | Factory tracking tools | Range of users and how they use data | Connection to the performance of parts in the field |

The social mesh protocol utilizes social IDs based on each device, vehicle, work tool, etc., tagged as a social event. Each social event is an interaction; these interactions can be for service, inspections, or an operator using the tool or vehicle. The vehicle driver is also associated with that vehicle. The drivers associated with times of use for each vehicle can be recorded as part of the social mesh protocol. When we look at where machines and the associated users are, we can start to see statistically some users cause more issues on certain vehicles and which users are more efficient in the way they're using the vehicles. This information can assist training and coaching users to become better operators and more efficient at utilizing vehicles in different ways.

Increasing the user experience in new ways can allow vehicles to be designed for these new uses and not the unplanned use case. An example is when you know how the vehicle is actually being used it will provide additional insights into the overall use distribution so that designers can be informed and clearly define functions. The social IDs are designed to share the assets available and whether there is information to transfer enabled with a flag. The social ID also has a directional queue that enables the system to understand where the information should go. The social hierarchy and roll is a queue for the server to understand the path and relational aspects of that data. The fleet, dealer, and operator IDs all have specific data that gets updated. A date stamp and duration can also be included in that information in order to determine how long that social interaction took place. This protocol by itself has interesting value but when the monitor data from the vehicle is associated with this data, interesting statistics can provide valuable insights.

Another aspect of a social mesh protocol and network is that a hierarchy allows hubs and other devices to be used to upload information. An example of this is a mining bucket that contains a monitor to be in contact with an operator cell phone. Information can be uploaded through this network. This way each device seeks the best or near best possible way to communicate through the mesh to push data up to the cloud. Within this IOT ecosystem can be tablets that contain APIs, the IOT devices can be enabled with this protocol, vehicle telematics can be interconnected and maintain this protocol and all communicate within an ecosystem. A fleet manager can be enabled to look out over the vehicles and immediately report on inspections, service statistics, and wear data. This information can help rank and identify vehicles that need service, but have not had attention within the social network. It also allows for a ranking system to be connected to the service reps that are assigned to these vehicles if the vehicle has not been inspected or serviced or monitored and get the proper attention by service personnel. Today this is done by manual entry and can be overlooked.

Social interactions are a viable way to track wear within a vehicle. An aspect of the social interactions can be jobsite specific with a GPS location. Machine social interaction can be using a hydraulic hammer for weeks on end that may impact the overall performance of the vehicle. Social interaction can also be operators that tend to drive vehicles more harshly than other operators and have a statistical outcome associated with the use of their vehicles. This allows for pay scales to be based on these interactions as well as a potential rental rate being established based on having predefined quality of operation ratings.

The hardware associated with this ecosystem can be mobile devices, tablets, and computers for IOT devices. FIG. 59 shows a device that uses 802.15.4 communications with other devices or vehicles within its network, this can also include work tools. The illustrated configurable monitor includes a vehicle bus interface, in the depicted embodiment a CAN bus interface, a three axis accelerometer, a battery for power supply, and a GPS system and monitor telematics while utilizing cellular communications. The hardware can also have Bluetooth low energy to communicate to portable mobile devices. In this case we also show an ultrasonic transducer that listens to the chassis noises and ultrasonic information communicated through the vehicle. This may provide additional inner information on environmental conditions and wear issues associated with preprogram patterns. This information can be collected by a configurable HDi monitor as described in U.S. Patent Application 62/212,270 to Baarman et al., entitled CONFIGURABLE MONITOR AND PARTS MAINTENANCE SYSTEM filed on Aug. 31, 2015, which is incorporated by reference in its entirety.

Figure 60:
FIG. 60 shows one embodiment of a network of attachments and intercommunications within range.
Figure 62:
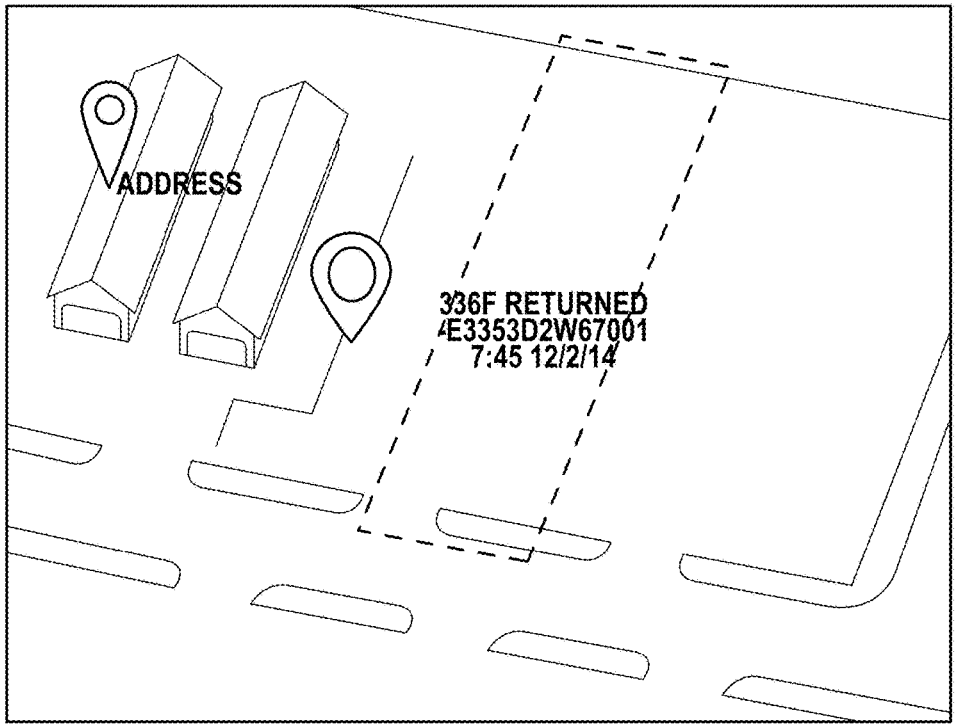
FIG. 62 shows that machine social ranking is also about geo-fencing and location.

FIG. 60 illustrates interactions associated with the 802.15.4 network protocol. Work tools can be associated when attached to a vehicle and tracked when that work tool travels with the vehicle. The system can search what work tools are around the vehicle within a specific geographical area. This allows the operator to understand which assets are available locally and when looking deeper into the fleet network, what assets are available within the network. Once a network grows and becomes global, tracking assets and understanding what is available within a given region can be valuable for a rental business for sharing of these assets. Utilization of work tools and vehicles can be communicated to their user to understand whether he or she should trust their equipment and provide additional service opportunities associated with that equipment. This helps to build trust.

Another example of how a social mesh becomes a link to valuable information that can interconnect and provide insight into detail that can be obtained from the social interactions is shown in FIG. 61. The job site billing system is an example of how tracking of assets on a job site can enable additional understanding of usage and utilization that can be put directly towards a billing detail of tools, operators and interactions. This can be driven down even to small tools like saws and other hand tools. The inside of this data continues only as deeply as one desires to monitor within a jobsite. Without the ability to communicate between these different devices in a way that allows this information to be shared to the cloud and taking the social ID tag with an operator, these insights could not be gained.

Figure 63:
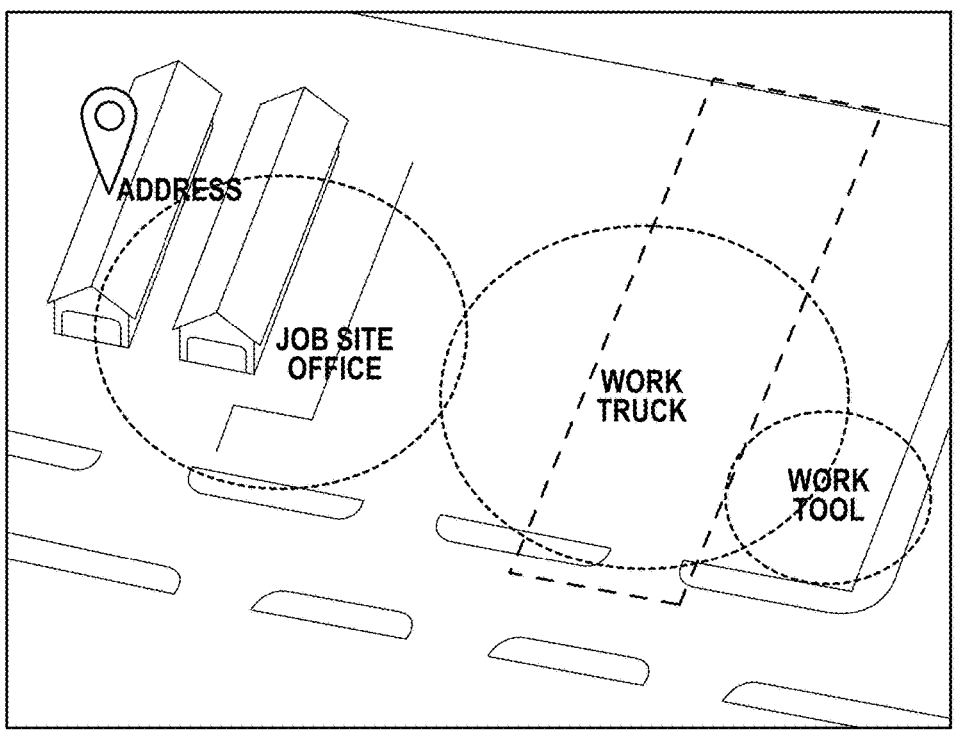
FIG. 63 provides an example of utilizing the mesh for communications by understanding the communications assets within the network to get the data to the end target.

Another aspect of the social mesh network is that by understanding the social interactions of the tools and assets within reach, a path can be established between a work tool in the jobsite office, for example. FIG. 63 shows a monitored site with multiple assets. The assets within the monitored site can communicate through those assets to a target. This can be increasingly important as ascertaining and tracking to understand what assets are available in any given time becomes enabled.

Although mesh networks exist today they do not connect to mobile devices and other Internet devices unless enabled through hubs or other dongles. The social mesh protocol attempts to connect these ecosystems and add a communications layer that makes this interconnectivity and interoperability seamless while tracking these interactions. The history on these interactions is valuable in understanding the life and history of each of these assets. The social mesh network enables predictive wear algorithms and service indications based on use within this network.

Figure 64:
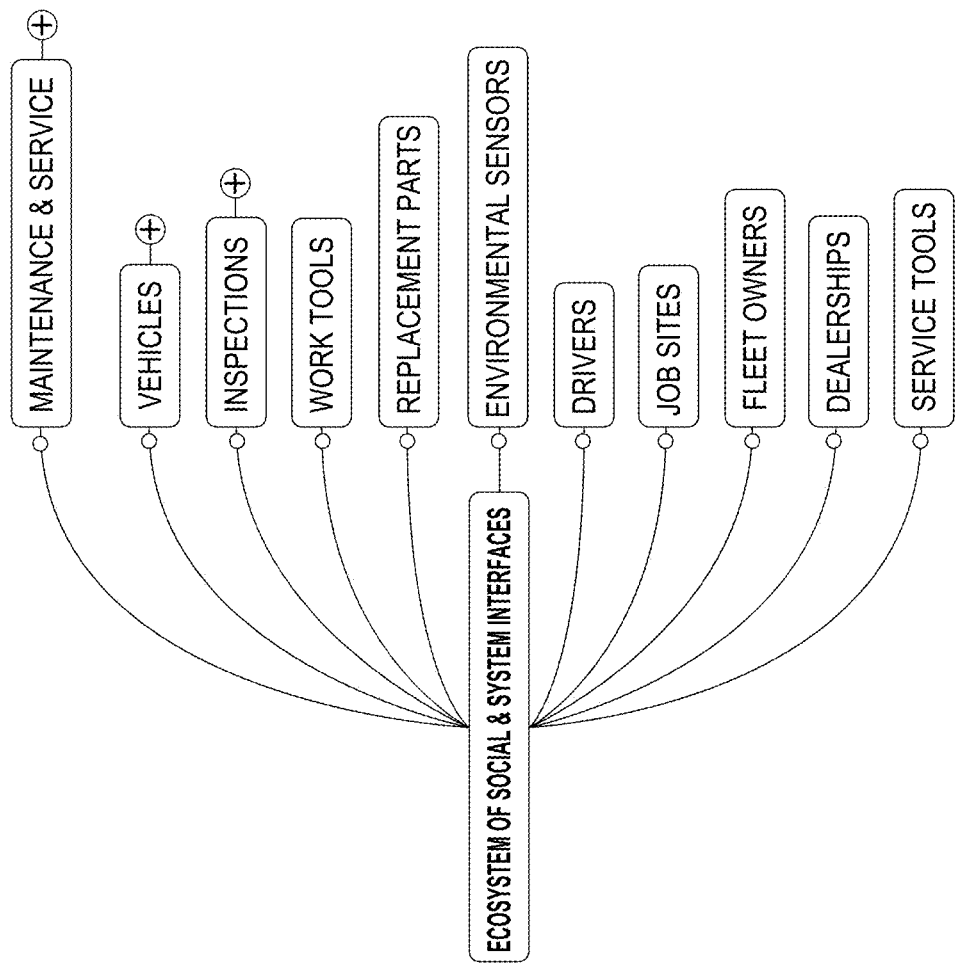
FIG. 64 details one exemplary vehicle experience scoring solution.

FIG. 64 shows an example of vehicle experience scoring. The system looks at each vehicle and ranks the service inspections for its interactions, its operators and their interactions, replacement parts, customer issues, technician interactions. These can be ranked against what is typical for each vehicle within those hours of use. Various different scores can be calculated including an improvise parts score a service score, technician score, inspector score which totals up to an overall experience score. This number relates to whether or not this vehicle has been serviced and maintained at a threshold level. These scores can be useful for the operator, the owner, the rental agent, the service tech in the factory each for various reasons. The example of this is that the factory is not replacing parts on this vehicle based on hours and based on use in the way the user fleet manager and others are going to have a sub optimal experience. To manage these types of experiences these types of ecosystem protocols to enable communications and to track these interactions.

Figure 65:
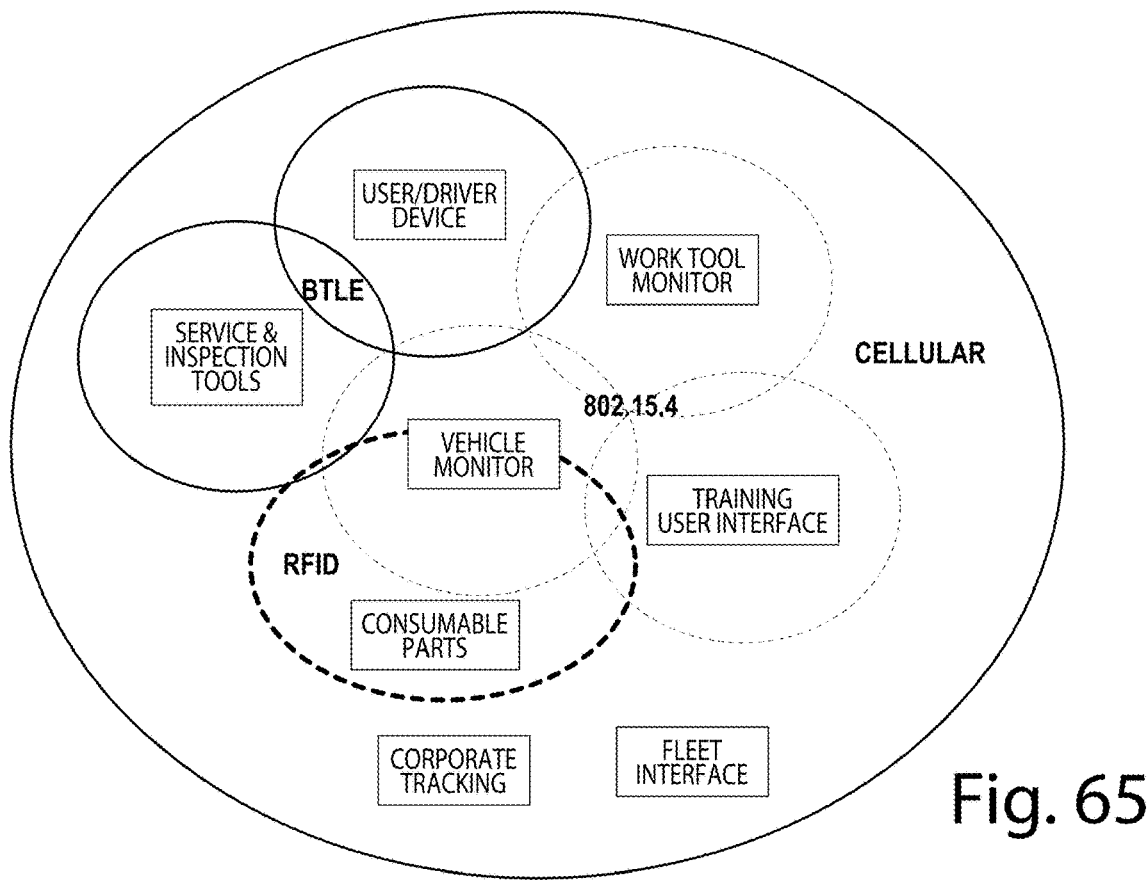
FIG. 65 details the communications assets within the network to communicate within the ecosystem.
Figure 66:
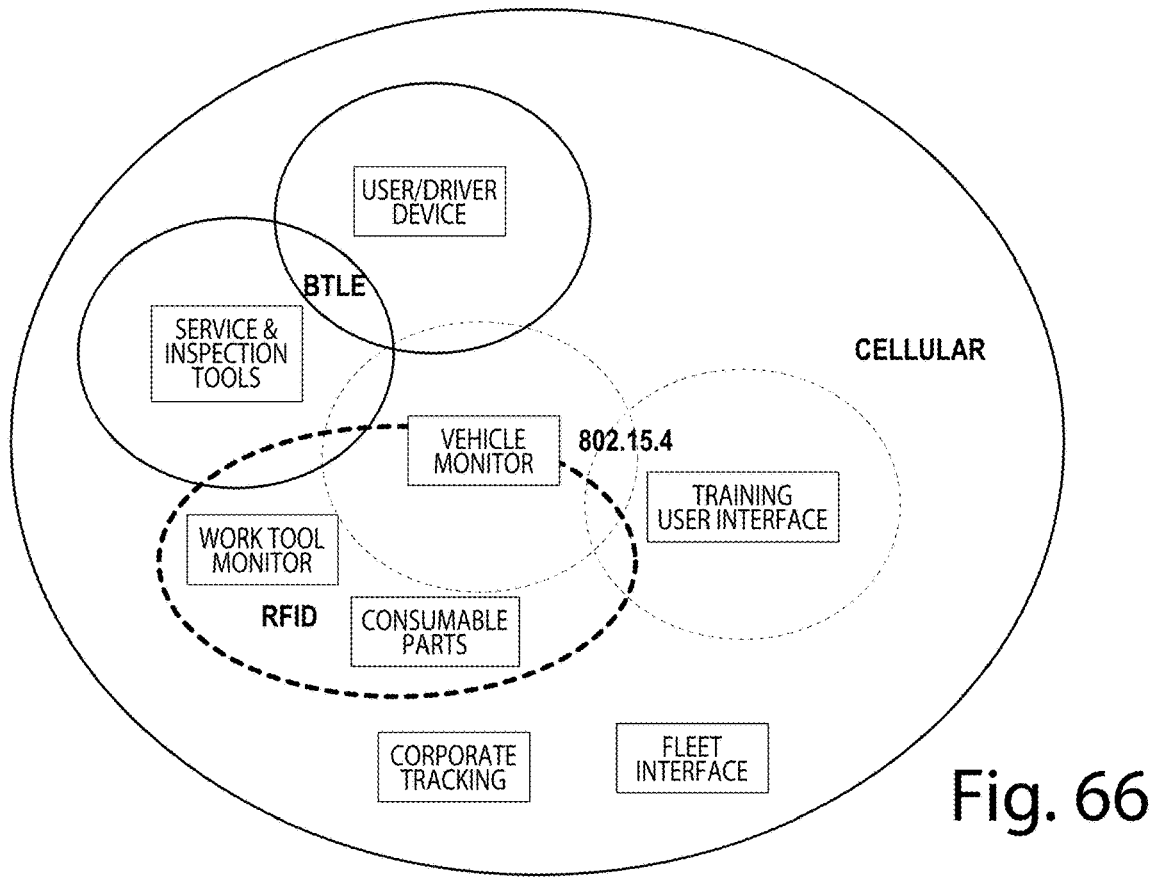
FIG. 66 details a change in communications assets and how the network might change if the work tool only had RFID communications assets.
Figure 67:
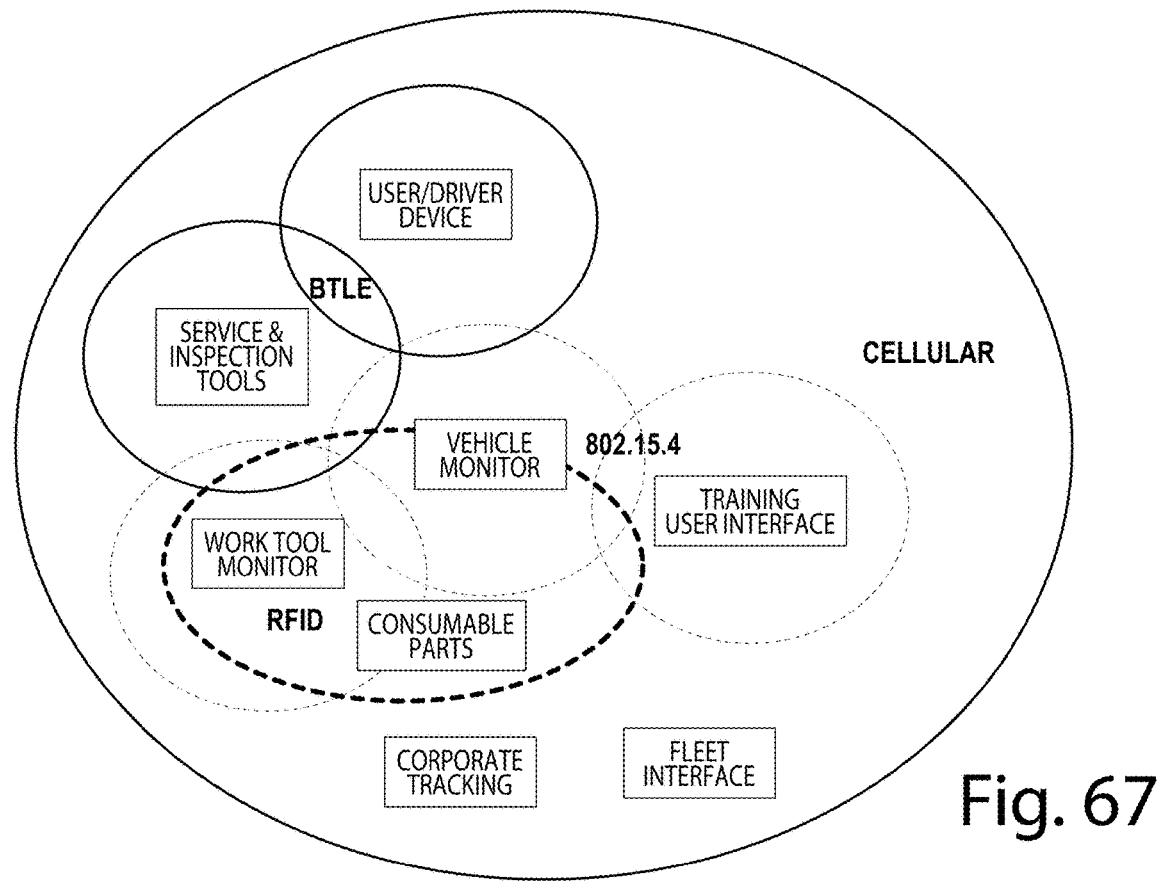
FIG. 67 shows what happens when the work tool has more communications assets. The mesh network now knows many ways to communicate through the network.
Figure 68:
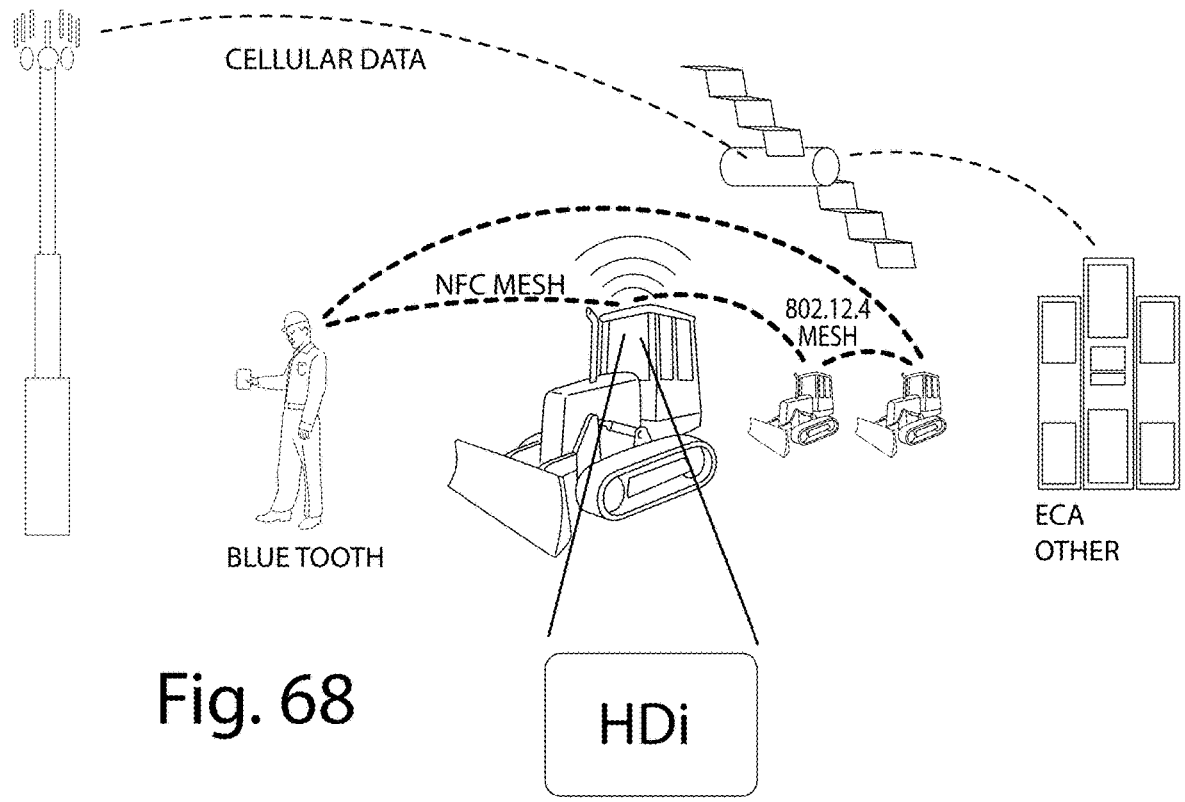
FIG. 68 shows an ecosystem with service tools, vehicles, cellular data, 802.15.4 networks and BTLE communications all completing a network.
Figure 69:
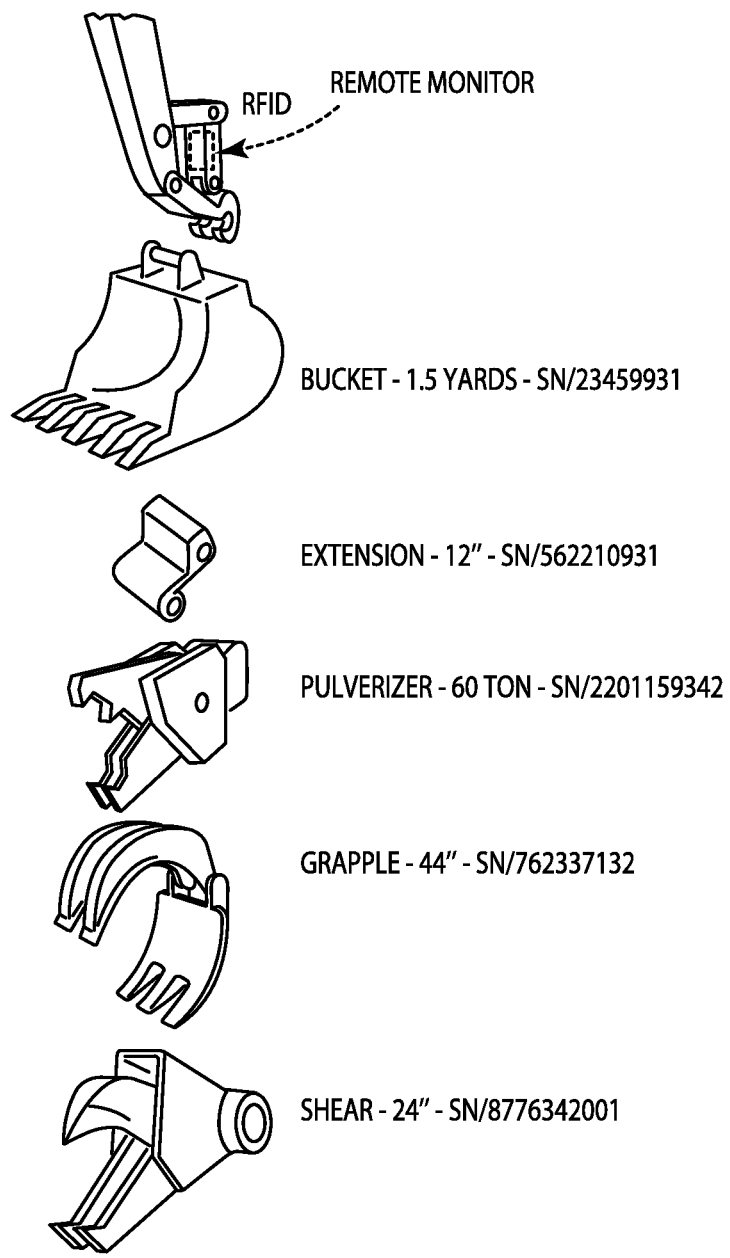
FIG. 69 shows how work tools can be identified and associated within the network to a vehicle using RFID.

FIGS. 65-67 show different ways that the social mesh can communicate information. RFID is one of the aspects of social mesh including social ID as part of the identification protocol for the RFID chip. Vehicle monitor with different assets can communicate different ways. FIGS. 65-67 show how communications work without the monitor. It does not have the 802.15.4 protocol that different communication methods can be used based on the associated assets around that device. An example of RFID use within the work tool environment can be to understand what work tools being connected to what vehicle listen to an RFID chip, passive or active, located in the work tool and the reader associated with the interconnection from the vehicle. FIG. 69 details the RFID communications to various work tools and how that might be configured. The ability to see and track these interconnections and the times of these associations.

Social mesh can have a social layer secure layer. Social layer allows interconnectivity and communications to all devices that interfaces with. It validates and tracks this as social IDs of those interactions based on the appropriate devices within that network it enables and allows the more secure communications to take place as appropriate but allows for that social interface to be tracked and maintained what other devices do not encounter and what other people are trying to communicate with, and what other operators are using so anything out of network can be tracked as well for security purposes. This allows common interactions to still push valuable information back to the user when assets are located or misplaced or stolen out of region.

This disclosure shows a completely new way to enable the interactions between devices to open up communications in a way that is enabling. The statistics and trackable information enabled by this ecosystem will become an invaluable source of information and insights to the design manufacture and optimization of not only vehicle use but the complete service maintenance and manufacturing ecosystem.

FIGS. 35-36 show possible network configurations of the HDi and IOTs a network. FIG. 37 shows the communications layers that can make the network seamless. The advertising mode is a layer that enables each asset of the network to be accounted for in the machine social mesh network. This protocol allows the system to know what other devices and communications types are available within the network. Once this is known the process in FIG. 38 can be used to identify IDs of these assets for further polling and communications directly as appropriate. This system enables multiple networks to exist serving different functions and capabilities.

Many communication protocols transfer IDs before authentication. For example, the 802.11, 802.15.4, and Bluetooth protocols all allow communication of an ID. In one embodiment, an ID can have a static portion and a dynamic portion. Further, the social mesh network protocol can be implemented as the dynamic portion of an ID. For example, if an attachment has a communication circuit that can communicate using the 802.15.4 protocol, instead of authenticating a connection to another device using that protocol and transferring information using standard 802.15.4 protocol procedures, the name of the work tool, vehicle, or attachment that is communicated during the 802.15.4 initialization procedures can be dynamically updated to include a social mesh network protocol packet (such as the one illustrated in FIG. 3). In this way, instead of the ID of the attachment being for example "Bucket 243" the ID of the attachment can be "Bucket 243—DUEM1YDS18735.30111215-7:45 am1001111A10x13". The identity of the attachment can be updated dynamically to convey information such as sensor information, time in use, or other data as discussed above. A similar approach can be taken with other communication protocols such as 802.11 and Bluetooth.

Some protocols include a pre-authentication mode such as the advertising mode in BLTE. Bluetooth advertising mode is a method of mobile marketing that utilizes Bluetooth technology to deliver content such as message, information, or advertisement to mobile devices such as cellular phones or tablet computers. A heavy duty social mesh network protocol can utilize the advertising mode to communicate between and among Bluetooth devices information about the status and metrics collected by various devices in the network. In this way, devices in the heavy duty social mesh network can communicate quickly and without authentication using a plurality of different communication protocols.

Referring to FIG. 37, the social mesh network protocol can allow communication between devices that utilize different communication protocols. For example, a hub HDi may include circuitry for communicating using multiple different communication protocols. Accordingly, a request can be made from a device or node using BLTE. For example, a request can be communicated. For example a request could be made to find out what assets are within a particular geographic area, i.e. on the jobsite. That request can be received by a number of assets that are within range of the asset making the request that have that communication protocol, and those assets can respond as noted above by changing their ID or another pre-authentication communication procedure.

A request may also be received by other assets outside of the range of the asset making the request and/or that communicate using a different communication protocol by tunneling communication through a hub. The request can be received by a hub and re-transmit over one or more different communication protocols to other devices, which can propagate the request and/or provide responses to the request. Those responses to the request can be relayed back to the original node making the request via the hub. Again, this information can be transferred using a pre-authentication mode, for example by the device making the request changing its ID so that when the hub receives the ID, it can change its ID on a plurality of different communication protocols. In turn, various devices that receive the hub ID can change their IDs to propagate and/or respond to the request.

FIG. 39 identifies the process used within the network to identify patterns or problems and how these patterns can push notifications or drive predefined messages to workers on a site or within a network. These can be inventory, service, schedule, weather issues, complications on a jobsite, service delays and new plans or sequence of events to follow etc.

Figure 70:
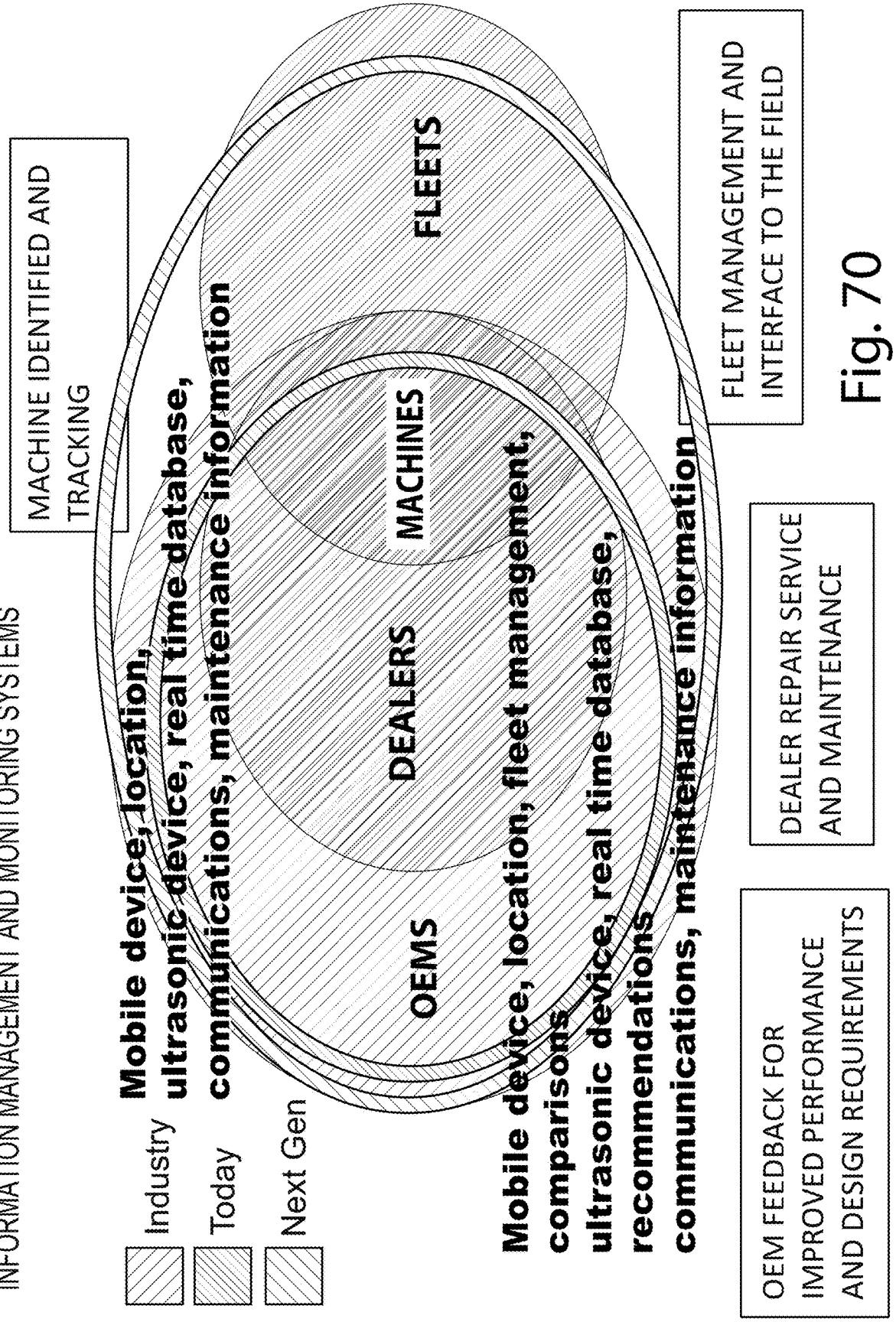
FIG. 70 shows a system perspective of comparing analytics of brands, use statistics, regions, and maintenance schedules.

FIG. 70 shows the system perspective of comparing analytics of brands, use statistics, regions, and maintenance schedules for optimal understanding. This drives feedback to OEMS on design, user habits and conditions. The dealers receive feedback on maintenance and part performance expectations. The greater overview allows fleets to gain a strategic view on what parts, vehicles and users perform best. This drives best practices feedback even to the user on ways to improve use.

Figure 71:
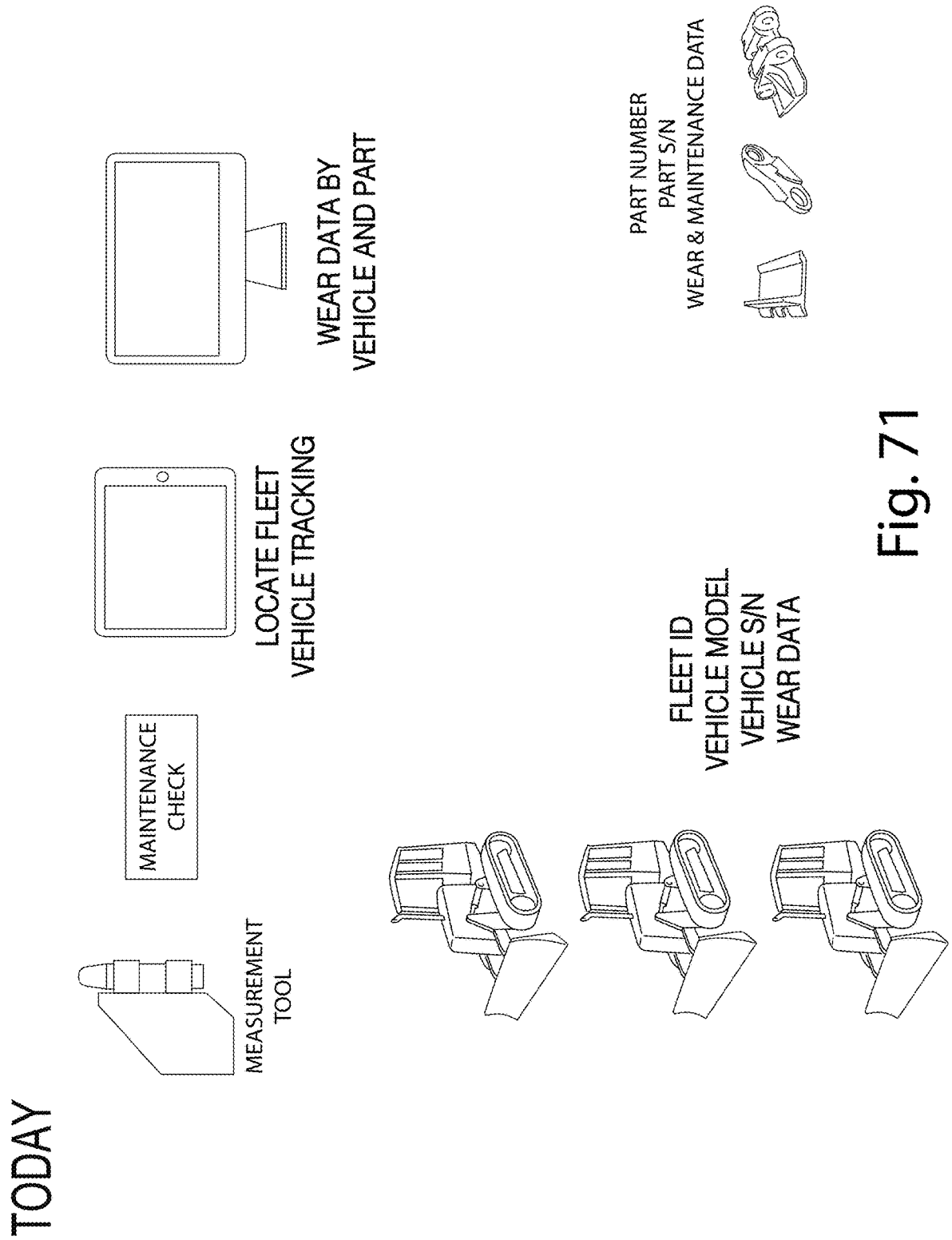
FIGS. 71-72 show process and connection of maintenance measurement data, fleet ID information, user ID information, vehicle identification, part replacement identification containing supplier information, location wear tables and wear verification to build new models of use expectations.
Figure 72:
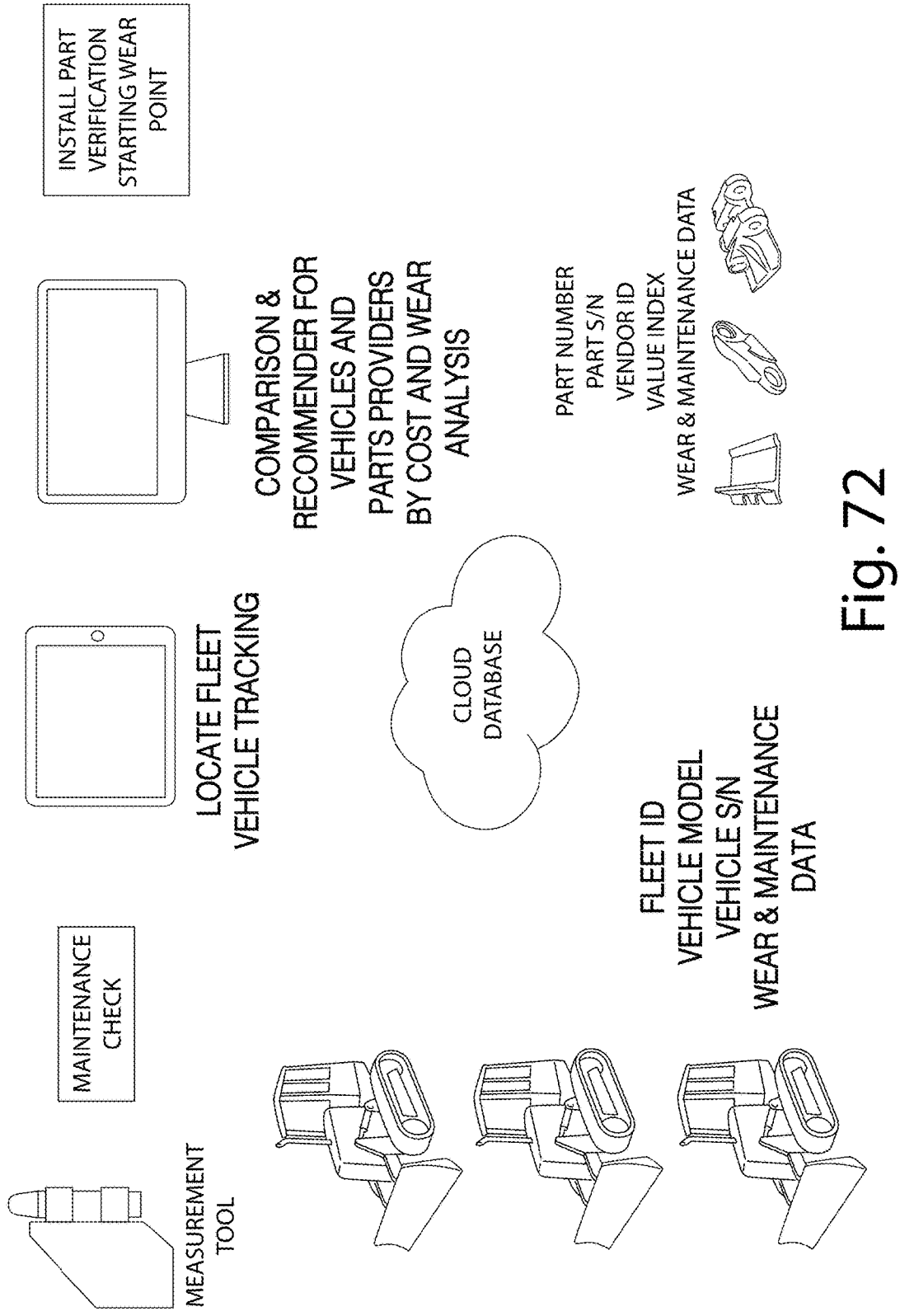

FIGS. 71-72 show the prior art of the process and connection of maintenance measurement data, fleet ID information, user ID information, vehicle identification, part replacement identification containing supplier information, location wear tables and wear verification to build new models of use expectations.

Figure 73:
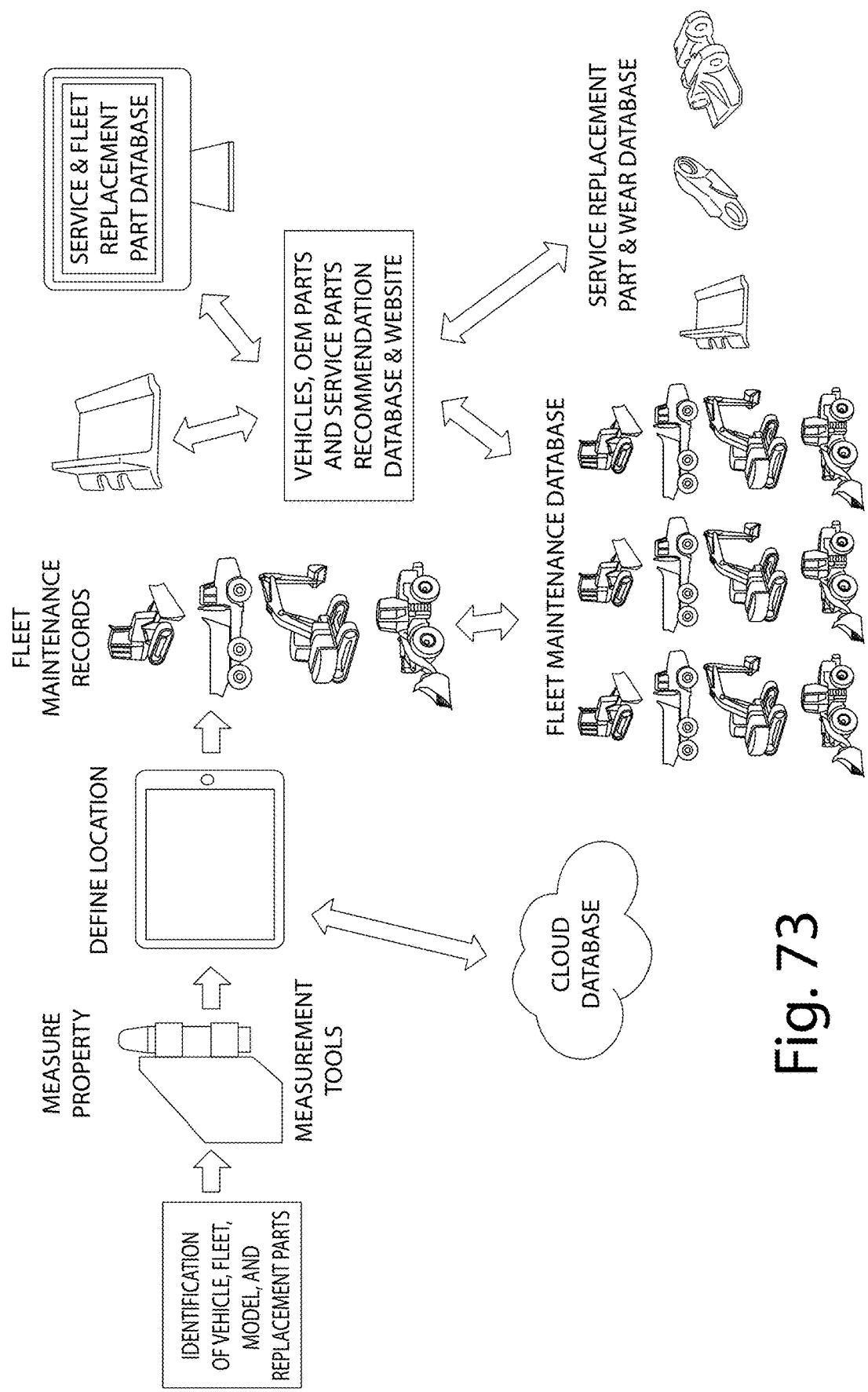
FIG. 73 shows the progression of records and identifications that build the maintenance wear data detailing the parts, vehicle, brand, time and locations, and users over that time. This information can be verified and compared to the measured data from the testing tool.

FIG. 73 shows the progression of records and identifications that build the maintenance wear data detailing the parts, vehicle, brand, time and locations, and users over that time. This information is verified and compared to the measured data from the testing tool.

FIG. 1 details the fleet vehicle data, maintenance data, usage information location data so that the data can be compared to get to statistically significant comparisons of parts, vehicles, and users. The options are endless and offer some very powerful data collection of valuable information for advertising, sales, design improvements, design specifications improvements, and cost reductions.

Figure 74:
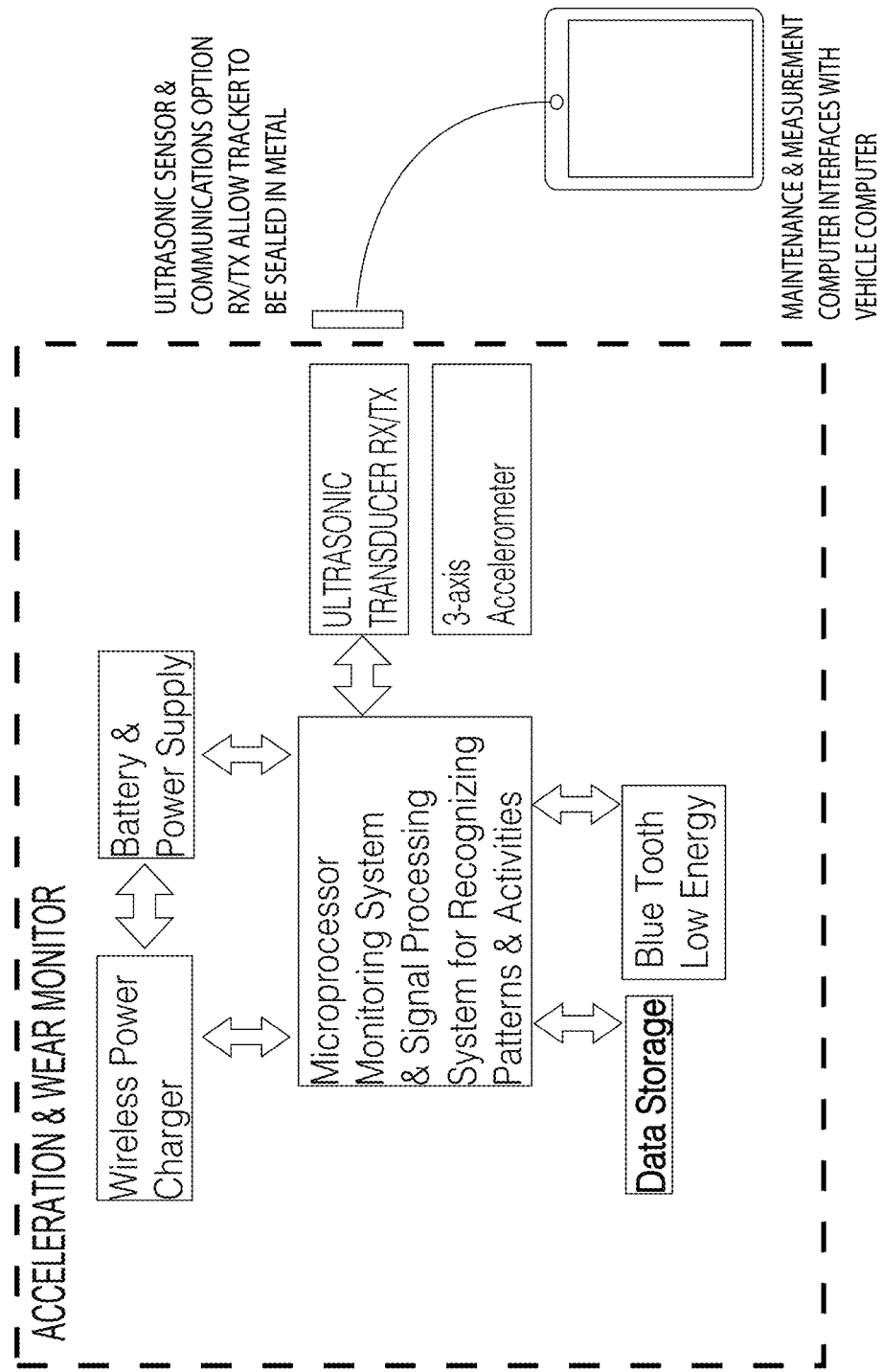
FIG. 74 shows a tracker that can be mounted in steel that allows communications through the ultrasonic transducer used as a Tx and Rx device.

FIG. 74 shows a tracker that can be mounted in steel that allows communications through the ultrasonic transducer used as a Tx and Rx device. A basic protocol of Ack/Nak is used to initiate and then data is transferred accordingly. The system is designed to monitor the acceleration data along with the ultrasonic data to track the level or magnitude of usage. An example would be a level of use intensity 1-10; 10 being harsh use inducing a wear weighting that speeds the typical wear period. This will drive precise algorithms that prevent down time and allow preemptive replacement of parts.

Figure 75:
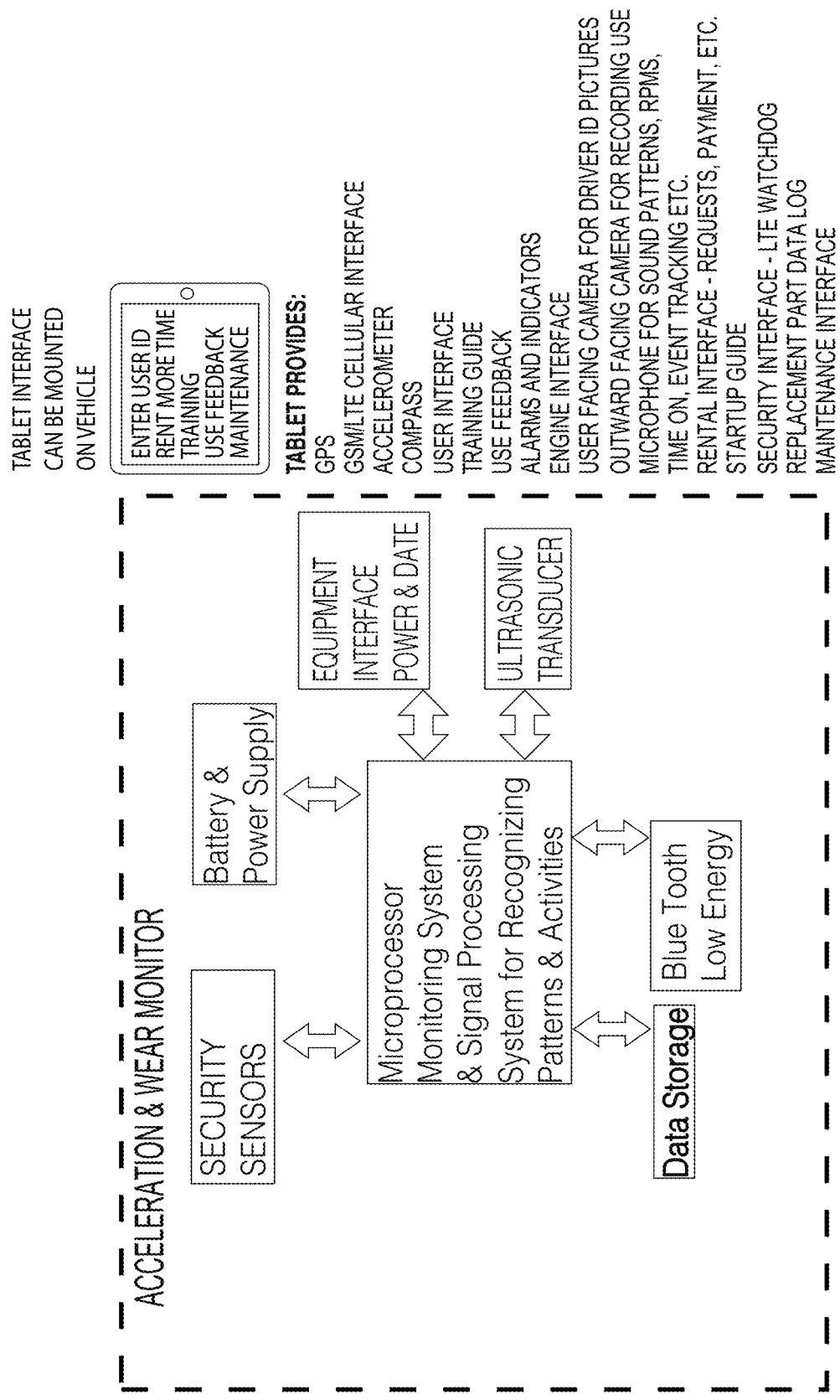
FIG. 75 shows the same basic concept as FIG. 123 but it allows interface to the vehicle data, electrical and control.

FIG. 75 shows the same basic concept as FIG. 74 but it allows interface to the vehicle data, electrical and control. It also adds the capabilities of a tablet allowing the detailed capabilities that these devices add to this environment. Cameras and other sensors can now be utilized and communicated to the main cloud database in real time using the LTE interface in the tablet. The microphone can be programmed to recognize patterns and detail the environmental conditions. GPS details movement, security and other tracking data points. The accelerometer and compass can be utilized for tracking direction, media traveled and intensity of surfaces.

Figure 76:
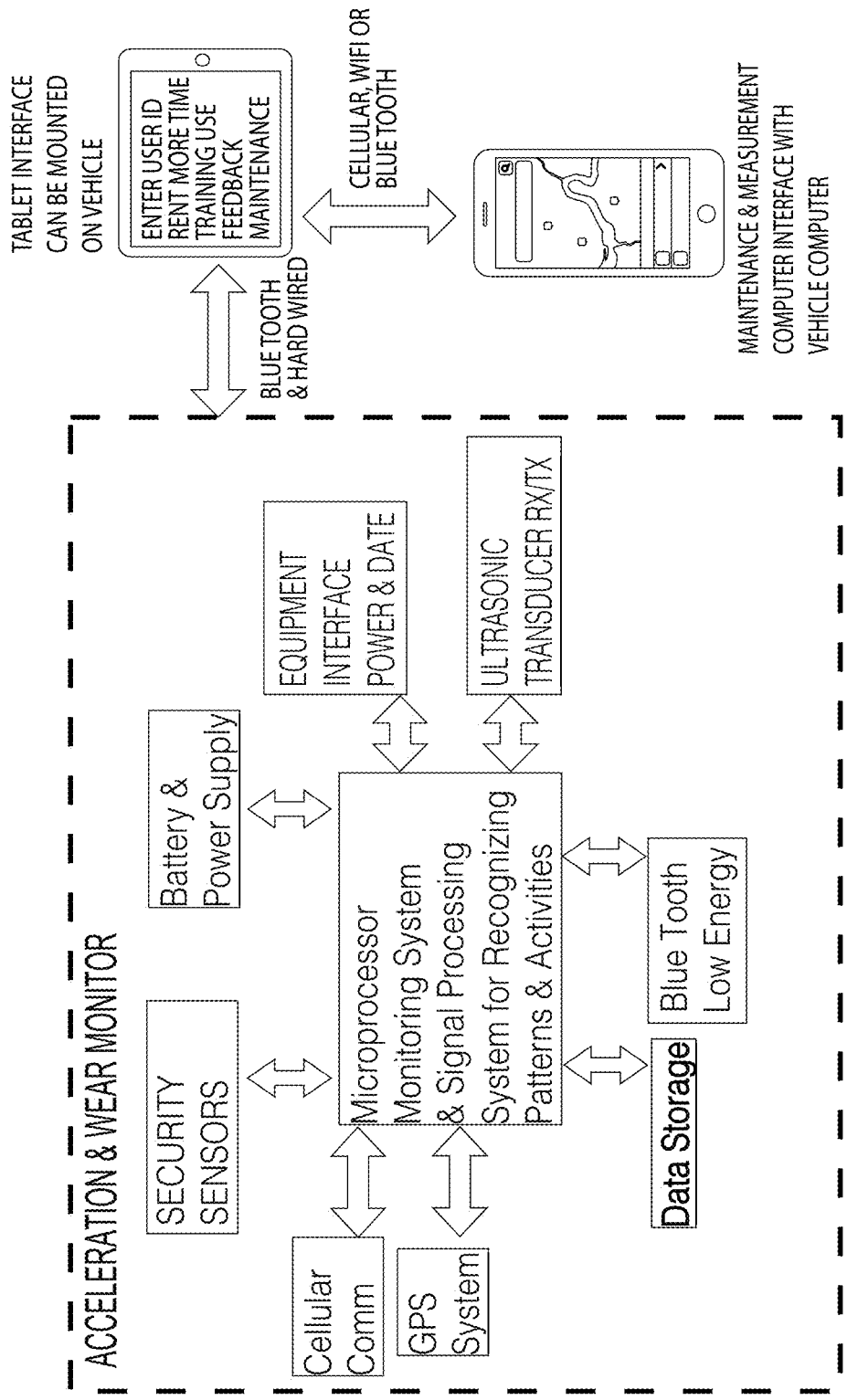
FIG. 76 shows tablet to tablet communications for maintenance data transfer.

FIG. 76 shows these same systems but with tablet-to-tablet communications for maintenance data transfer. This is important to allow at least one of three devices to upload. It also automatically links the vehicle and fleet data to the maintenance record making it easier and more cost effective to test and maintain.

FIG. 77 provides an example of how sound and ultrasonic sensors can be used to monitor patterns and general operation. Conditions can be recognized and monitored again for level of usage intensity, RPMs, speed, terrain, work load, media types (material being moved), all over time and the specific exposure envelopes for each part.

Figure 78:
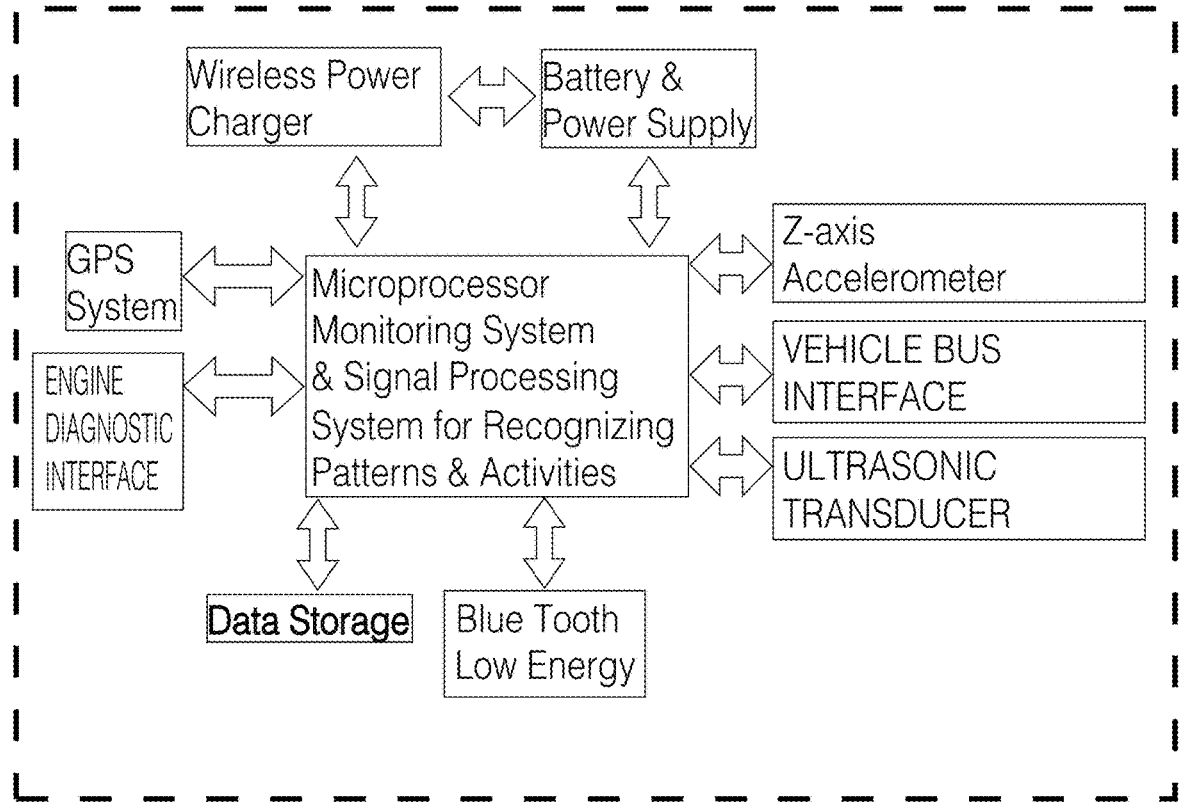
FIG. 78 shows details the complete interface of a tablet-like device with existing capabilities to a piece of equipment used for specific tasks.

FIG. 78 details the complete interface of a tablet-like device with existing capabilities to a piece of equipment used for specific tasks. This interface allows the vehicle to talk to and be controlled by the tablet. Start-up time tracking additional rental time requests, and use tracking becomes input of valuable information for the fleet and overall monitoring analytics. It is important to note that this information provides value in the statistically significant data over time relating to parts, vehicles, users, regions and other related monitoring data.

Figure 79:
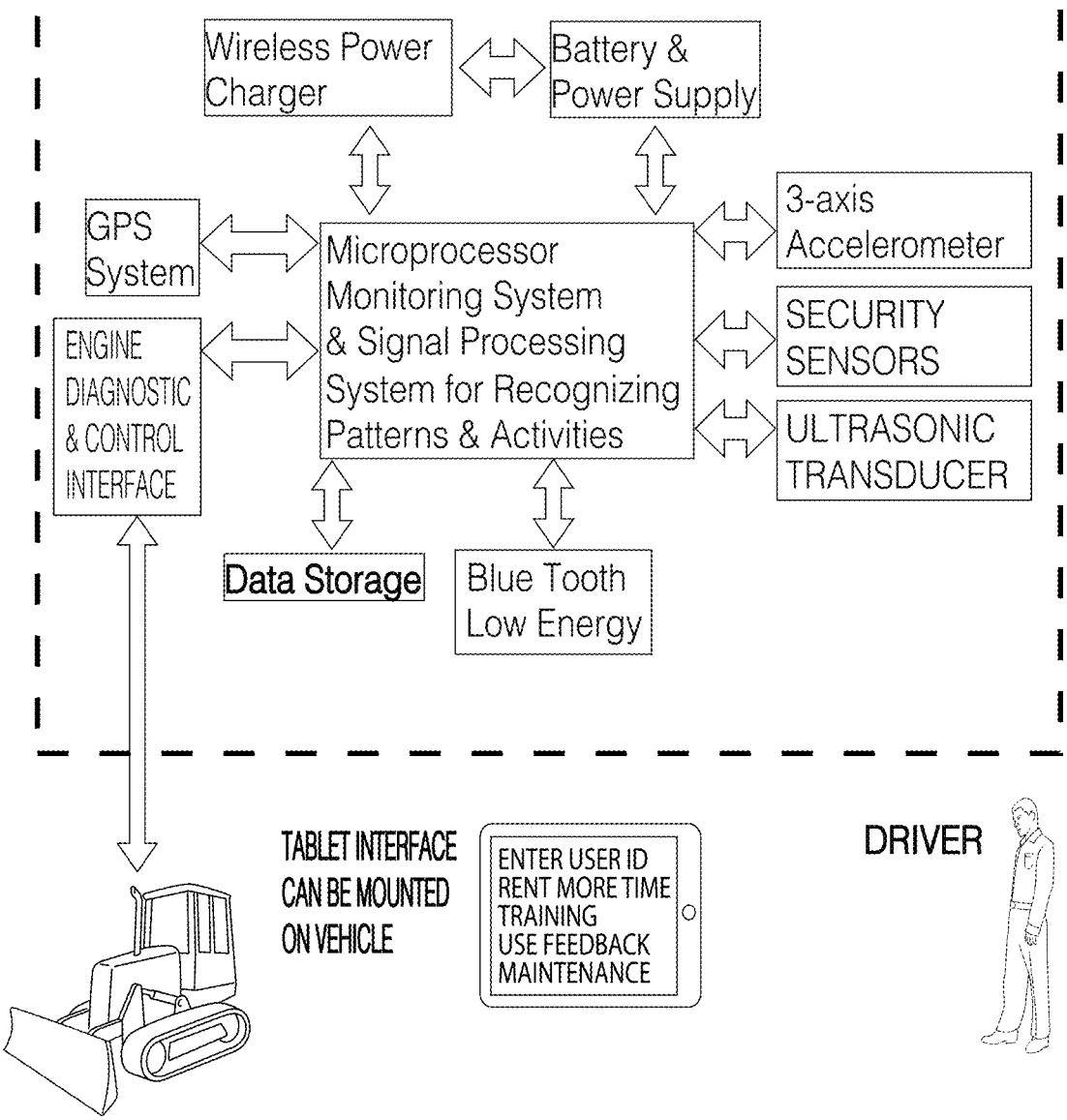
FIG. 79 shows the same type of interface as indicated in FIG. 127 but adds the capability of becoming a security monitor as well as a data tracking and device connected to the user ID, and vehicles systems.

FIG. 79 details the same type of interface as indicated in FIG. 78 but adds the capability of becoming a security monitor as well as a data tracking and device connected to the user ID, and vehicles systems.

Figure 80:
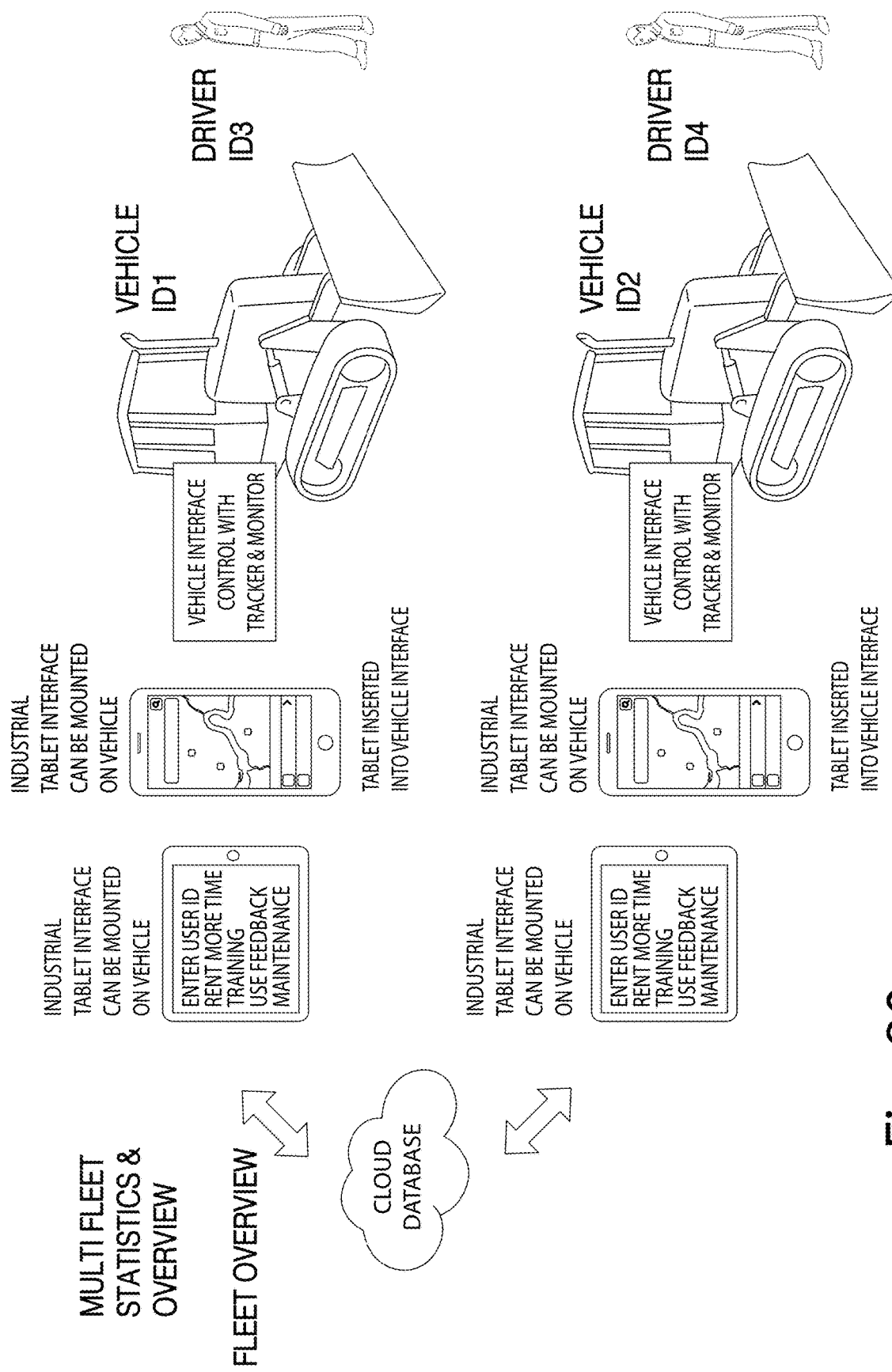
FIG. 80 shows a cloud database connecting data through LTE and WiFi of the tablet.

FIG. 80 details the cloud database connecting data through LTE, WiFi of the tablet and utilizes an industrial holder for the tablet to collect, analyze and transfer patterns, use data rental time, user data and feed information back to the user like interactive training data. When the system identifies specific patterns, it can suggest alternative control methods to reduce wear or strain on the vehicle. By comparing drivers that have better wear data the training can be compared over significant events monitored by identifying the same patterns with different amplitudes or wear intensity index.

Figure 81:
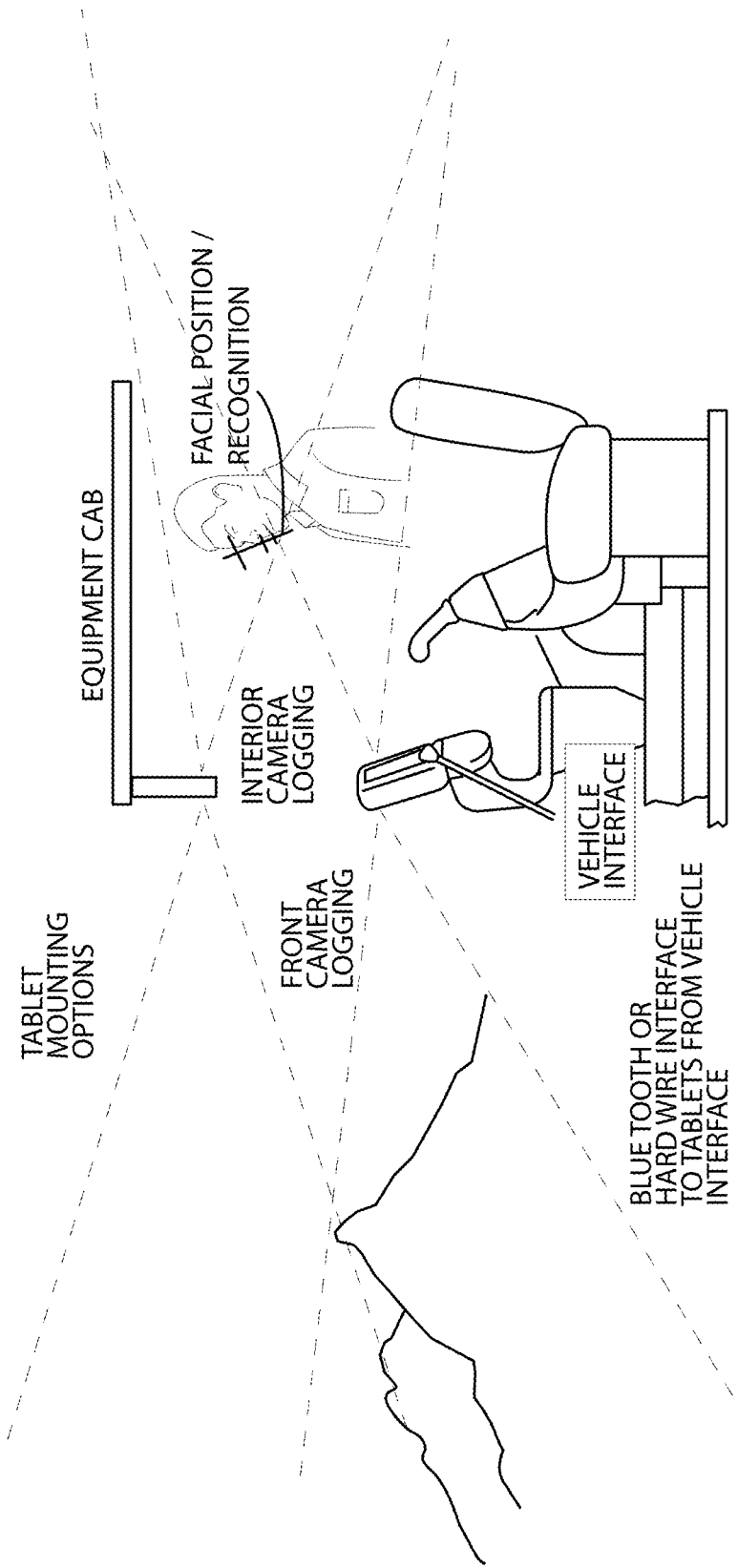
FIG. 81 shows tablets mounted within a cab and how this may impact additional sensor inputs and capabilities.
Figure 82:
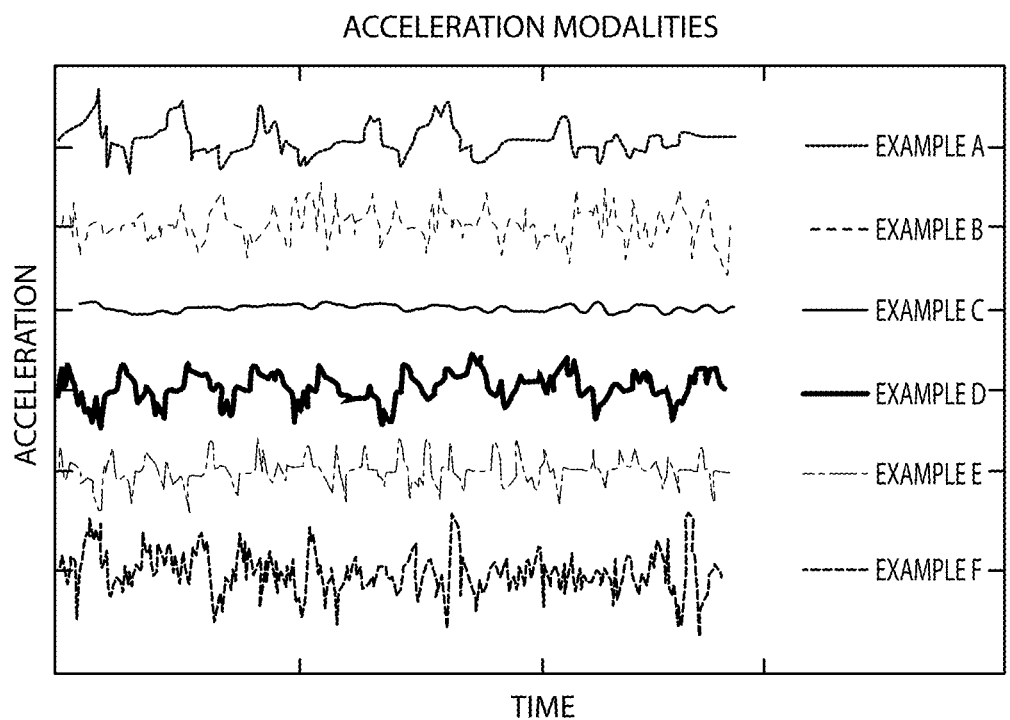
FIG. 82 shows exemplary acceleration modalities.
Figure 83:
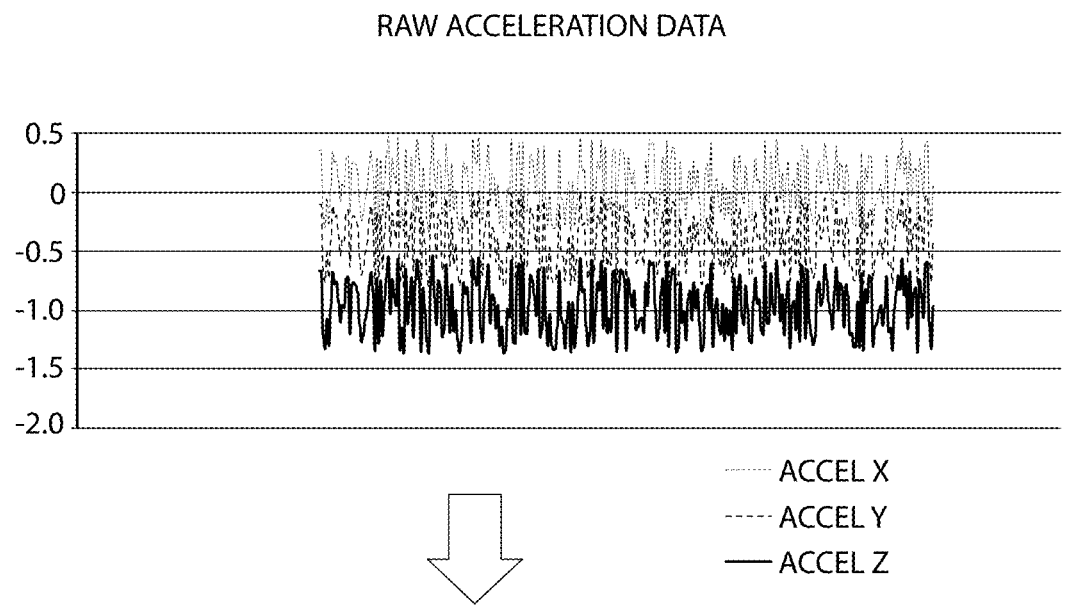
FIG. 83 shows exemplary raw acceleration data.
Figure 84:
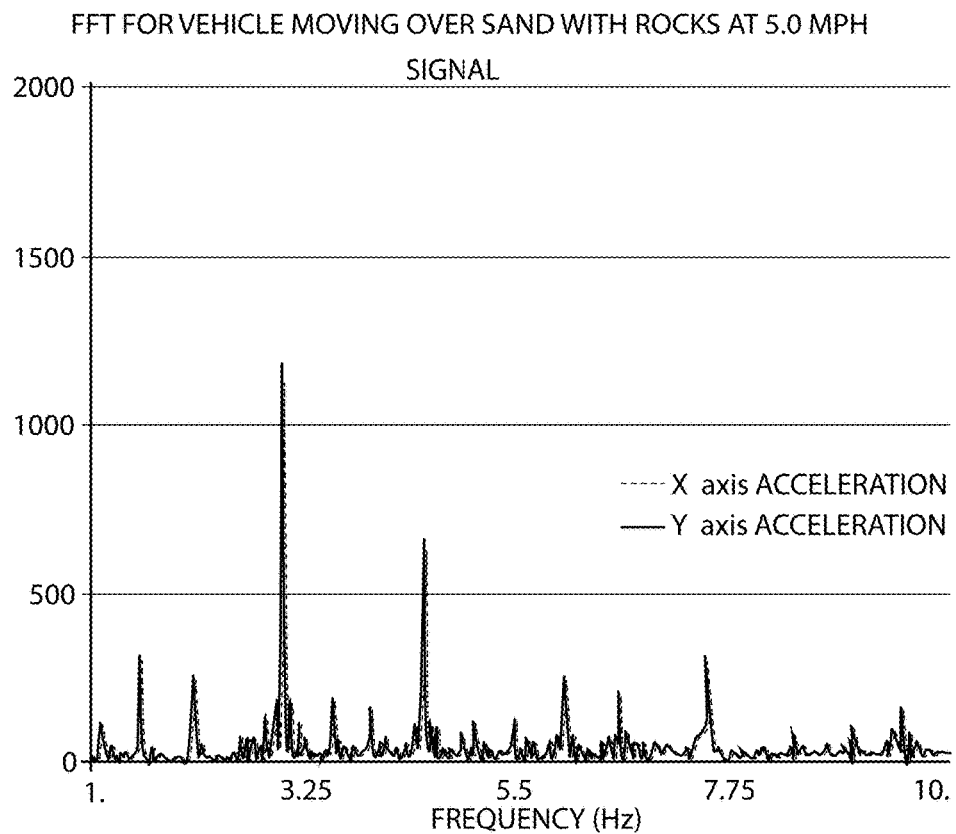
FIG. 84 shows a Fast Fourier Transformation of acceleration data for a vehicle moving over sand with rocks at 5.0 miles per hour.
Figure 85:
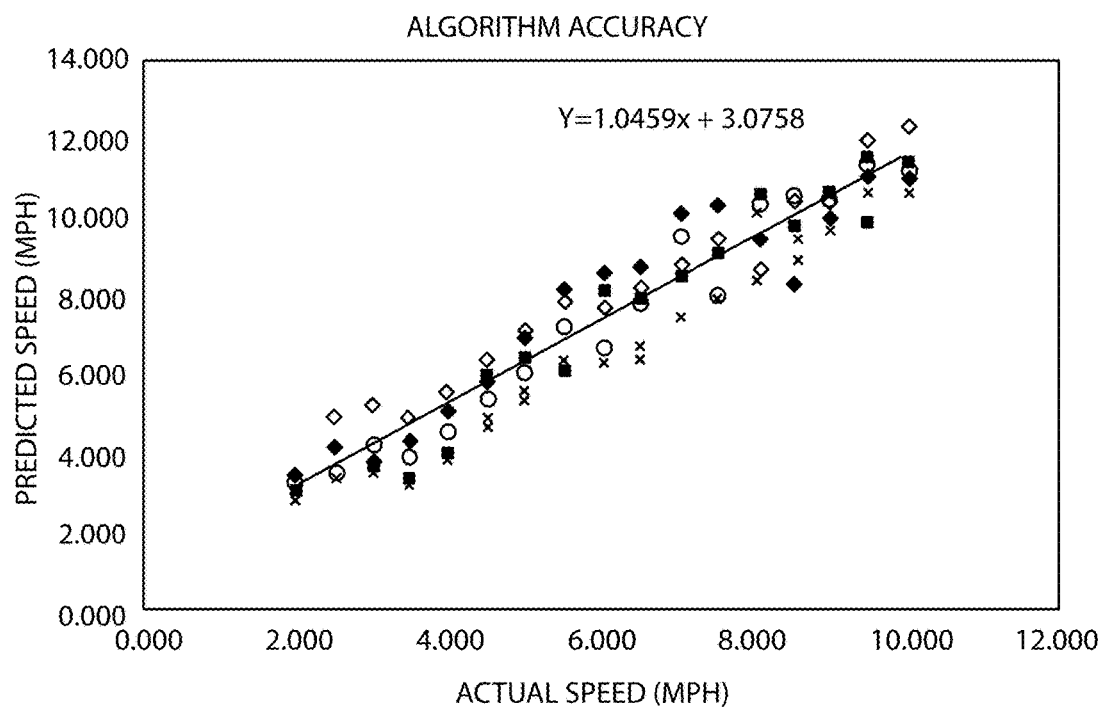
FIG. 85 shows a speed prediction graph.
Figure 86:
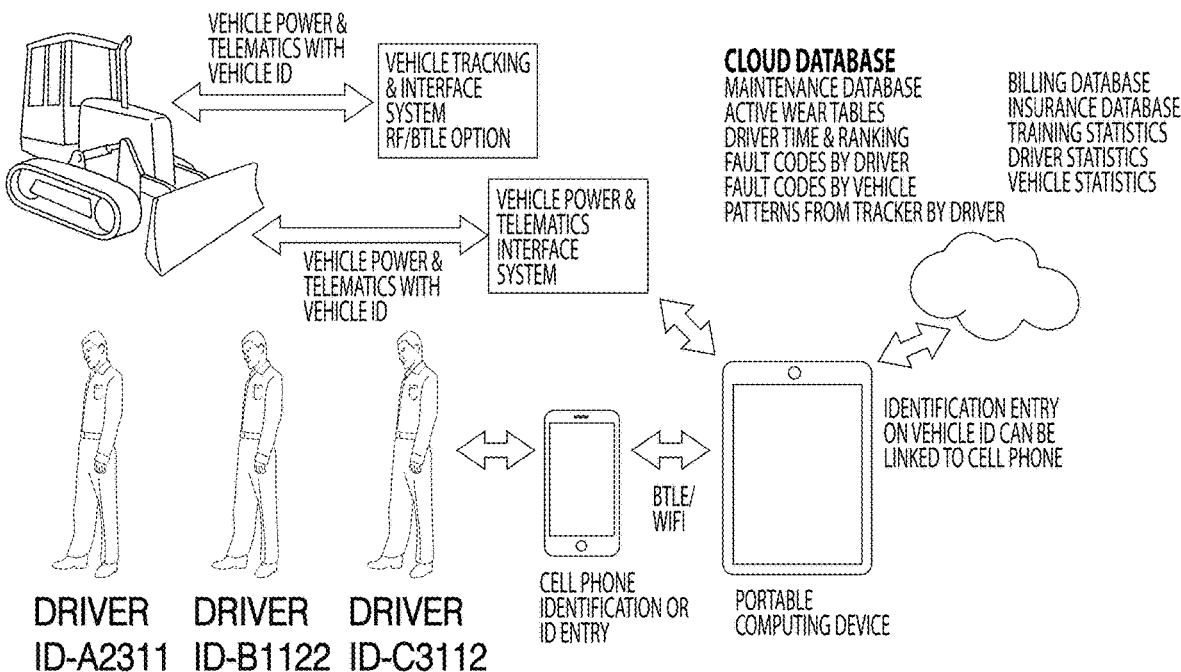
FIG. 86 shows one example of an HDi system.
Figure 87:
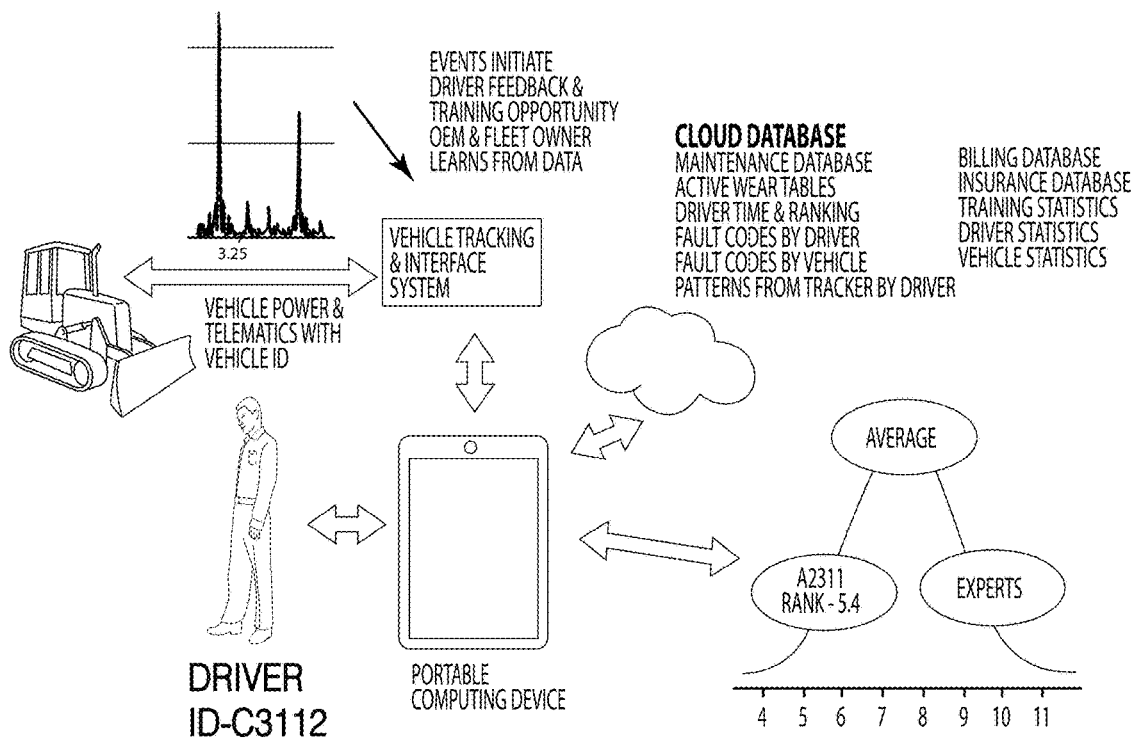
FIG. 87 shows an example of an HDi system with training and feedback.
Figure 88:
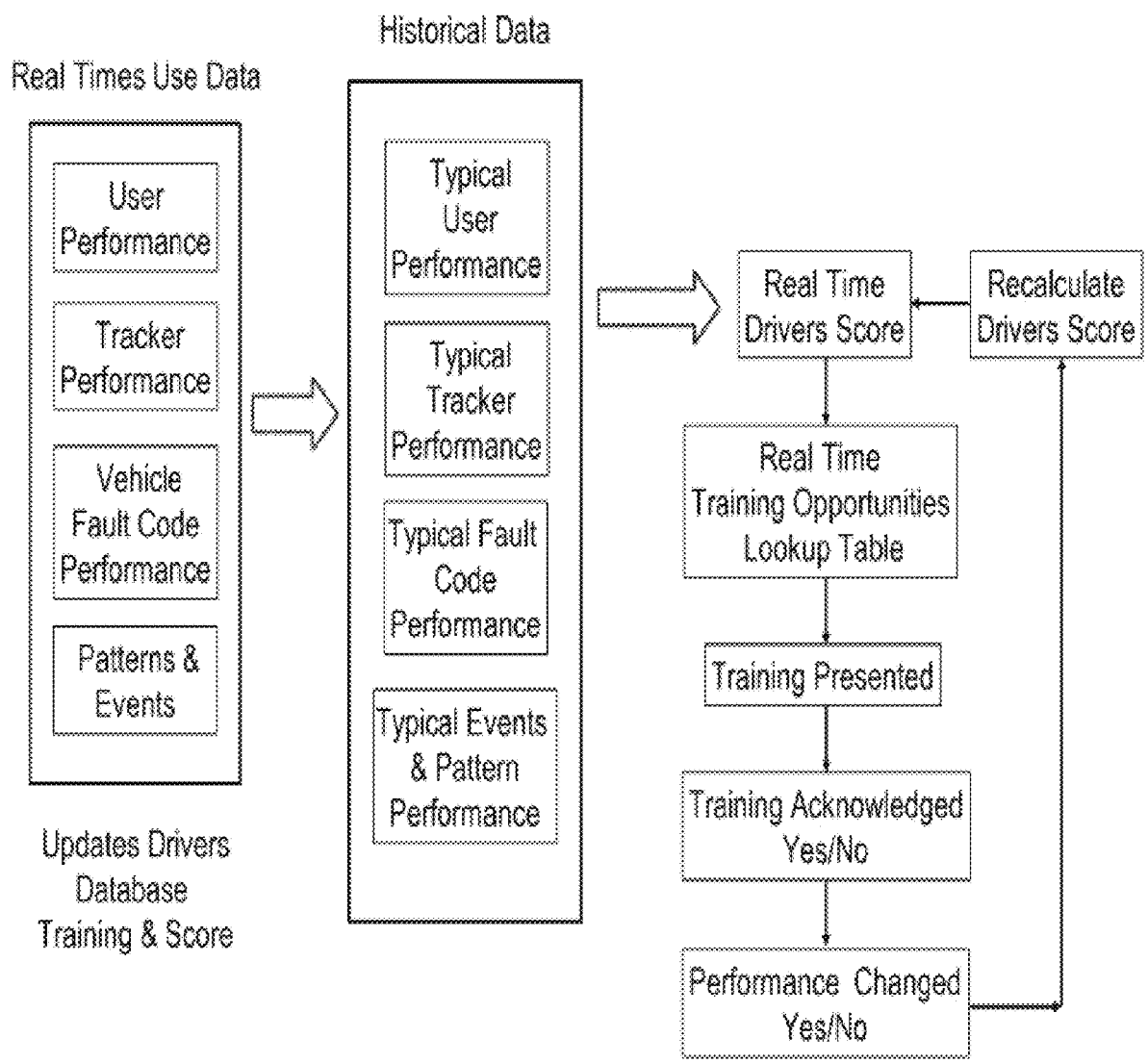
FIG. 88 shows a block diagram for a driver database training and scoring.
Figure 90:
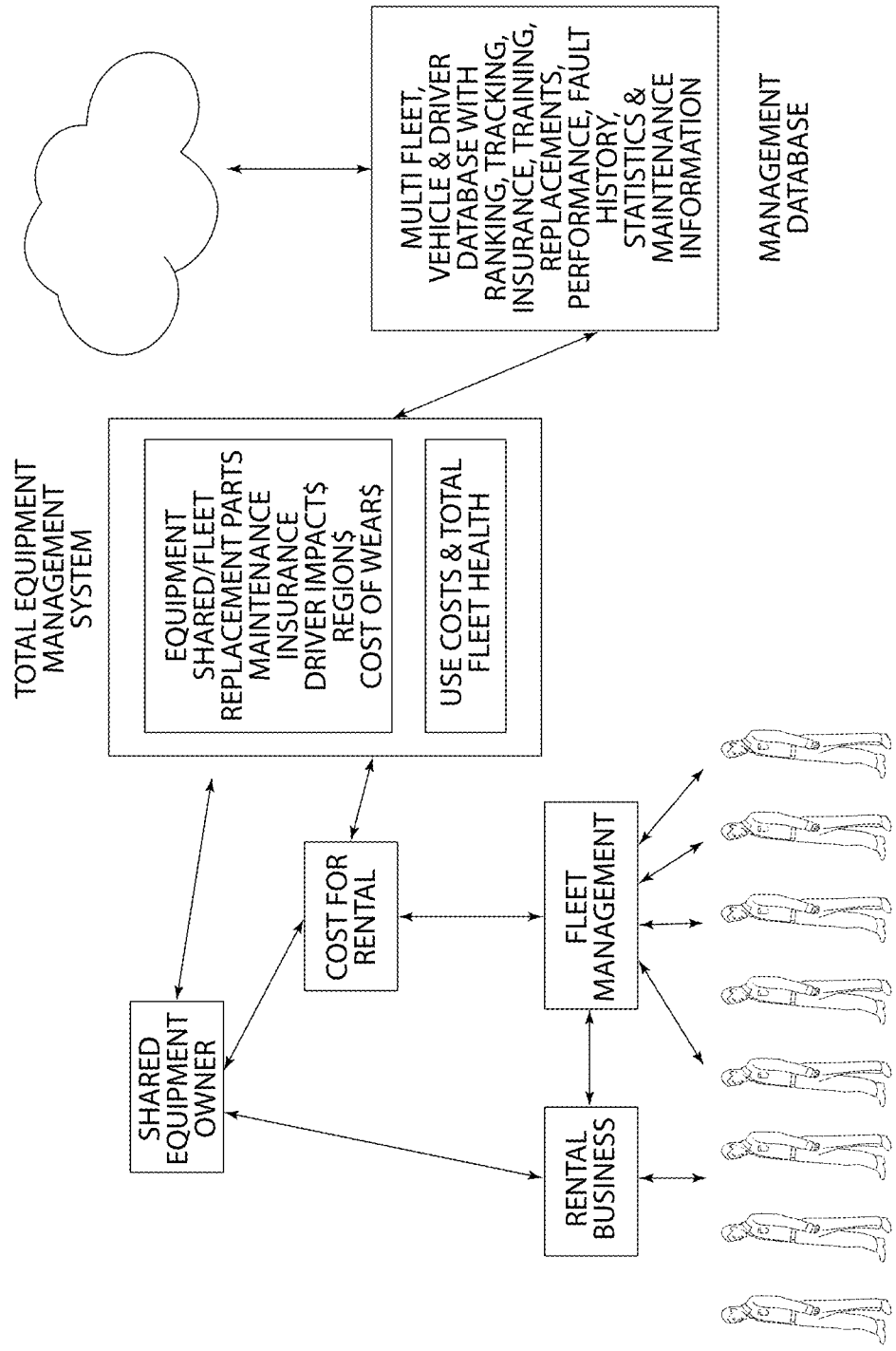
FIG. 90 shows a block diagram of a total equipment management system.
Figure 94:
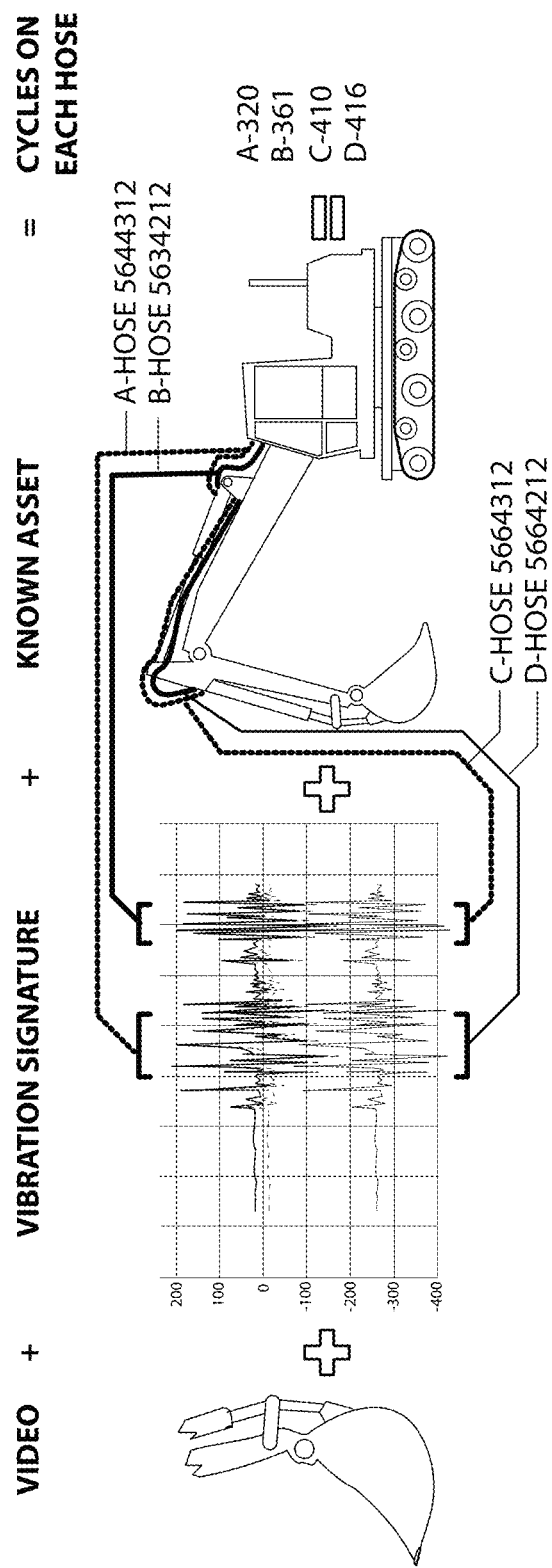
FIG. 94 shows an representative diagram regarding the HDi system.

FIG. 81 shows the tablets mounted within a cab and how this might impact additional sensor inputs and capabilities.

In the first embodiment we show an information management system that allows fleets to monitor the performance of vehicles, brands, parts, replacement parts and operator performance.

In a second embodiment the system requires a tracking and monitoring system. This system is designed to track the specific directions and the acoustic noise created by the effects of wear throughout the body of the equipment.

Operator monitor system for a heavy equipment operator that tracks and monitors operational use of the machine and provides a rating index of 1-10 on capability of operator and overall wear being applied to the machine by the operator.

Tracks number of fault codes triggered on average.

Tracks number of reverse time machine run, times machine was operated on angles, and other operations that might accelerate the wear of the machine.

A third embodiment uses an identification system in an identification and control system for tracking, renting and operator rating by user habits.

Operator "key" system that allows a user to utilize a smart phone or tablet to register, start the machine, and provide visual cues on the operation of the machine enabling:

User can download an application that will connect via Bluetooth or hard cable to the machine, register their personal and payment information, and purchase an amount of time to use the machine.

Application will track users location and use of machine via GPS.

Application will integrate with the machine's telematics feed to provide guidance on operation through the monitor system.

Application will allow user to rate the machine, and owner of the machine to rate the user.

Rating system will alter the cost per hour in a beneficial or negative manner based on the users rating.

Application will enable user to connect with technical support via sms, txt, or live chat.

Microphones and ultrasonic sensors are used to track sounds and operational levels. Patterns and conditions can be monitored that can attribute to additional wear like the high frequency noises of abrasives on metal.

Security sensors can be used as the monitor can have cellular service and feedback status to the office. This can be utilized with a security monitoring service for equipment.

Tracker can be mounted in protective steel and data is collected using ultrasonic communications through the steel A fourth embodiment is a rental tracking system for rating users and requesting time from the fleet office for scheduling of rentals in the field.

A mobile technology system that enables fleet end users of equipment to schedule, purchase hours, and secure field service technician time to fix equipment.

Application allows both the field technician and the equipment owner to rate the performance of the other party Rating system for the field technician influences their hourly rate positively or negatively Application allows field technician to register their rate, level of certifications, and enables their location to be searched and viewed by equipment owners looking for service Equipment owners can search and filter by level of certification, rates, radius of location of field technician Billing system allows organization to set the billable rate for the field technician and the field technician to set up a bonus criteria above the flat billable rate based on their ability to hit a certain rating level.

A fifth embodiment is a series of trackers that can communicate and provide valuable tracking data like GPS, taking pictures of events, users & terrain for analysis.

FIGS. 91, 92A-E, and 93A-B detail the method used to measure the driver ranking in the management system. The primary fault codes are the basic codes while the fault code grouping details the codes related to potential misuse like over speed etc. The overall score can be recalculated as each drive time is finalized.

Heavy-Duty Vehicle Pattern Detection

FIG. 95 shows formulas for calculating lateral acceleration and longitudinal acceleration, which can be used to detect heavy-duty vehicle patterns, which are associated with specific heavy-duty vehicle operational events.

FIG. 96 shows a wavelet modulus maxima. Maxima can be used to reconstruct a signal. Maxima are a stable and unique representation of a signal. Processing sensor data, such as acceleration data in this way makes it easier to recognize and compare.

A feature vector can be created that encodes relative distances of the maxima.

Distances can be encoded by incorporating the necessary invariance. More Invariance=>More robust to noise and less unique for matching. Uniqueness can be increased by encoding many points. Lesser robustness to outliers.

When a vehicle acts in either accelerating or decelerating direction, result in a large absolute value of $A_{lon}$, making a salient convex or concave shape in its graph of curves. For detection of specific events and sequences different thresholds can be set for positive $A_{lon}$ and negative $A_{lon}$.

Figure 97:
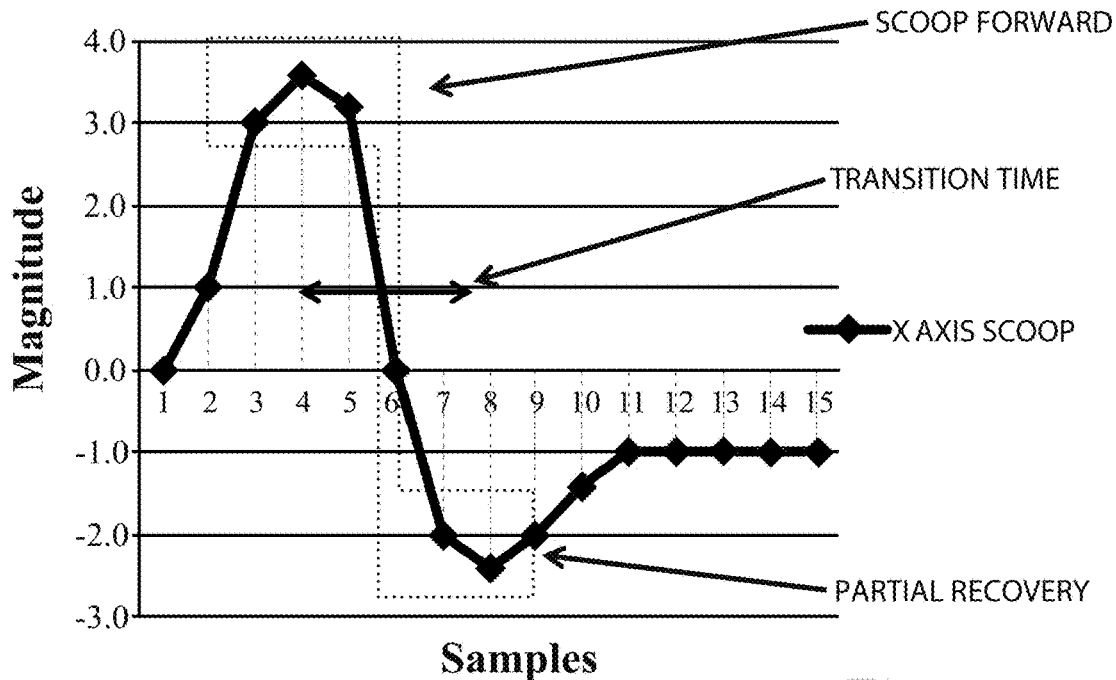
FIG. 97 shows exemplary accelerometer data for detecting a loaded bucket scoop heavy-duty vehicle operational event.

For example, in FIG. 97, a pattern can be represented by the shaded areas. That is, a pattern of magnitudes within particular time frames can represent a pattern that identifies a heavy-duty vehicle operational event. As shown in FIG. 97, the shaded areas are the pattern that indicates a loaded bucket scoop. A loaded bucket scoop refers to a heavy-duty vehicle with a scoop work tool engaging with the earth to load the scoop. As the scoop moves forward, the accelerometer or other sensor data indicates a positive magnitude followed by a partial recovery. In order to identify this loaded bucket scoop event, a controller can analyze the sensor data to determine whether the sensor data is within a range (or above/below a threshold) during each time frame. That is, the heavy-duty vehicle starts from a steady state then transitions negative with a partial recovery.

FIG. 97 shows exemplary data for one axis—the X axis. Similar data can be collected for other axes of an accelerometer and analyzed in a similar manner. Further, additional sensors can collect additional data that can be analyzed in a similar manner A particular heavy-duty vehicle operational event may be categorized after a pattern is matched for one axis. In addition, a pattern may require multiple axes of data—for example a particular set of magnitudes within certain time frames in the X, Y, and Z axes of the accelerometer data. The magnitude threshold/ranges and time frames may not be the same for the X, Y, and Z axes.

The magnitude thresholds and time frames may be determined empirically by recording data as various heavy-duty vehicle events are conducted. Data can be collected, aggregated, and filtered to provide appropriate patterns for detecting various heavy-duty vehicle operational events.

Figure 98:
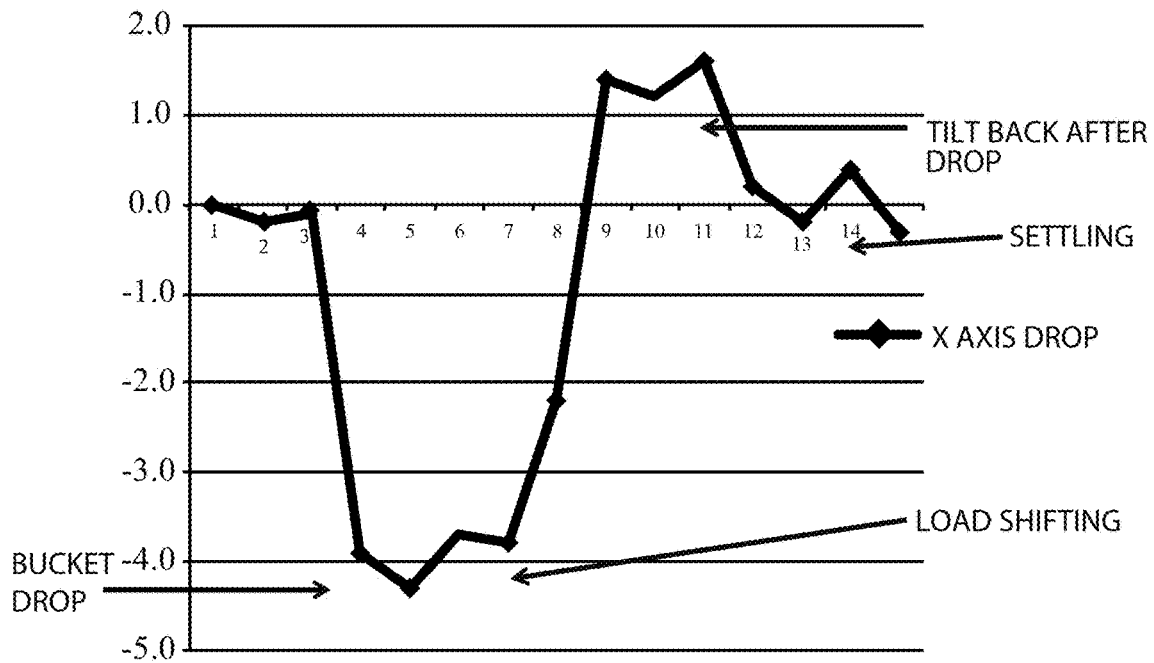
FIG. 98 shows exemplary accelerometer data for detecting a loaded bucket drop heavy-duty vehicle operational event.

FIG. 98 shows an example sensor data for another heavy-duty vehicle operational event—a loaded bucket drop. The loaded bucket when dropped creates a tilt for the period the bucket is evacuated and slides toward positive as it empties. The signal overcorrects and then settles back to steady state. Again, the sequential magnitudes and time frames form a pattern that can be utilized to identify a loaded bucket drop.

Figure 99:
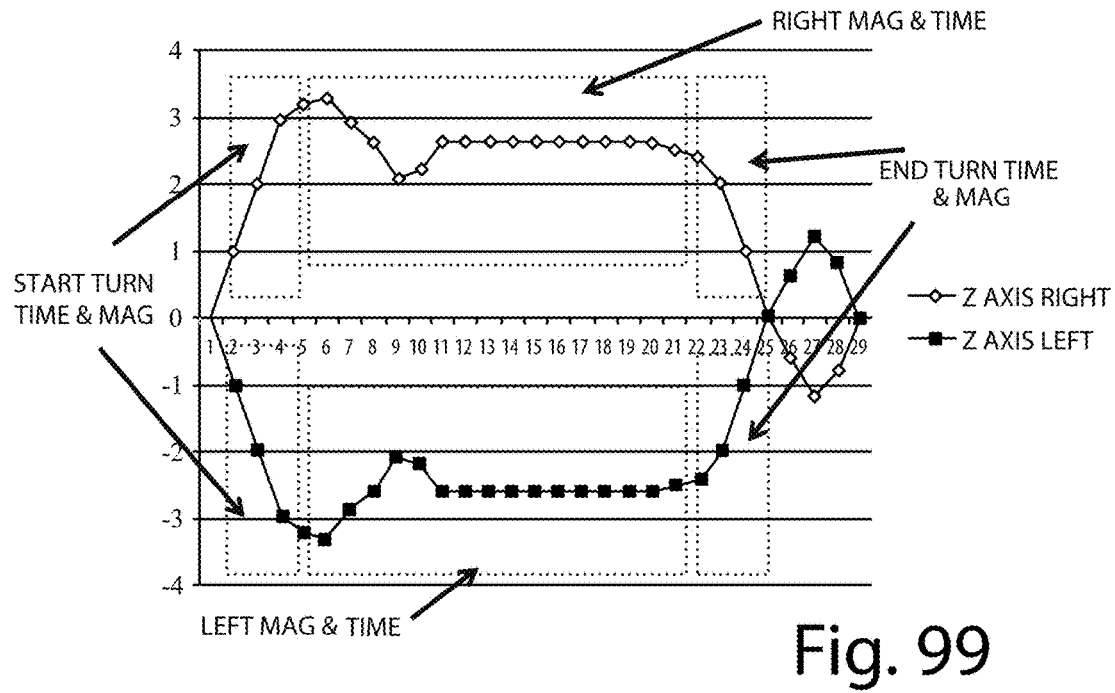
FIG. 99 shows exemplary accelerometer data for detecting a turret rotate heavy-duty vehicle operational event.

FIG. 99 shows an example of sensor data for another heavy-duty vehicle operational event—turret rotation.

Figure 100:
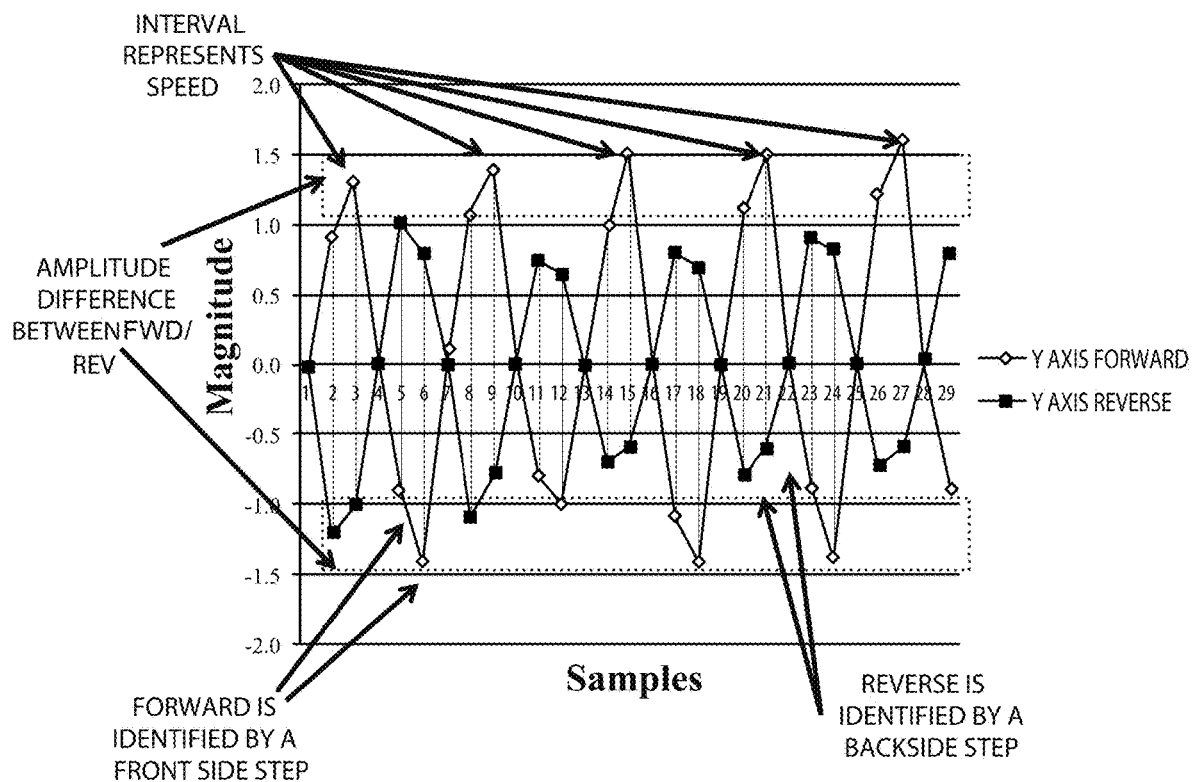
FIG. 100 shows exemplary accelerometer data for detecting a forward and reverse heavy-duty vehicle operational event.

FIG. 100 shows an example of sensor data for another heavy-duty vehicle operational event—forward and reverse movement. The pattern of vibrations transitioning consistently from positive to negative indicates movement in the Y Axis. The transition for forward and reverse from the peak is inverse for direction.

Directional terms, such as "vertical," "horizontal," "top," "bottom," "upper," "lower," "inner," "inwardly," "outer" and "outwardly," are used to assist in describing the invention based on the orientation of the embodiments shown in the illustrations. The use of directional terms should not be interpreted to limit the invention to any specific orientation(s).

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular.

The invention claimed is:

1. A control system for a heavy-duty vehicle, the control system comprising:
   a memory that stores a plurality of patterns representing operation events of the heavy-duty vehicle;
   a first sensor configured to be affixed to the heavy-duty vehicle;
   a second sensor configured to be affixed to a work tool installed on the heavy-duty vehicle; and a controller operatively coupled to the memory, the first sensor, and the second sensor, the controller being configured to
receive first sensor data from the first sensor while the heavy-duty vehicle is operated,
receive second sensor data from the second sensor while the heavy-duty vehicle is operated,
identify an operation event of the heavy-duty vehicle by comparing at least one of the first sensor data and the second sensor data with the plurality of patterns stored in the memory, and
associate the work tool with the heavy-duty vehicle based on a comparison of the first sensor data and the second sensor data.

2. The control system of claim 1, wherein at least one of the first sensor data and the second sensor data includes vibration data, and
the controller is further configured to analyze the vibration data to track wear associated with a wear part of the heavy-duty vehicle.

3. The control system of claim 1, wherein the controller is further configured to provide vehicle operator coaching information to a user related to the operation event based on the identification of operation event.

4. The control system of claim 1, wherein the controller is further configured to calculate an operator rating.

5. The control system of claim 1, wherein at least one of the first sensor data and the second sensor data includes acceleration data.

6. The control system of claim 1, wherein the operation event includes at least one of digging with the work tool attached to the heavy-duty vehicle, moving the heavy-duty vehicle, and turning a turret of the heavy-duty vehicle.

7. The control system of claim 1, wherein the controller is further configured to identify a shock event based on at least one of the first sensor data and the second sensor data.

8. The control system of claim 1, wherein the controller is further configured to communicate the first sensor data and the second sensor data via a social mesh network via an advertising mode.

9. The control system of claim 1, further comprising a third sensor disposed on at least one of an oil filter, a wear surface, and a filter system.

10. The control system of claim 1, wherein the controller is further configured to
associate one operator of a plurality of operators with at least one of the heavy-duty vehicle and the work tool of the heavy-duty vehicle, and
monitor wear of at least one of the heavy-duty vehicle and the work tool that is attributable to the one operator based on the first sensor data, the second sensor data, and the association with the one operator.

11. The HDi monitor control system of claim 10, wherein the controller is further configured to
associate the one operator with the work tool of the heavy-duty vehicle, and
monitor wear of the work tool that is attributable to the one operator based on the first sensor data, the second sensor data, and the association with the one operator.

12. The control system of claim 10, wherein the controller is further configured to limit a functionality of the heavy-duty vehicle based on association of the one operator with the heavy-duty vehicle.

* * * * *